United States Patent [19]
Peters et al.

[11] Patent Number: 6,104,868
[45] Date of Patent: Aug. 15, 2000

[54] EXTENDIBLE AND PORTABLE NETWORK PROTOCOL BASED SYSTEM MANAGEMENT ARCHITECTURE

[76] Inventors: Daniel G. Peters, 18 Kern Dr., Nashua, N.H. 03060-4252; Charles F. Corbett, P.O. Box 184, Mont Vernon, N.H. 03057; Dennis R. Flynn, 20 Dunbarton Dr., Merrimack, N.H. 03054

[21] Appl. No.: 08/766,220

[22] Filed: Dec. 12, 1996

Related U.S. Application Data

[60] Provisional application No. 60/017,072, Apr. 30, 1996.

[51] Int. Cl.[7] .............................. G06F 13/14; G06F 13/00; G06F 15/17
[52] U.S. Cl. ................................ 395/200.32; 395/200.46; 395/182.18; 395/185.1; 395/184.01; 395/200.53
[58] Field of Search .......................... 395/200.32, 200.46, 395/182.18, 185.1, 184.01, 673; 702/166; 706/10

[56] References Cited

U.S. PATENT DOCUMENTS

| | | | |
|---|---|---|---|
| 5,432,932 | 7/1995 | Chen et al. ............................... | 395/673 |
| 5,483,468 | 1/1996 | Chen et al. ............................... | 702/186 |
| 5,561,769 | 10/1996 | Kumar et al. ....................... | 395/200.32 |
| 5,638,494 | 6/1997 | Pinard et al. ....................... | 395/200.32 |

OTHER PUBLICATIONS

John R. Rymer; Distributed Computing Monitor "How SNMP supports a unified management environment", p10, Jul. 1994.

Elizabeth Nichols; DG Review "Management by Proxy", pp 25–30, May 1992.

Barry Bowen; Open Systems Today "New Products Focus on SNMP", Oct. 12, 1992.

Z–Server GT Product Guide with Update Dated Oct. 1994.

*Primary Examiner*—Mark H. Rinehart
*Assistant Examiner*—Ivan C. Pierce, III

[57] ABSTRACT

A method and system server software architecture incorporates a series of software interfaces which allows porting and running of the particular ported software used for managing server components to operate in conjunction with other network operating systems/hardware platforms in addition to allowing for expanding the types of instrumentation components used on such systems which are uniquely constructed for managing newly attached server devices or functions with minimal additional programming effort.

81 Claims, 27 Drawing Sheets

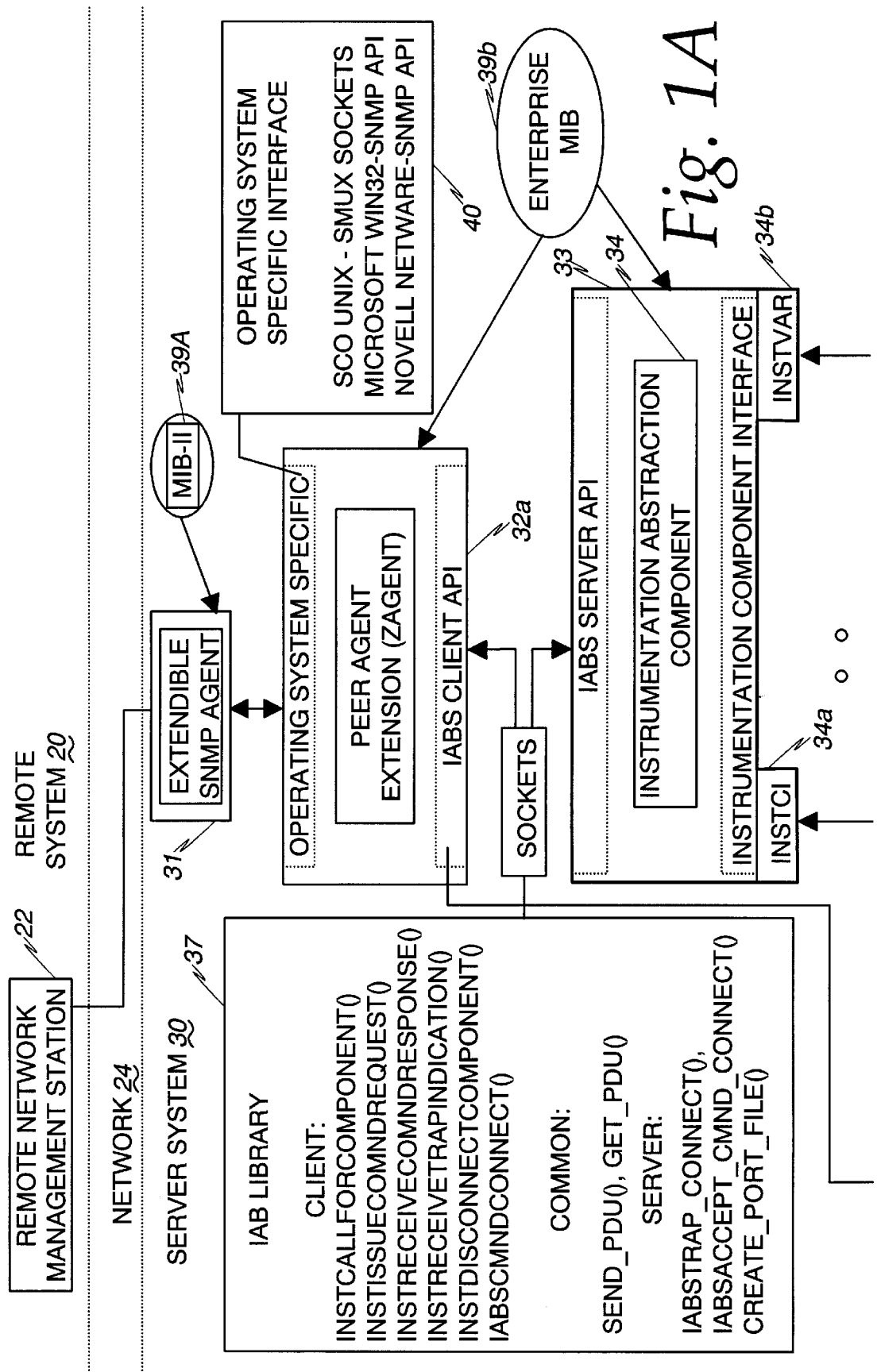

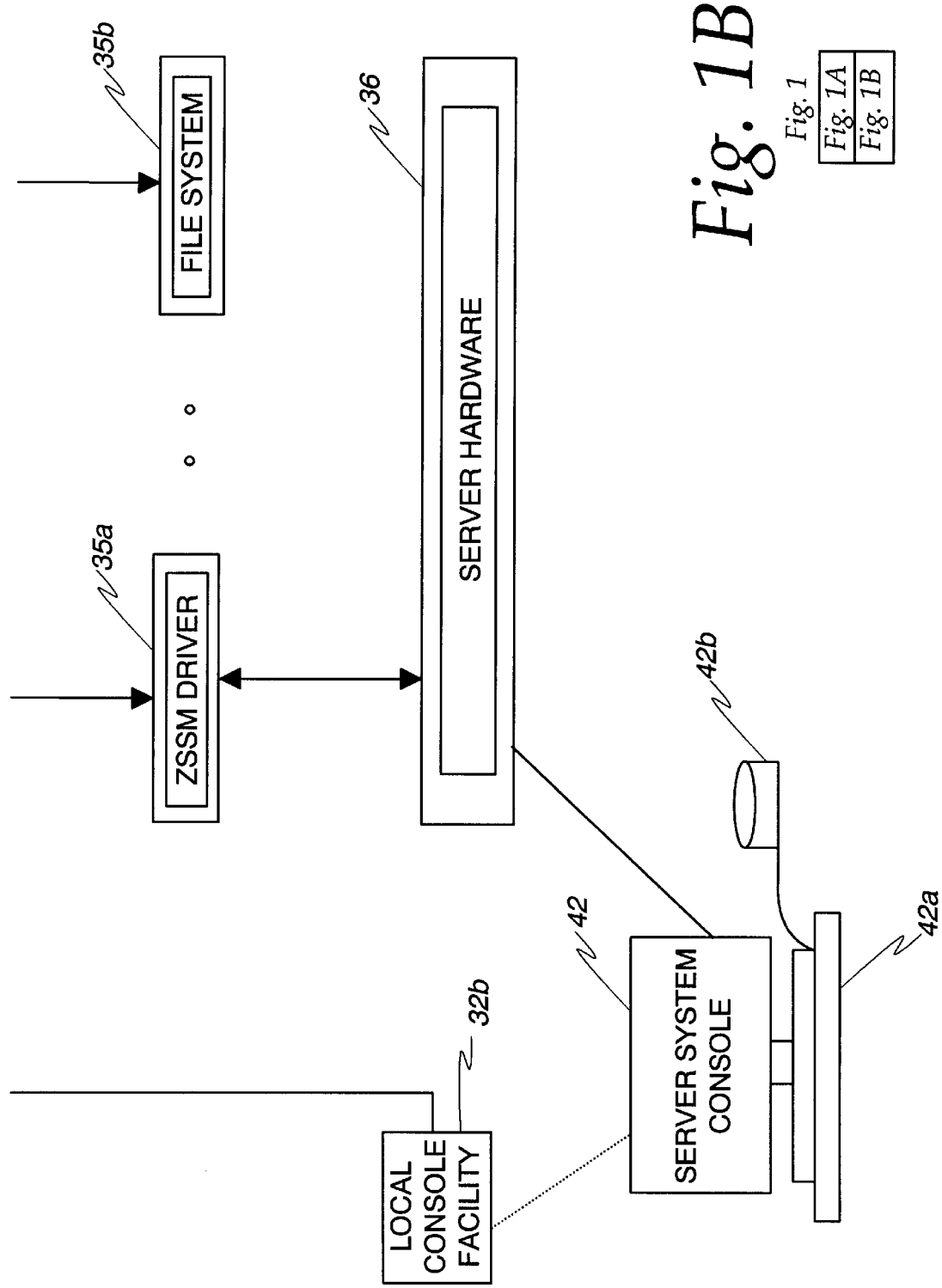

Fig. 4b

FIRST VCT ENTRY:

| | |
|---|---|
| VARIABLE ID = 1 | IABS VARIABLE IDENTIFIER (INTEGER VALUE EQUATED TO MIB NAME) |
| MAX INSTANCE CTRL | 0 = SINGLE INSTANCE VARIABLE: ELSE ID OF VARIABLE DEFINING MAX INSTANCE |
| PROCESSING FUNCTION | POINTER TO FUNCTION TO PROCESS GET, SET AND SET-VERIFY COMMANDS |
| VALIDATION FUNCTION | POINTER TO FUNCTION TO VALIDATE GET, SET AND SET-VERIFY COMMANDS |
| MAX INSTANCE | CURRENT MAXIMUM INSTANCE VALUE (SI=0; MI=1-N) |
| ATTRIBUTES | ATTRIBUTES OF THIS VARIABLE: PERSISTENT, DEFINES MAX TABLE UNITS |
| ACCESS | ACCESS ALLOWED TO THIS VARIABLE: NONE, READ ONLY, WRITE ONLY, READ/WRITE |
| TYPE | VARIABLE TYPE: INTEGER, OCTET STRING, OBJECT ID |
| INSTANCE VALUE | POINTER TO INSTANCE VALUE STRUCTURE FOR SINGLE VARIABLES |
| INSTANCE ARRAY | POINTER TO ARRAY OF POINTERS TO INSTANCE VALUE STRUCTURES FOR MULTIPLE VARIABLES |

Nth VCT ENTRY:

| |
|---|
| VARIABLE ID = N |
| MAX INSTANCE CTRL |
| PROCESSING FUNCTION |
| VALIDATION FUNCTION |
| MAX INSTANCE |
| ATTRIBUTES |
| ACCESS |
| TYPE INSTANCE VALUE |
| INSTANCE ARRAY |

SAME AS DESCRIBED FOR FIRST ENTRY ABOVE

INSTANCE VALUE STRUCTURE:

| | |
|---|---|
| STUB LEVEL | LEVEL WHERE VARIABLE SHOULD BE STUBBED FOR PROTOTYPING, TESTING, ETC. |
| LENGTH | LENGTH OF THE VARIABLE VALUE: INTEGER = 1; OCTET STRING AND OID = 1-N |
| VARIABLE VALUE ∘ ∘ | UNION OF SUPPORTED VARIABLE TYPES: INTEGER; INTEGER; OID; OCTET STRING |

Fig. 4c

COMMON

| NEXT POLL LIST ITEM | POINTS TO NEXT IN QUEUE (ORDERED BY MATURATION TIME) |
|---|---|
| POLL TYPE | POLL TYPE: TRAP, MONITOR, OR GENERIC |
| POLL VARIABLE | IABS VARIABLE IDENTIFIER OR VARIABLES TO BE POLLED |
| VARIABLE INSTANCE | INSTANCE NUMBER OF VARIABLES TO BE POLLED |
| NEXT TIME | SYSTEM TIME OF NEXT POLL |
| POLL INTERVAL | INTERVAL BETWEEN SUCCESSIVE POLLS |
| LAST TIME | LAST SYSTEM TIME TO POLL |

TYPE SPECIFIC INFORMATION

TRAP INFORMATION:

| ENTERPRISE ID | IABS VARIABLE IDENTIFIER FOR ENTERPRISE |
|---|---|

MONITOR INFORMATION:

| BUFFER | POINTER TO BASE OF DATA MONITOR CIRCULAR BUFFER |
|---|---|
| POSITION | OFFSET TO BASE ACTIVE DATA WITHIN CIRCULAR BUFFER |
| SIZE | SIZE OF DATA MONITOR CIRCULAR BUFFER |
| DATA SIZE | SIZE OF DATA SAMPLED SINCE LAST GET OF MONITOR DATA |

GENERIC INFORMATION:

| PROCESSING FUNCTION | POINTERS TO PROCESSING FUNCTIONS TO BE CALLED AT TIMEOUT |
|---|---|

TRAP POLL TYPE ARRAY

ARRAY OF POLL TESTS:

| CONDITION | TEST CONDITION: =; !=; > OR < |
|---|---|
| TEST VALUE | VALUE OR IABS VARIABLE ID TO BE TESTED AGAINST |
| TRAP NUMBERS | ENTERPRISE SPECIFIC TRAP NUMBER TO BE SENT WHEN TRUE |
| FIRST TRAP VARIABLE | FIRST VARIABLE TO BE SENT WITH TRAP |
| SECOND TRAP VARIABLE | SECOND VARIABLE TO BE SENT WITH TRAP |

4th POLL TEST

SECOND THROUGH FOURTH POLL TEST AS DESCRIBED FOR FIRST POLL TEST ABOVE

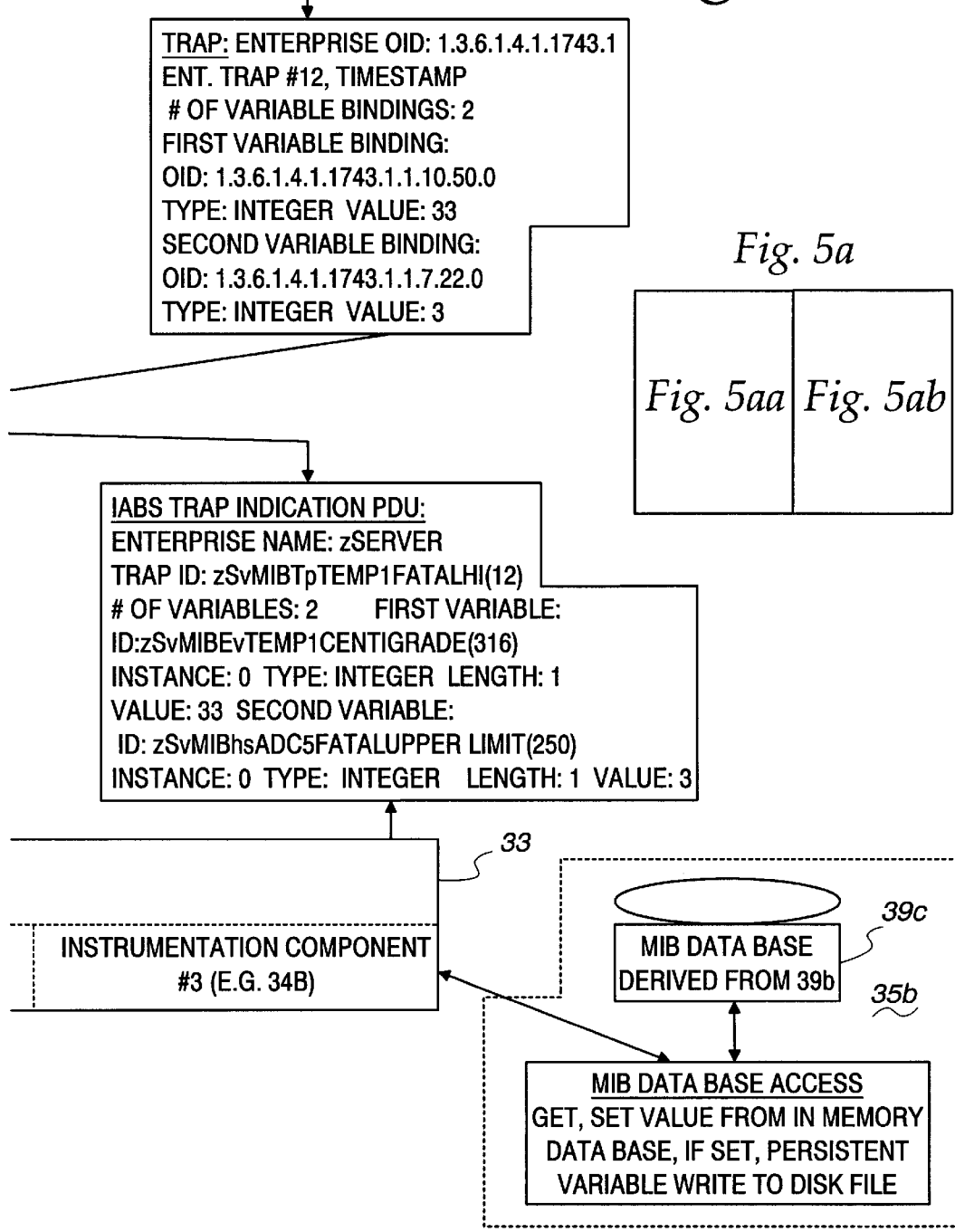

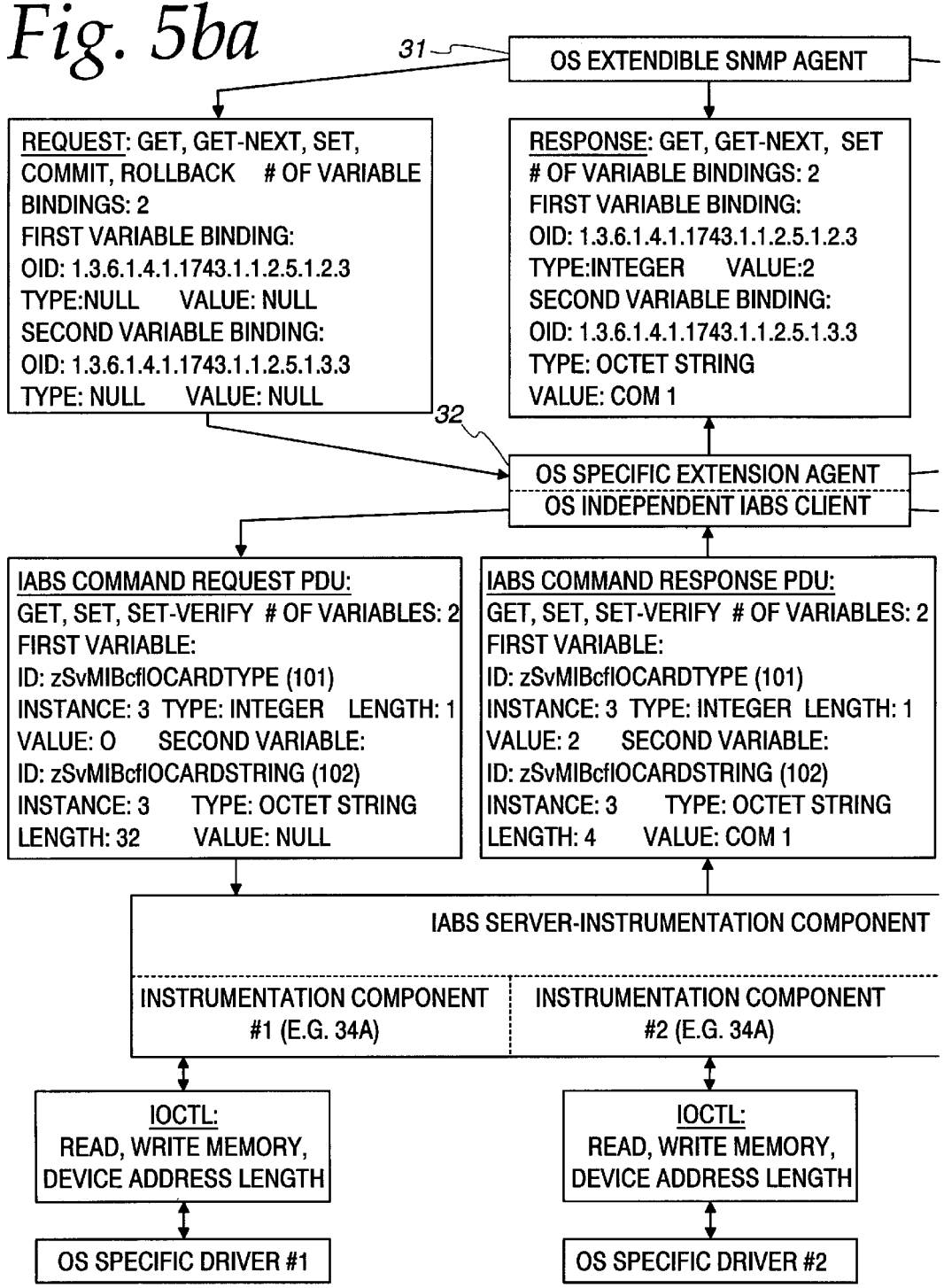

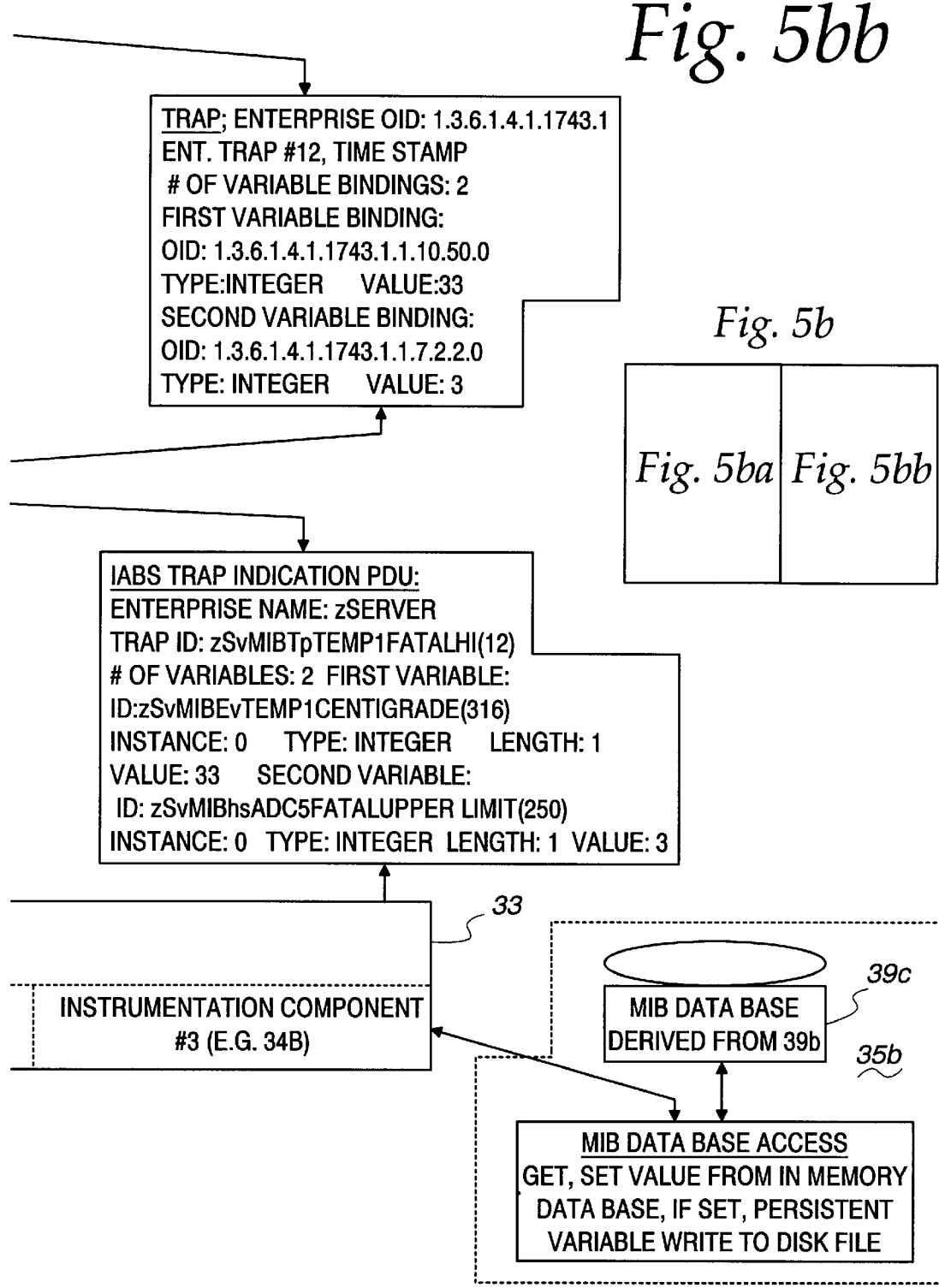

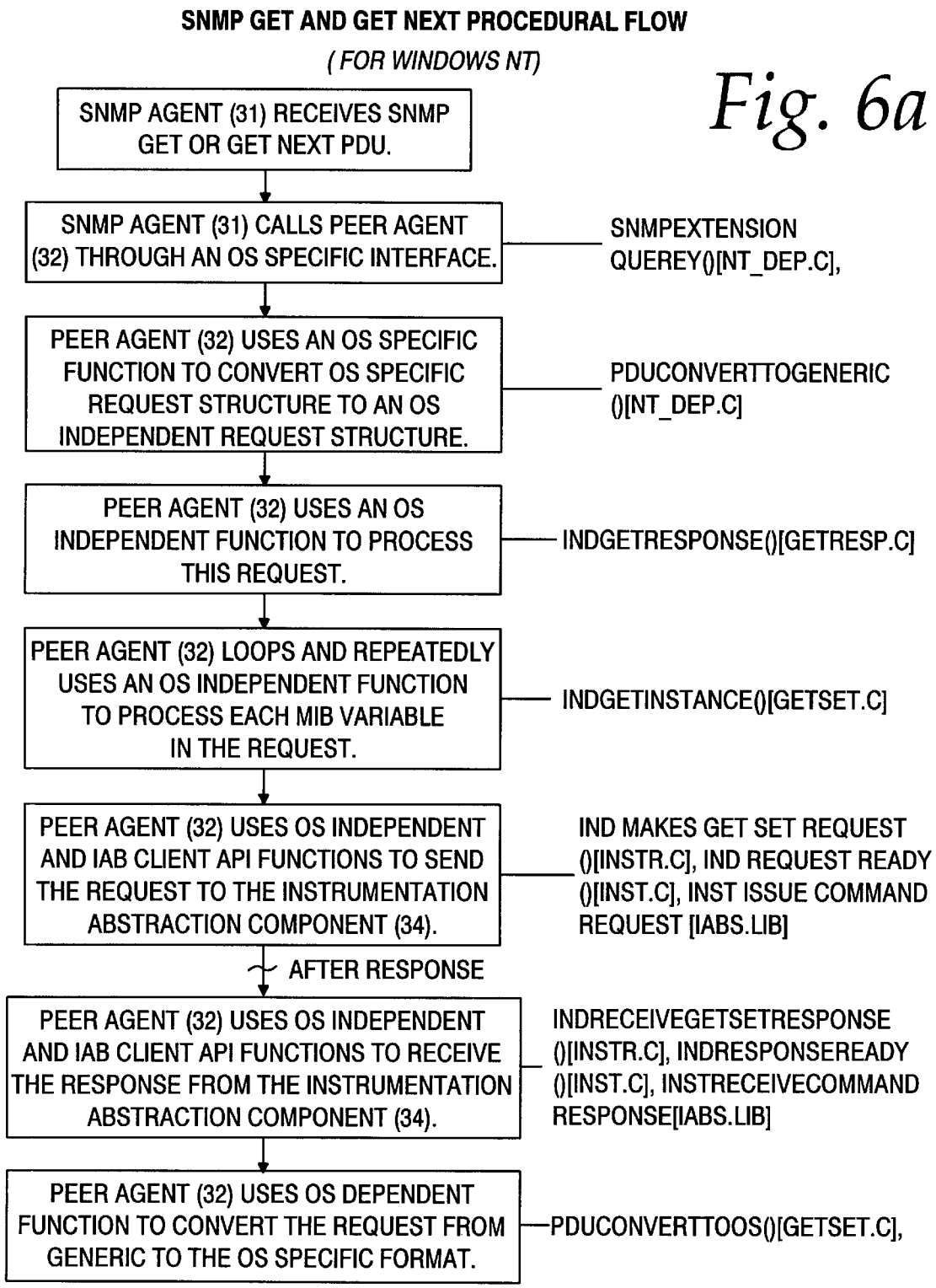

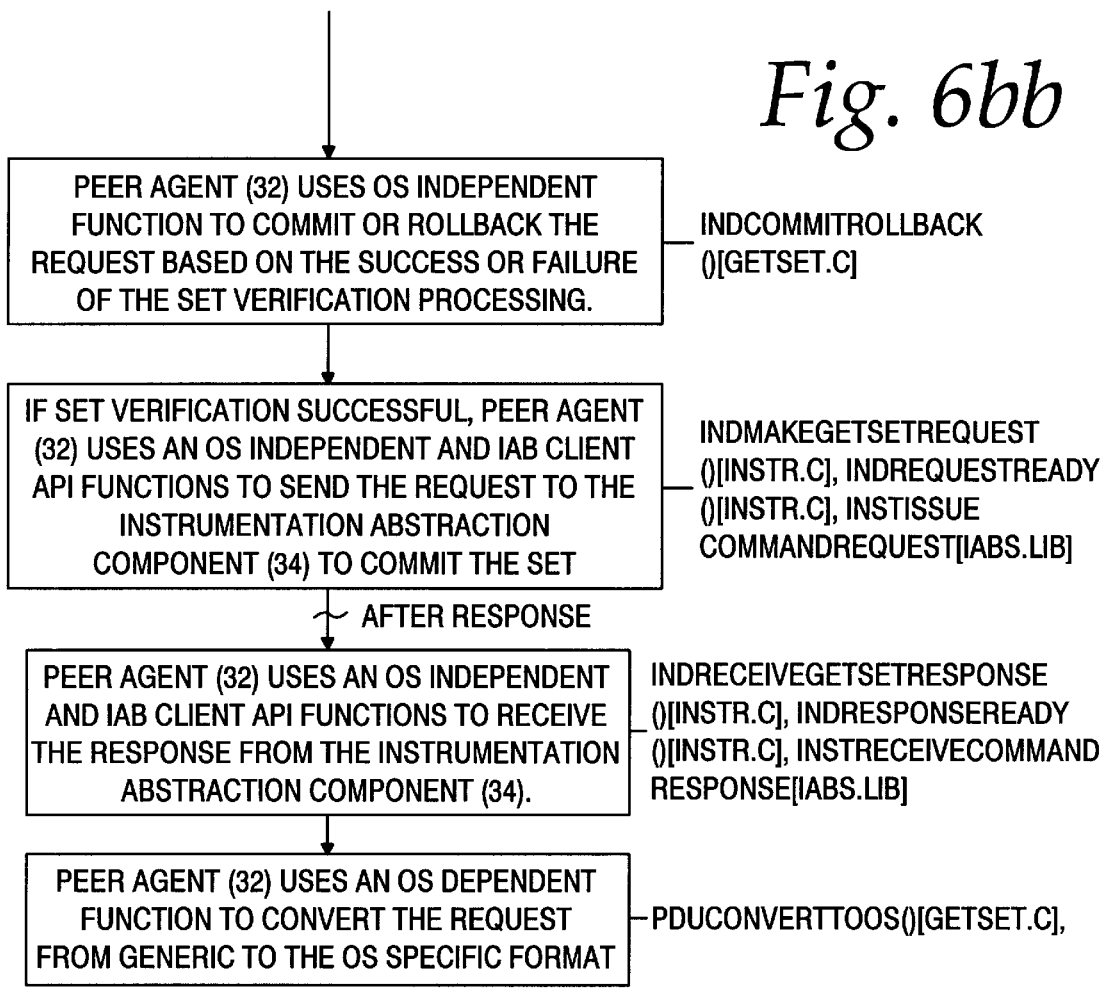
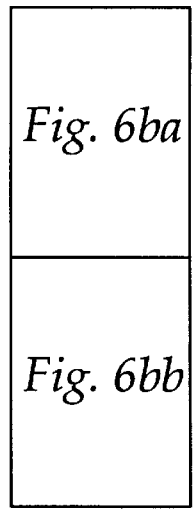
Fig. 6bb

SNMP TRAP PROCEDURAL FLOW
*(FOR WINDOWS NT)*

EXTENDIBLE AND PORTABLE NETWORK PROTOCOL BASED SYSTEM MANAGEMENT ARCHITECTURE

This patent application claims the benefit of Provisional Application Ser. No. 60/017,072 filed on Apr. 30, 1996.

BACKGROUND OF THE INVENTION

1. Field of Use

The present invention relates to network management and, more particularly, to computer system management software which manages computer component operation and performance.

2. Prior Art

In recent years, attention has shifted from the connectivity and interoperability of heterogeneous networks to network management. That is, great attention is being given to keeping track of the devices on a network, checking on the network's performance and diagnosing and correcting problems. Since the late 1980's, the Simple Network Management Protocol (SNMP) has become widely accepted as the protocol of choice for managing TCP/IP based systems. SNMP lets network managers monitor and control network devices and the systems that have SNMP agents, independent of the network topology or complexity.

Implicit in the SNMP model is a collection of network management stations and network elements. Network management stations execute management applications which monitor and control network elements. Network elements are devices such as hosts, terminal servers and the like which have management agents responsible for performing the network management functions requested by the network management stations. The SNMP model is used to communicate management information between the network management stations and the agents in the network elements.

Also, the SNMP model is designed to minimize the number and complexity of management functions realized by the management agent itself which provides the significant advantage of reducing development costs for management agent software necessary to support the protocol. SNMP models all management agent functions as alterations/changes or inspections of variables. Thus, a peer process which implements the SNMP model and supports SNMP application entities present on a logically remote host interacts with the particular management agent resident on the network element in order to retrieve (get) or alter (set) variables.

This mode of operation reduces the number of essential management functions realized by the management agent down to two functions, one function to assign a value to a specified configuration or other parameter and another function to retrieve such a value. The monitoring of network state at any significant level of detail is accomplished primarily by polling for particular information on the part of the monitoring center(s). A limited number of unsolicited messages (traps) are used to guide the timing and focus of such polling.

Management agents have been designed to monitor a greater number of diverse computer system devices having different communication requirements which vary from vendor to vendor. To maintain design flexibility in accommodating vendor requirements, one approach has been to provide an application program interface (API) at the SNMP agent level for implementing peer software or a software extension which communicates with an SNMP agent.

One such agent extension facility is described in a document published by The Santa Cruz Operation, Inc. entitled SCO® TCP/IP SMUX Peer API Programmer's Guide" Document version: 1.0.0b. In this implementation, an SNMP Multiplexing protocol (SMUX) is used as the mechanism for communicating between an SNMP agent and one or more user daemon processes called SMUX peers. Each peer in turn communicates through a proprietary protocol to access information from multi-port serial board software.

While the above approach has provided increased flexibility at a specific level of operation, the peer software still remains operating system specific, thus reducing the ease of porting such software to work in conjunction with other network operating systems. Additionally, in order to extend the utilization of such software in managing other types of computer devices, it still is necessary to rewrite such peer software in order to provide support for such managed devices. Such programming effort can involve substantial resources and require a certain level of expertise to carry out.

Accordingly, it is a primary object of the present invention to provide a system and method characterized by an architecture which can be easily ported enabling such ported software to run on other operating systems and easily extended to operate in conjunction with new computer devices or instrumentalities.

BRIEF SUMMARY OF THE INVENTION

The above objects and advantages of the present invention are achieved in a preferred embodiment of a network management architecture for inclusion in any one of a number of different types of server and network operating systems. The network management architecture includes a plurality of modules organized to communicate over a plurality of different interfaces in a manner which maximizes reuse, ease of porting and device expansion. In an embodiment for a UNIX type network operating system, a first module daemon process termed a peer agent is designed to communicate both with a local extendible SNMP agent over an operating system specific interface (e.g. SMUX) utilizing a first type of standard protocol and with a second instrumentation module daemon process over an independent application programmable interface (IABS) using a second type of protocol. The second type of protocol is designed to use a small set of non-operating system specific instrumentation commands and a unique set of control data structures implemented in one embodiment through an instrumentation abstraction (IABS) library facility. The use of an abstraction interface allows a user to develop new client software without requiring any knowledge of implementation details relating to the mechanisms or specific data structures being used in managing the actual server system instrumentation data and server hardware components.

In the UNIX type network operating system, the peer agent implemented as a daemon (client) process performs the function of managing the hardware specific information on configured server systems at the local SNMP level. The instrumentation module daemon (server) process in turn manages a number of server specific instrumentation component modules configured in the server system which are responsible for directly managing the hardware specific information on the server system at a common application level interface which is below the local SNMP level.

By confining the peer agent to operate within the confines of the above two interfaces, the peer agent is able to be partitioned into operating specific and generic module components for performing operating system functions and generic functions as required for operating in conjunction with several different types of network operating systems. Also, the establishment of the two interfaces reduces the number of network operating system specific components contained in the peer agent down to those for performing a few functions. This greatly facilitated the ease of porting the peer agent to operate in conjunction with such network operating systems. Also, the creation of a common application level interface to perform local monitoring of MIB variables, SNMP trap management and other non-driver instrumentation tasks minimized and reduces the complexity of client components which operatively couple to the second type of interface. The instrumentation daemon component and instrumentation components collectively form an abstraction instrumentation module.

In the preferred embodiment, the instrumentation component communicates with the number of instrumentation specific component modules over a third low level interface called a component interface. Each component module is specifically designed to communicate with a particular server hardware component and manage a particular set of MIB variables associated therewith. The component interface is organized for instrumentation expansion which is able to provide instant SNMP agent support for new instrumentation components simply by plugging the particular instrumentation component into the system and adding to the MIB, a subset of objects associated with the instrumentation component in a standard manner. The component interface by distributing the above discussed functionality between the abstraction component and the instrumentation components allows for local and remote access.

In operation, the instrumentation daemon component process listens and sends on an available TCP network port to exchange units of information known as Protocol Data Units (PDUs) with a peer agent client process and a local console facility client process. The instrumentation daemon process listens for and responds to IABS interface requests received from its clients to get or set server database variables contained in a conceptual database and described with a hierarchical collection of Object Identifiers (OID) in a file called a Management Information Base (MIB). The actual implementation of this conceptual database stores variable values in hardware registers, disk resident files and memory resident data structures.

In the preferred embodiment, the client processes communicate with the instrumentation abstraction component through client API functions contained in the abstraction library facility which in turn invoke particular socket based functions for transferring appropriately constructed protocol data structures (PDUs) containing the required data and commands through the sockets mechanism of the particular network operating system to the abstraction component. The socket based functions create the appropriate control protocol data structures and format the data contained therein according to predefined definitions in addition to sending them across the IABS interface via the network operating system sockets mechanism. Also, the standard sockets library of the particular network operating system has been extended to include functions for communicating the control protocol data unit structures through the network operating system's sockets mechanism.

Through the use of instrumentation commands, associated library function modules and unique set of control protocol data unit structures, the system provides a simplified interface in which the complexities of the network operating system mechanism remains encapsulated to within a few specific components. As indicated above, this facilitates the development of new client applications.

Other features of the architecture of the present invention include the following. The abstraction component includes a mechanism for enabling user defined local polling of SNMP MID variables. Since such polling can be done locally, this eliminates the need to incur network overhead. It also enables the data collected from such polling to be retrieved in bulk via a single SNMP request. Additionally, the abstraction component includes a trap table mechanism which provides a user with the capability of creating user definable SNMP traps. Further, the abstraction component includes a centralized mechanism for enabling the multi-level isolation, test and simulation of functionality through the use of stubbed values.

The above objects and advantages of the present invention will be better understood from the following description when taken in conjunction with the accompanying drawings.

BRIEF DESCRIPTION OF THE DRAWINGS

FIG. 1 is a functional block diagram of a system which includes a server system which incorporates the architecture and software components of the present invention.

FIGS. 4a through 4c illustrate the different data structures utilized by the instrumentation abstraction component of FIG. 1.

FIGS. 5a and 5b illustrates the overall processing flow of requests through the architecture of the present invention.

FIGS. 6a through 6c illustrate in greater detail, the SNMP command procedural flow of FIG. 5.

DETAILED DESCRIPTION OF THE INVENTION

Figure 2A:
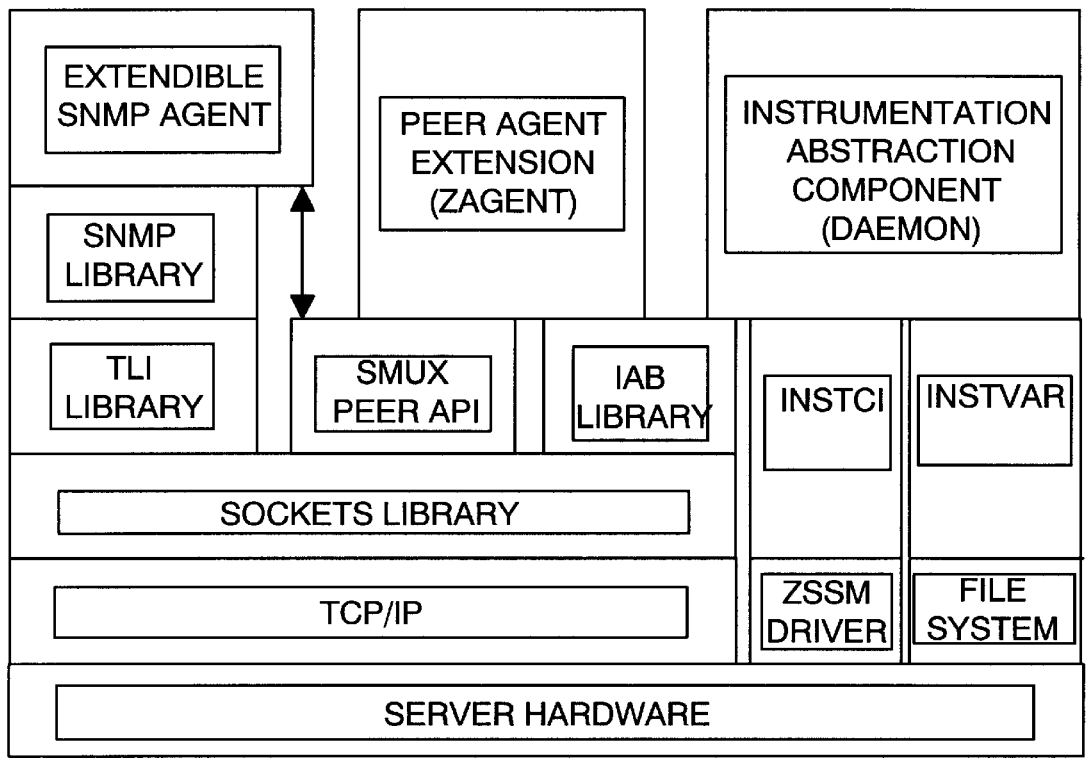
FIGS. 2a through 2c are software layer diagrams illustrating the utilization of the present invention in different network operating system environments.

FIG. 1 shows a typical network configuration in which a remote system 20 interconnects via a internetwork 24 to a server system 30 as indicated. The remote system includes a remote network management workstation 22 containing standard SNMP network management software such as ISM Manager software developed by Bull HN Information Systems Inc., NMS software developed by Novell Inc. or SMS Windows NT software developed by Microsoft Inc. The workstation 22 during the execution of simple network management protocol (SNMP) client software sends requests to and receives responses from server system 30 through internetwork 24 via the TCP/IP protocol suite.

As discussed above, SNMP is a well known asynchronous request/response protocol used in systems management applications which provides the following four operations: (1) get which is used to retrieve specific management information; (2) get-next which is used to retrieve via traversal, management information; (3) set which is used to manipulate management information; and, (4) trap which is used to report extraordinary events. For more information regarding the SNMP protocol, reference may be made to the Internet standard RFC1157 published by the Internet Activities Board or to the text entitled "The Simple Book An Introduction to Management of TCP/IP based Internets" by Marshall T. Rose, published by Prentice Hall, copyright 1991.

As illustrated in FIG. 1, server system 30 includes an extendible SNMP agent component 31 which operatively couples to network 24 and exchanges network management information with workstation 22. The SNMP agent component 31 operatively couples to peer agent extension component 32a through a network operating system specific interface. The peer agent extension component 32a (client) operatively couples to an instrumentation abstraction (IABS) library facility 37 and to the network operating system's sockets mechanism for communicating with a module 33. As indicated, module 33 includes instrumentation abstraction (IABS) component 34 and instrumentation components 34a and 34b. In a similar manner, a second client component which corresponds to local console facility 32b operatively couples to the IABS interface. The facility 32b utilizes a graphical interface provided by a server system console 42. That is, a user communicates with the client facility 32b through the console keyboard 42a and mouse device 42b of server system 30. While FIG. 1 represents the graphical interface as being associated with the server hardware 36, such a graphical interface may be provided by another server system which is connected remotely via a TCP/IP sockets facility. In fact, this is the case when server system 30 is being operated with a NetWare SNMP Services Interface.

As shown, the IABS abstraction component 34 operatively couples to an instrumentation component interface for communicating with instrumentation components 34a and 34b. The instrumentation component 34a communicates with driver component 35a. The driver component 35a in turn communicates with the different hardware components of server hardware platform 36. The similarly constructed database instrumentation component 34b communicates with a file system 35b which provides access to an internal MIB database file described herein. While only two instrumentation components are shown in FIG. 1, it will be appreciated that additional components may be added as indicated by the series of dots.

In the preferred embodiment, the agent component 31 may be considered conventional in design and may take the form of any one of three standard extendible agents, such as the UNIX type SNMP agent described in the above mentioned publication of The Santa Cruz Operation, Inc. entitled "SCO® TCP/IP SMUX Peer API Programmer's Guide" Document version: 1.0.0b dated Feb. 21, 1993, the Windows NT SNMP agent described in the publication entitled "Microsoft Windows/NT SNMP Programmer's Reference" by Microsoft Corporation dated Jul. 22, 1992 or the NetWare SNMP agent described in the publication entitled NetWare SNMP Services Interface Developer's Guide" by Novell Inc., May 1993 Edition.

It will also be noted that the agent component 31 operatively couples to the MIB module 39a which describes various "objects" in a tree structure. This actual coupling is operating system dependent. Under SCO UNIX operating system, support for MIB-II defined objects are hard coded into the SNMP extendible agent. While under the Microsoft Windows NT operating system the same support is provided in a Microsoft supplied peer agent extension. The MIB-II is described in the document entitled "Management Information Base for Network Management of TCP/IP based internets: MIB-II", RFC 1213, published on March, 1991. The MIB database 39a contains descriptions of those objects which are expected to be implemented by managed nodes running the TCP/IP Internet protocol suite. For example, such objects include objects for the managed node itself, network attachments, the Internet Protocol, the Transmission Control Protocol, the User Datagram Protocol, the Simple Network Management Protocol, etc.

As discussed, the agent component 31 communicates over a first type of interface which is an operating system specific interface. As indicated in FIG. 1, this interface is different for each different network operating system. For example, for the UNIX type of operating system marketed by Santa Cruz Operations, Inc., the specific interface is socket based (i.e. TCP/IP sockets). The socket based interface of the server system of the preferred embodiment, uses a first type of protocol corresponding to a SNMP Multiplexing (SMUX) protocol designed for use with a user process known as a SMUX peer which exports a MIB module by initiating a SMUX association to; the agent component 31, registering itself and later processes management operations for objects contained in the MIB module 39a. The interfaces used with NetWare and Windows NT SNMP agents are structured differently and require extension agents have registered callback functions.

SMUX Protocol

The SMUX protocol involves the following simple sequence of operations. The SNMP agent component 31 listens for incoming connections. When started, the SMUX peer initiates a socket connection. Upon establishing a socket connection, the SMUX peer issues an OpenPDU request to initialize the SMUX association. If the agent component 31 declines the association, the SMUX peer issues a closePDU response and closes the connection. If the agent component 31 accepts the association, no response is issued.

For each subtree defined in a MIB module that the SMUX peer wishes to register or unregister, the SMUX peer issues a RReqPDU request. This causes the agent component 31 to respond by issuing a RRspPDU response in the same order as the RReqPDU request was received. When the SMUX peer wishes to issue a trap, it issues an SNMP Trap-PDU request. When the agent component 31 receives the trap request, it transmits to the remote workstation 22 which had been previously configured to be sent traps. When the agent component 31 receives an SNMP get request, get-next or set request from workstation 22 and the particular request includes one or more variables within a subtree registered by a SMUX peer, the agent component 31 sends an equivalent SNMP PDU containing only those variables within the subtree registered by the particular SMUX peer. When the SMUX peer receives such a PDU, it applies the indicated operation and issues a corresponding get-response. The agent component 31 then correlates the result and propagates the resulting get-response to the workstation 22. When either the agent component 31 or the SMUX peer wants to terminate the SMUX association, it issues a ClosePDU request and the connection is closed. The Windows/NT and NetWare SNMP agents provide different mechanisms to integrate and interface to extension agents which are described in the above referenced documents.

Peer Extension Agent Component 32a

As discussed above, in accordance with the teachings of the present invention, the traditional peer extension agent is organized in a highly modular fashion wherein it comprises an extension agent component 32a and an instrumentation abstraction component 34 which communicate through IABS interface via functions contained in library 37 and the sockets mechanism of the particular the network operating system. The peer agent component 32*a* also has access to MIB component 39*b* which is discussed later herein.

The peer agent component 32*a* is designed to operate within the confines of the network operating system specific interface and the abstraction which enabled its partitioning into operating specific and generic module components for performing operating system functions and generic functions as required for operating with above mentioned types of network operating systems. The operating system specific (dependent) component contains modules which perform the required initialization and termination sequences with SNMP agent component 31, receive SNMP requests from and send SNMP responses to the SNMP agent component 31, send SNMP traps to SNMP agent component 31, convert OS specific request PDUs into OS independent request PDUs, convert OS independent response PDUs into OS specific response PDUs, convert OS independent trap PDUs into OS specific trap PDUs, convert OS specific trap PDUs into OS independent trap PDUs and perform process initialization and termination including any required agent register and deregister functions in addition to the logging of process information. Such conversion or translation is carried out using appropriate data structure definitions contained in a particular SNMP agent file (snmp.h).

The peer agent operating system independent (independent) component of agent component 32*a* contains modules which receive SNMP requests from the operating system specific component, validates such requests and then forwards them to instrumentation abstraction component 34 for further processing. The independent component also receives SNMP responses and traps from the component 34 and sends them to the agent specific component which formats and transmits them to SNMP agent 31. SNMP agent 31 forwards the traps via network 24 to the remote network management station 22. Additionally, the independent component of agent component 32*a* also contains modules for reading the peer agent's component 32*a* configuration file and a Managed Object Syntax (MOSY) compiler produced definitions file.

Instrumentation Abstraction Library Component 37

Each of the instrumentation clients (i.e. peer Agent extension component 32*a* and local console facility 42) are provided with equal access to the instrumentation component 34 through the functions contained within IABS library 37. As indicated above, abstraction component 34 uses the sockets mechanism of each network operating system to interface with its client components and used the network operating system specific device driver interface to interface with system instrumentation driver components (e.g. driver component 35).

As shown, library 37 is organized into three major sections which correspond to a common section, a client section and a server section. The common section is used by both client components 32*a* and 32*b* and the instrumentation abstraction component 34 and includes the procedures for implementing the functions Send_PDU() and Get_PDU(). The client section is used by client components 32*a* and 32*b* and includes procedures for implementing the functions InstCallForComponent() through InstDisconnectComponent(), iabs_cmd_connect(), and iabs_accept_trap_connect(). The server section is used by the instrumentation abstraction component 34 and includes procedures for implementing the functions iabs_trap_connect(), iabs_accept_cmd_connect() and Create_Port_File().

The client library functions enable client components to connect to the abstraction component 34 at assigned port. The abstraction component 34 produces an IABS port file that each client component must read to determine the assigned port to connect. The common library functions enable client components and abstraction component 34 to create the appropriate protocol data structures (PDUs) according to predefined meanings, format the data contained therein and send and receive such PDUs across the socket interface of the particular operating system. These functions are described in greater detail in Appendix I.

Instrumentation Abstraction Component 34

As described earlier, the Instrumentation Abstraction component 34 is used to manage the hardware specific information on server hardware 36 in addition to file system 35*b*. This involves maintaining MIB variables described in Enterprise MIB 39*b* which correspond to such hardware specific information. Such information is organized into a number of different sections within the MIB 39*b*. For example, descriptions of the following types of information are stored in different sections. System information (e.g. model name of the computer), processor configuration information (e.g. numerical count of the number of configured CPUs in the system), processor performance information (e.g. numerical count of the number of CPU subsystem statistical sets available for performance monitoring), processor board information (e.g. numerical count of the number of CPU expansion boards in the system) and memory information (e.g. numerical count of the number of memory subsystems in the system). Also, stored is devices information (e.g. numerical count of the total number of physical I/O slots in the system, drives information (e.g. numerical count of the number of drive bays provided by the system model's cabinet, power supplies (e.g. numerical count of the number of power supplies in the system), parallel/serial ports (e.g. numerical count of the number of parallel/serial ports configured on the system base board), environment information (numerical value of the system's first cabinet temperature as read from an analog to digital converter), maintenance information (e.g. general purpose I/O port data register used for monitoring system status), firmware loads (e.g. numerical count of the number of BIOS firmware loads for the embedded devices in the system and history information (e.g. the number of uncorrectable memory errors that have occurred prior to the last zSvMIBpMemRed trap). An example of these types of MIB variables information are given in Appendix II.

When operating in an UNIX type of network operating system, component 34 is a daemon process which listens and sends on an available TCP port for exchanging PDUs with client components 32*a* and 32*b* after an instrumentation abstraction connection has been established with the peer agent extension component 32*a* daemon process. A data file specified as a first argument when the component 34 is first invoked or started up, is read by the instrumentation abstraction component 34 to obtain initial values for selected MIB variables. Another file is used to communicate the TCP port to be used for IABS connections with the client component 32*a* and the local console facility client component 32*b*. Subsequently, the client component 32*a* establishes an instrumentation abstraction connection with component 34. Instrumentation component 34 polls selected MIB variables described in MIB 39 for potential traps and sends trap PDUs to the client component 32*a* when any trap condition has occurred.

The instrumentation component 34 listens for and responds to IABS requests to "get" or "set" MIB 39*b* variables from client components 32a and 32b. In order to access most MIB 39b variables, the instrumentation component 34 utilizes the Instci component 34a to issue ioctl requests to the server management instrumentation driver component 35a. When a user has selected a persistent MIB variables to set, the instrumentation component 34 utilizes the Instvar component 34b to write the updated value to the data file. Additionally, component 34 includes facilities which support user defined traps and data monitoring. These facilities allow specific MIB 39b variables to be polled at frequent intervals without incurring the network overhead which would be required to perform such polling activity from a remote network manager. A predetermined maximum (e.g. four) of separate user defined traps and separate predetermined maximum (e.g. four) of user defined data monitors can be concurrently active. Specific variables have been defined in the MIB 39b to provide this functionality. Appendix II provides more specific details concerning how SNMP traps and user traps are defined within MIB 39b.

Figure 2B:
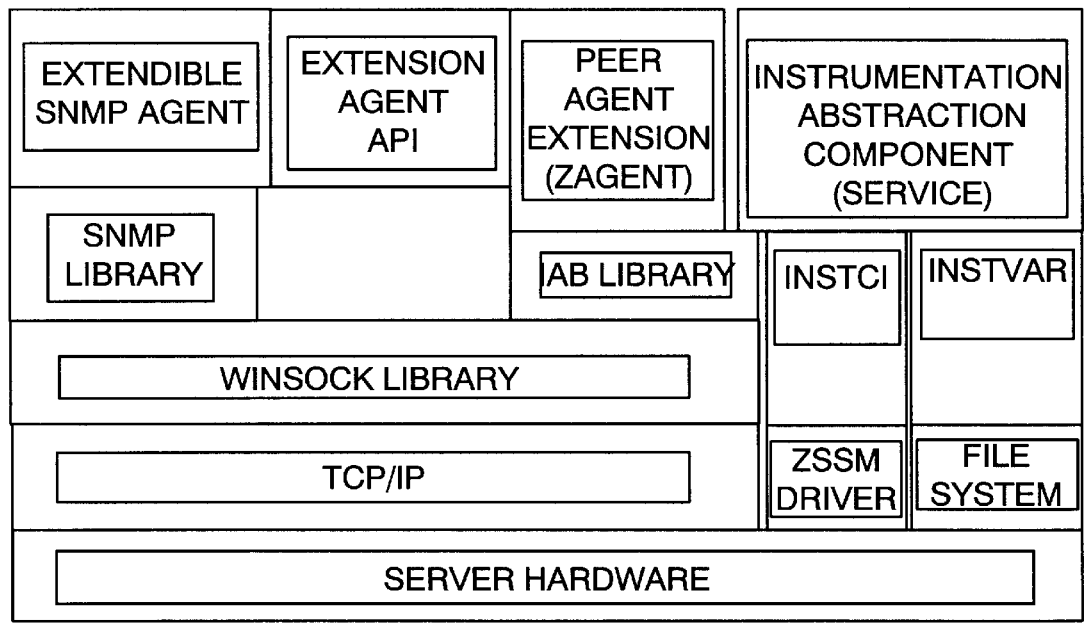
Figure 2C:
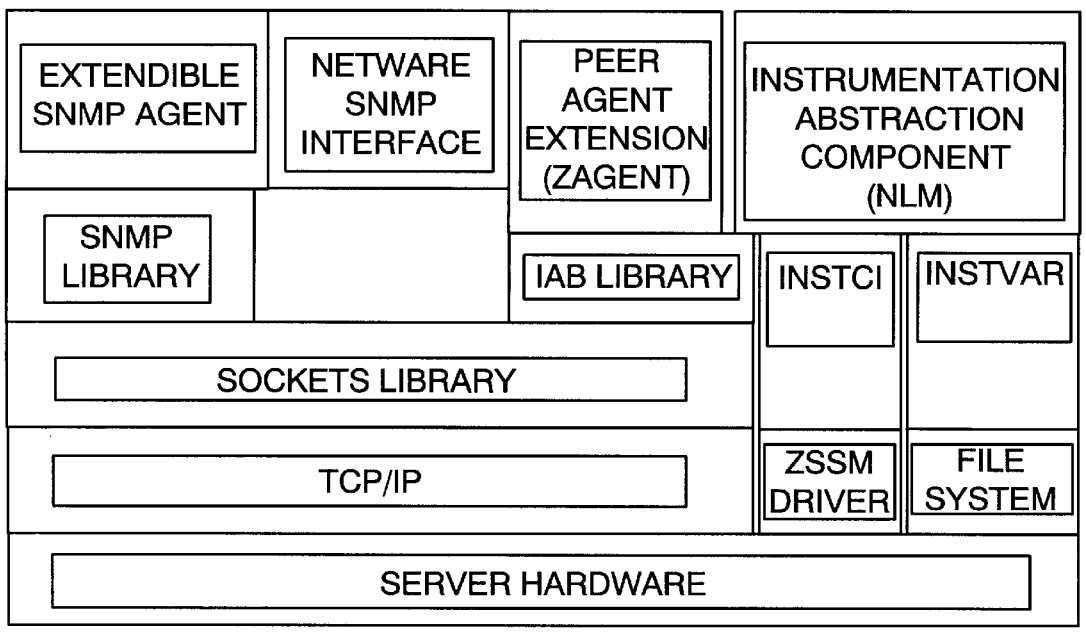

Server System Layering FIGS. 2a through 2c

FIGS. 2a through 2c illustrate the different system software layers utilized in server system 30 and their relationships to each other on each of the different network operating systems according to the teachings of the present invention. FIG. 2a illustrates the software layer arrangement when the architecture of the present invention is operating in a UNIX type network operating system environment. FIG. 2b illustrates the software layer arrangement when the architecture of the present invention is operating in a Windows NT network operating system environment. FIG. 2c illustrates the software layer arrangement when the architecture of the present invention is operating in a NetWare network operating system environment.

From a comparison of the different software layer arrangements of FIGS. 2a through 2c, it is seen that the only differences pertain to how the extendible SNMP agent 31 communicates with peer agent extension 32. As indicated, in the UNIX type system environment, peer agent extension 32 communicates with extendible SNMP agent 31 via a SMUX peer API which uses TCP/IP sockets. In the Windows NT operating system environment, peer agent extension 32 communicates with the extendible SNMP agent 31 through a simple callback API. Similarly, in the NetWare operating system environment, peer agent extension 32 communicates with the extendible SNMP agent 31 through a NetWare SNMP interface. Thus, it seen that the software layer architecture of the present invention operates with both sockets and API interfaces.

Figure 3A:
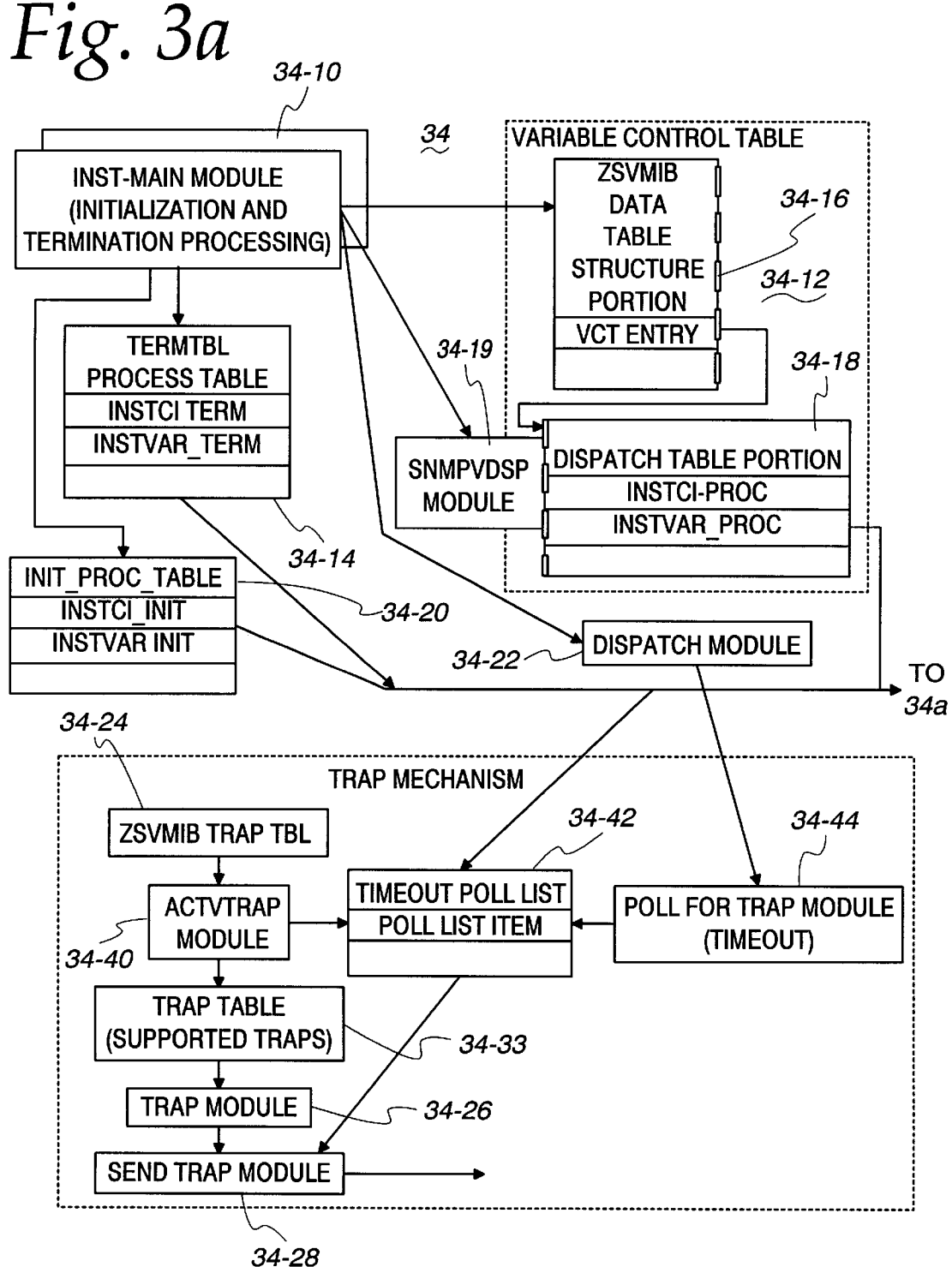
FIG. 3a shows in greater detail, the different component modules of the instrumentation abstraction component of FIG. 1.

Detailed Description of Instrumentation Component 34 Organization—FIG. 3a

FIG. 3a illustrates the overall organization of component 34 in terms of showing its major module components. As shown, the major components of component 34 include an inst_main module 34-10, a plurality of trap modules 34-24 through 34-44 which collectively comprise a trap mechanism, a dispatch module 34-22, a variable control table 34-12 having a MIB data table structure portion 34-16 and a dispatch table portion 34-18, an initialization process table structure 34-20, a SNMPVDSP module 34-19 and a termination process table structure (termtbl) 34-14 which are arranged as shown. As indicated by the dotted lines in FIG. 3a, the different fields of data table portion 34-16 and dispatch table portion 34-18 are contained within variable control table 34-12 which is illustrated in greater detail in FIG. 4b.

The MIB module 34-16 is used to create tables of information (database) that component 34 uses to manage every variable in MIB 39b. More specifically, the building of the MIB database 34-16 by component 34 is done off-line using scripts. The MIB information is compiled and processed into a file which is loaded onto server system 30 during the installation process. When component 34 is started up, it reads the MIB information into memory for future use in processing requests.

The trap mechanism modules handle those operations relating to the monitoring of fixed conditions established by "hard coding" or by a user defined MIB variables to detect over and under threshold conditions which are established in accordance with entry structures contained in a trap table 30-34 which define what conditions are to be monitored by component 34. The trap table 30-34 is created or built by compiling the values contained in a file zmibtrap.tbl included within activate trap module 34-40. The table contains an array of structures zsvmib_trap wherein there is one such structure for each trap that component 34 supports. The trap structure is described in greater detail in Appendix III.

The activate trap module 34-40 when started up or activated, builds a trap poll item and queues it in the timeout poll list 34-42. Information in this list is used to manage which MIB variables are polled as well as the time interval between polls. Client components of the Instrumentation Abstraction Component 34 indicate their ability to handle traps when they establish their connection with the Instrumentation Abstraction Component 34. Client 32a indicates its ability to accept traps by providing the specific port for the Instrumentation Abstraction Component 34 to establish its trap connection with the client. Client 32b (Local Console Facility) does not provide any trap connection port thereby indicating that traps are not supported.

When dispatch module 34-22 signals the expiration of a select timer, it activates poll for trap module 34-44 which polls MIB variables described in the poll list items contained in the timeout poll list 34-42. The poll list item is processed using the test conditions therein. When the results of a test conditions indicates an over or under threshold condition exists, trap module 34-26 invokes send trap module 34-28 which creates an appropriate trap PDU (i.e. initializes certain data fields in the PDU data structure) which is forwarded by component 34 to all active trap connection sockets.

The inst_main module 34-10 carries out the initialization and termination functions which define the startup conditions and clean up conditions for the individual instrumentation components 34a and 34b of FIG. 1. Component 34 does not perform this initialization directly but calls other components (i.e. components 34a and 34b) to perform their own setup operations during initialization and cleanup operations upon termination. Component 34 uses initialization process table 34-20 and termination process table 34-14 in carrying out such functions.

More specifically, the tables 34-20 and 34-14 are hard coded to contain function call entries associated with each instrumentation component with which it interfaces. In the server system 30, as indicated in FIG. 3a, tables 34-30 and 34-14, each contains two entries, one designating Instci instrumentation component 34a initialization function and another designating Instvar instrumentation component 34b initialization function. At startup, component 34 references table 34-20 and makes calls to the specified component functions to perform their own specific startup/initialization operation. Similarly, upon termination, component 34 references table 34-14 and makes calls to the designated components functions to perform their own cleanup operations. This arrangement enables component 34 to accommodate additional instrumentation components without having to make any modifications.

After initialization and prior to termination, component 34 processes set and get requests relating to specific MIB 39b variables which are dispatched by dispatch module 34-22 to the appropriate instrumentation component. More specifically, dispatch module 34-22 calls such components with the IABS appropriate variable identification value so that it can get the appropriate variable information for component 34 which in turn passes it back to the SNMP agent 31. As indicated in FIG. 3a, dispatch module 34-22 uses dispatch table portion 34-18 of variable control table 34-12 which is populated by each instrumentation component at initialization time. That is, during initialization, when inst_main module 34-10 invokes init processing table 34-20 to call each instrumentation component to perform its own setup operation, such instrumentation component takes the opportunity to populate the dispatch table portion 34-18 with function entries designating the MIB 39b variable or subset of variables for which it has management responsibility. During run time, component 34 then calls these component functions to process the particular MIB 39b variable as designated by such variable control table entries. As explained herein, dispatch table portion 34-18 of variable control table 34-12 is organized to contain a unique processing function entry for each MIB 39b variable as described in greater detail with reference to FIG. 4b.

For further details relative to the initialization of instrumentation component interface, reference may be made to the description contained in an Appendix IV.

Instrumentation Component 34 Data Structures

In carrying out above functions in processing client requests, instrumentation component 34 utilizes the several different types of data control structures, some of which were discussed above. The first control structure is the IABS PDU data structure of FIG. 4a which contains the command and data sent or received over the sockets mechanism by the instrumentation component 34. The second data control structure is the IABS variable control table entry structure of FIG. 4b which defines the collection of different fields of the variable entries stored in the MIB data table portion 34-16 and dispatch table portion 34-18 of the variable control table 34-12. The third data structure is a poll list item structure of FIG. 4c which defines the different fields of the poll entries of timeout poll list table 34-42 used by trap mechanism of instrumentation abstraction component 34 to control the polling for traps invoked at the expiration of a select timer.

Figure 4A:
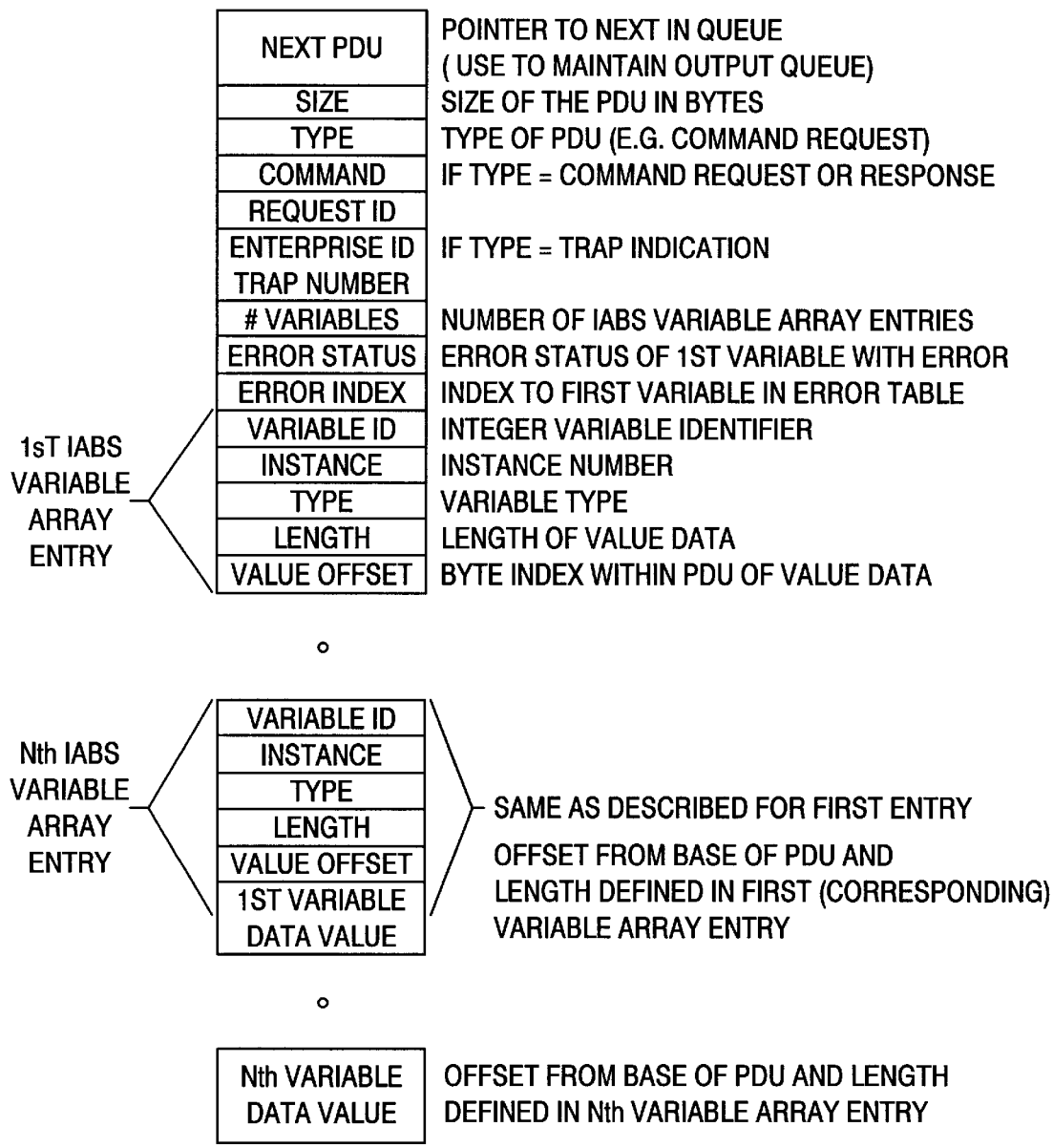

As mentioned above, the three structures are shown in greater detail in FIGS. 4a through 4c. FIG. 4a illustrates the different fields and format of the PDU data structure which is received by component 34 and acted upon as explained herein. FIG. 4b illustrates the fields and the format of each IABS variable control table structure entry stored in data table structure 34-12 of FIG. 3a. FIG. 4c illustrates the format of the each poll list item entry stored in timeout poll list table structure 34-42. These structures will be discussed in greater detail herein.

Detailed Description of Instrumentation Component 34a

Figure 3B:
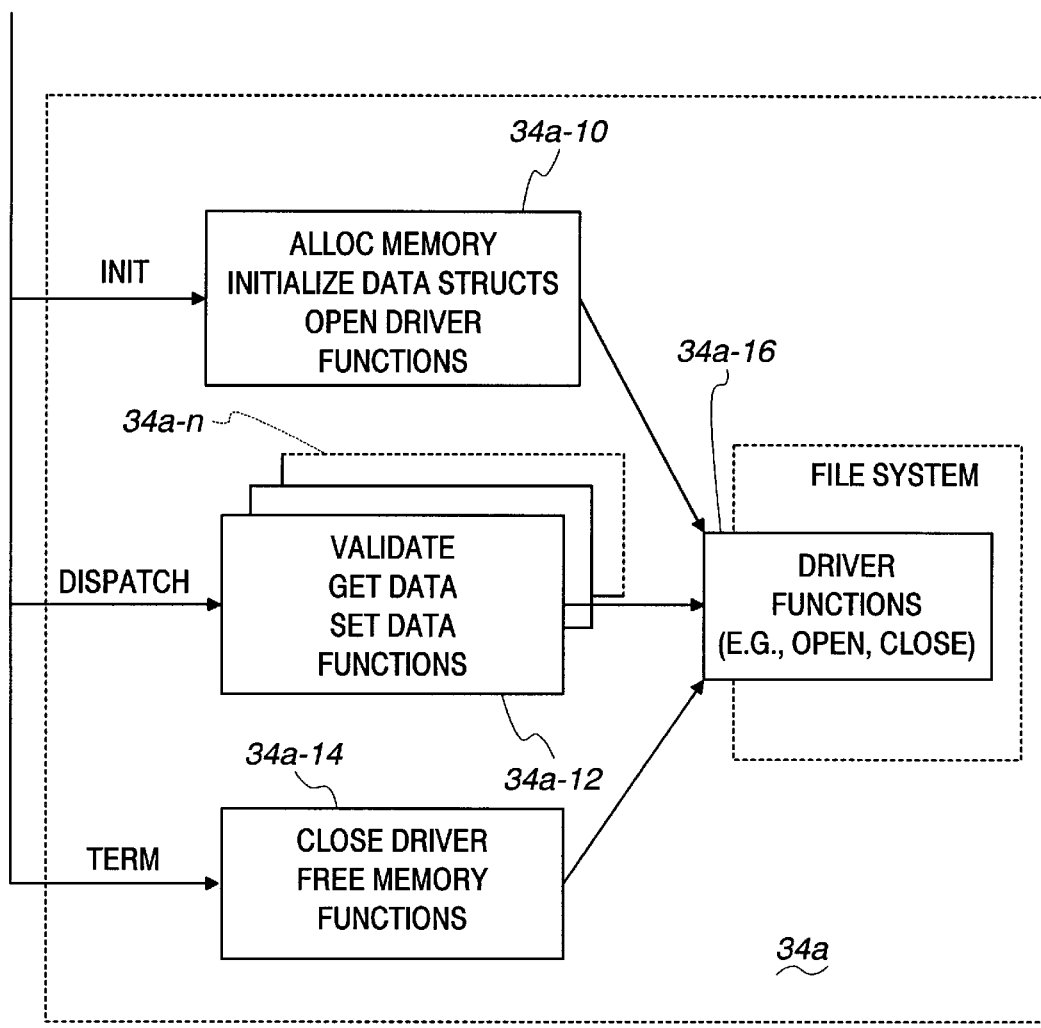
FIG. 3b shows in greater detail, the different component modules of the instrumentation components of FIG. 1.

FIG. 3b illustrates in greater detail, the organization of a typical component 34 which augments component 34 in managing specific MIB 39b variables relative to satisfying SNMP queries (i.e. SET_CMD, GET_CMD). As indicated in FIG. 1, component 34a processes queries relating to specific MIB variables (objects) by calling driver component 35a. Component 34b can be considered to be similarly organized but handles MIB variables by calling a file system 35b.

As indicated in FIG. 3b, component 34a includes several groups of modules 34-10, 34-12 and 34-14 for performing the indicated functions. Each group of modules are invoked by specific functions contained in component 34. More specifically, when component 34 is performing initialization, it activates the group of modules 34a-10 comprising the instci_init function which perform the operations of allocating memory, initializing data structures and opening the device driver 34a-16 associated therewith via an operating system specific open type function call. At termination, component 34 calls the group of modules 34a-14 comprising the instci_term function which perform the operations of freeing or deallocating memory and closing the device driver 35a via an operating system specific close type function call.

During operation, component 34 calls the group of modules 34a-12 via its dispatch module to process those MIB variables which the variable control table indicates that component 34a has responsibility. A similar group of functions are provided for processing each different section of MIB variables (e.g. processor CPU related MIB variables, Network Operating System MIB variables).

Component 34a invokes a validation function which performs an additional validation after component 34 has performed a general (generic) validation. If the MIB variable is valid, component 34a operates to obtain the requested MIB variable data by invoking driver operating system specific ioctl type function 34a-16. Component 34a obtains the data and returns it to component 34 which in turn returns it back to SNMP agent.

DESCRIPTION OF OPERATION

With reference to FIGS. 1 through 7g, the operation of the present invention will now be described. FIGS. 5a and 5b diagramatically illustrate the components which define the overall architecture of the present invention along with the overall flow and character of requests that passes through the different interfaces of server system 30. FIG. 5a illustrates the processing of a single instance variable value while FIG. 5b illustrates the processing of a multi-instance variable value. Since the differences in the figures reside mainly in the type of variable being processed, the operations are explained with reference to FIG. 5a.

As indicated, at the SNMP agent level, there are three different types of command requests (i.e. Get, Get-Next, Set) which are mapped into five types of command requests (i.e. Get, Set, Set-Verify, Commit, Rollback). The Get-Next command is eliminated by having included a facility for MIB browsing in peer agent 32 which allows the command to be processed by translating the command into a series of Get commands. Also, facilities are included in the peer agent 32 which enables the Commit and Rollback commands to be processed at that level.

It will be noted that at the SNMP agent level, the variables being processed are identified by OIDs which are long tree structure (hierarchical) sequences of integers. Peer agent 32 includes functions for translating each such sequence into a single simple variable identifier. This operation greatly facilitates the processing of such variables.

By way of example, it is assumed that two variables are received as part of a Get command request. This command request is processed by the peer agent 32 as mentioned above and causes the formulation of an IABS command request PDU as shown. This allows the command request to be passed across the IABS interface by invoking the appropriate IABS library functions which in turn invoke the particular network operating system's interprocess communications mechanism (i.e. sockets) to accomplish the actual transfer between the peer agent 32 and IABS instrumentation component 34.

The component 34 passes a Get command request for each variable in the PDU to the instrumentation component which is designated as having management responsibility for that MIB variable. The instrumentation component issues an ioctl command to its OS specific driver or file system or other to obtain the current value for the MIB variable. When the instrumentation component has obtained the current value (e.g.. 7) for all the variables in the PDU, it passes it back to component 34. As indicated, component 34 generates an IABS command response PDU. Component 34 passes the command response across the IABS interface to peer agent 32 by invoking the appropriate functions contained in the IABS library and the socket mechanism. As indicated, the peer agent 32 translates the command response variables back into the format supported by SNMP agent 31 and passes the SNMP response containing the variables to SNMP agent 31.

Figure 5A:
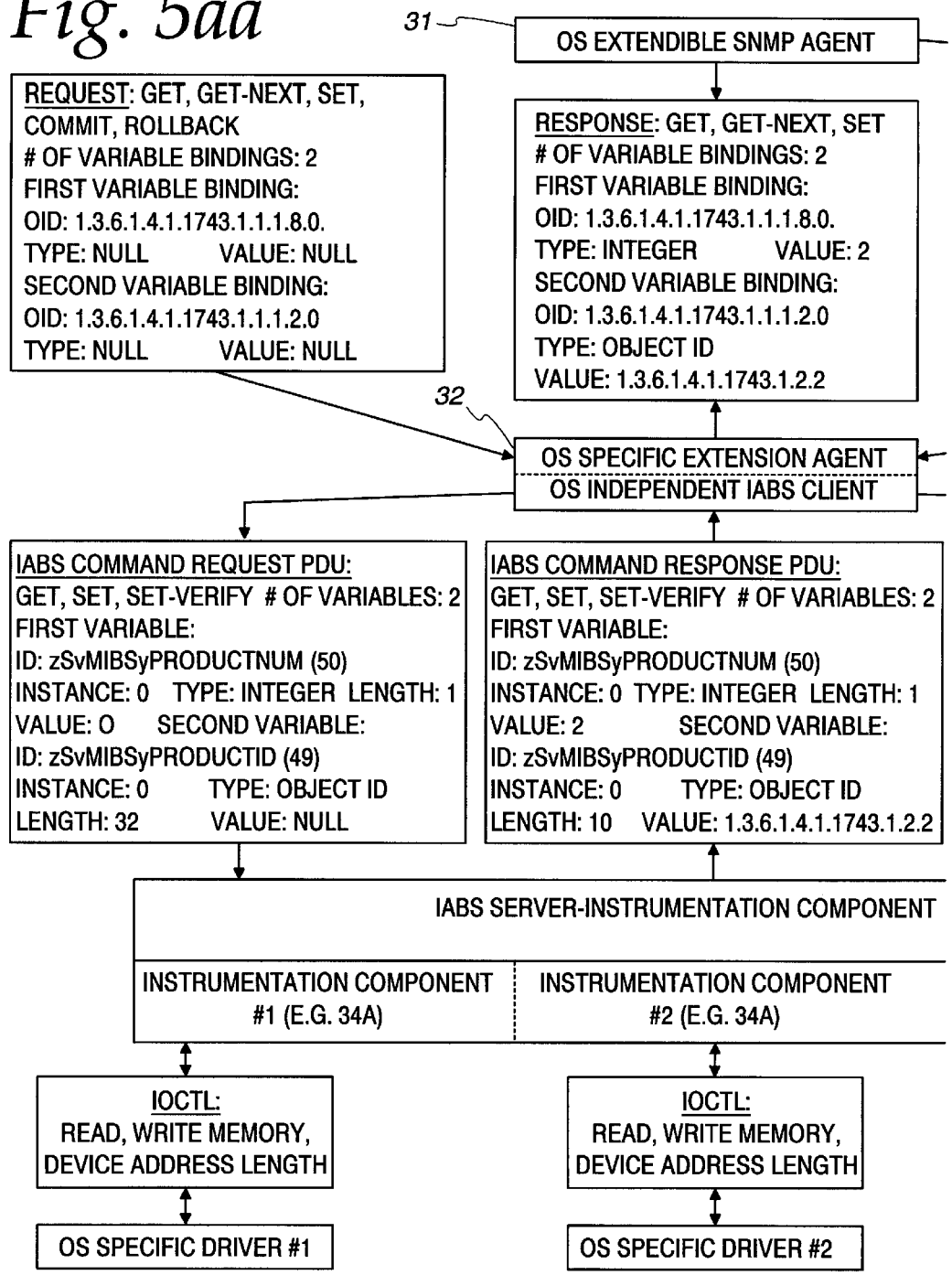

FIG. 5a also illustrates the flow for a trap which proceeds in parallel. This is initiated by component 34 when a particular variable being monitored is detected as having exceeded a specific threshold. When this occurs, component 34 generates an IABS Trap Indication PDU which it sends across the IABS interface to the peer agent 32 in the same manner as described. Peer agent 32 translates the variables into the format supported by SNMP agent 31 and passes the SNMP trap to SNMP agent 31 as indicated.

Figure 6B:
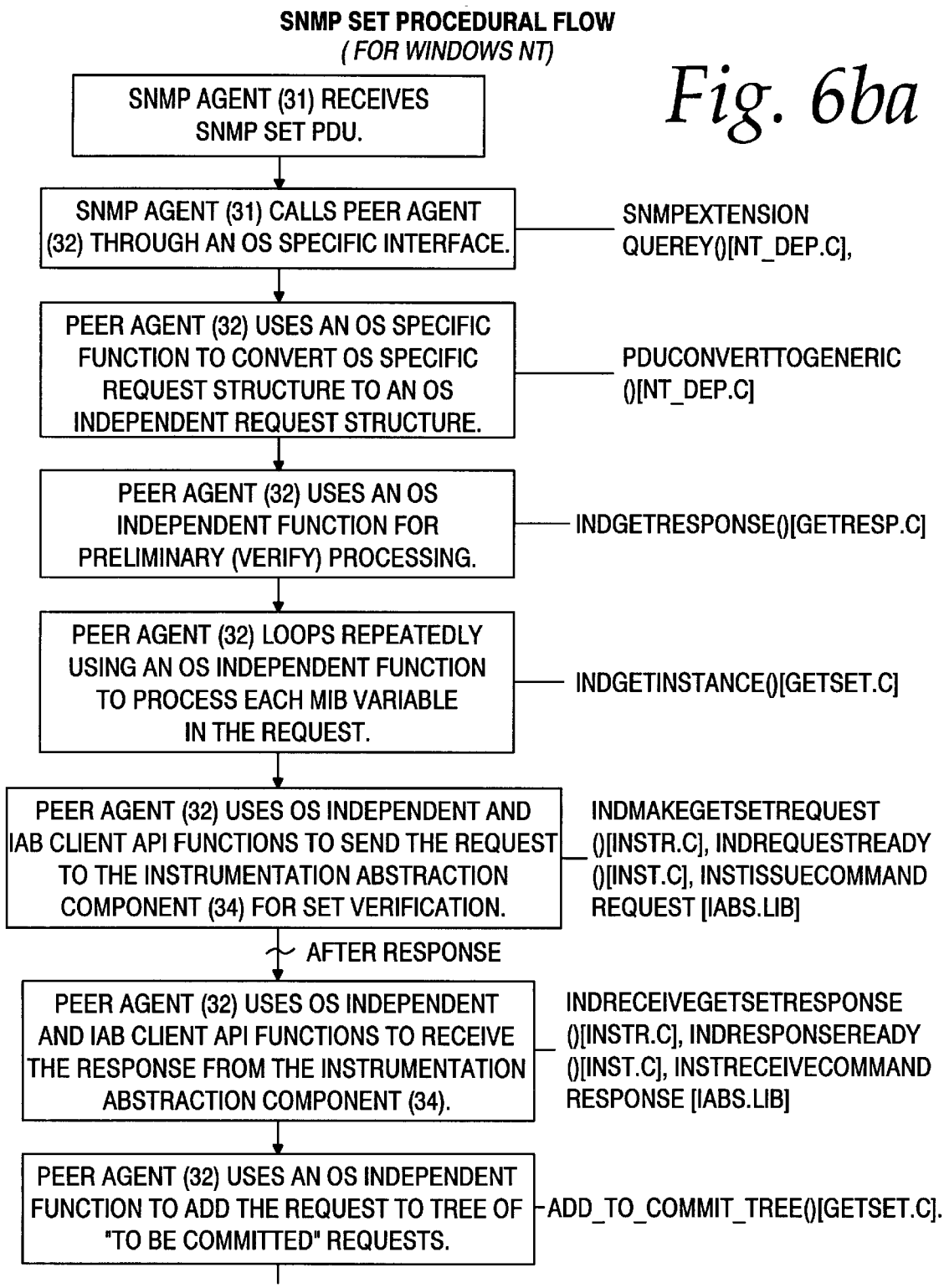

The actual operations performed by the different components of FIGS. 5a and 5b will now be considered in greater detail with reference to FIGS. 6a through 7g. FIGS. 6a through 6c illustrate the operations performed by peer agent 32 in processing SNMP command requests. By way of example, the flow illustrated is that executed when the architecture of the present invention is being used in the Windows NT network operating system environment illustrated in FIG. 2b. This environment was selected for ease of illustration. The sequence of operations performed by peer agent 32 is carried out by the functions designated on the right side of each of the FIGS. 6a through 6c. The IND designation is used to indicate that the operations are being performed by an operating system independent function and the name appearing in brackets indicate the module containing that function (e.g. nt_dep.c).

Figure 6C:
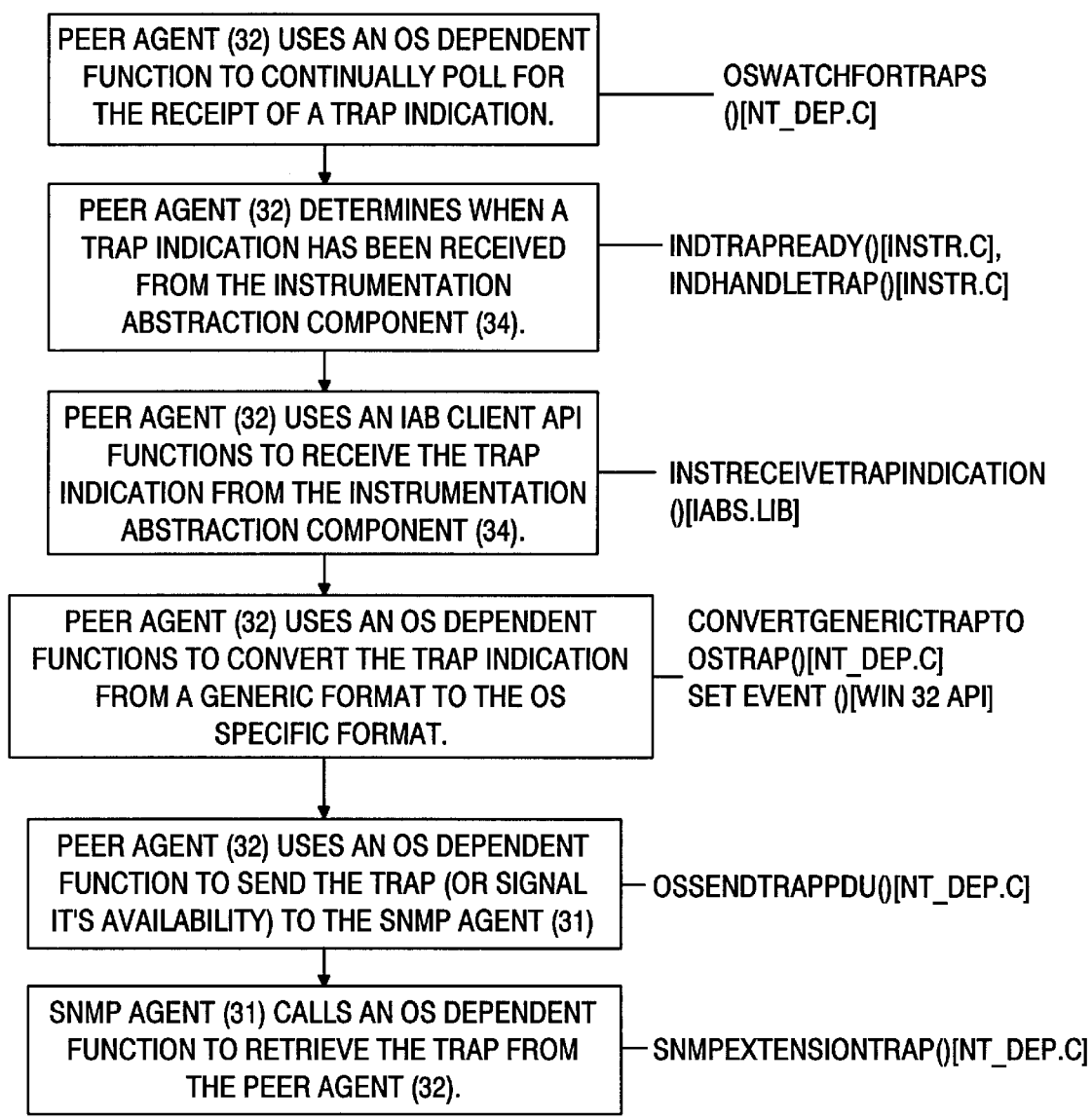

FIG. 6a illustrates the specific sequence of operations performed by peer agent 32 in processing an SNMP Get and Get Next command request. FIG. 6b illustrates the specific sequence of operations performed by peer agent 32 in processing an SNMP Set command request. FIG. 6c illustrates the specific sequence of operations performed by peer agent 32 in processing an SNMP trap.

FIGS. 7a through 7g

Figure 7A:
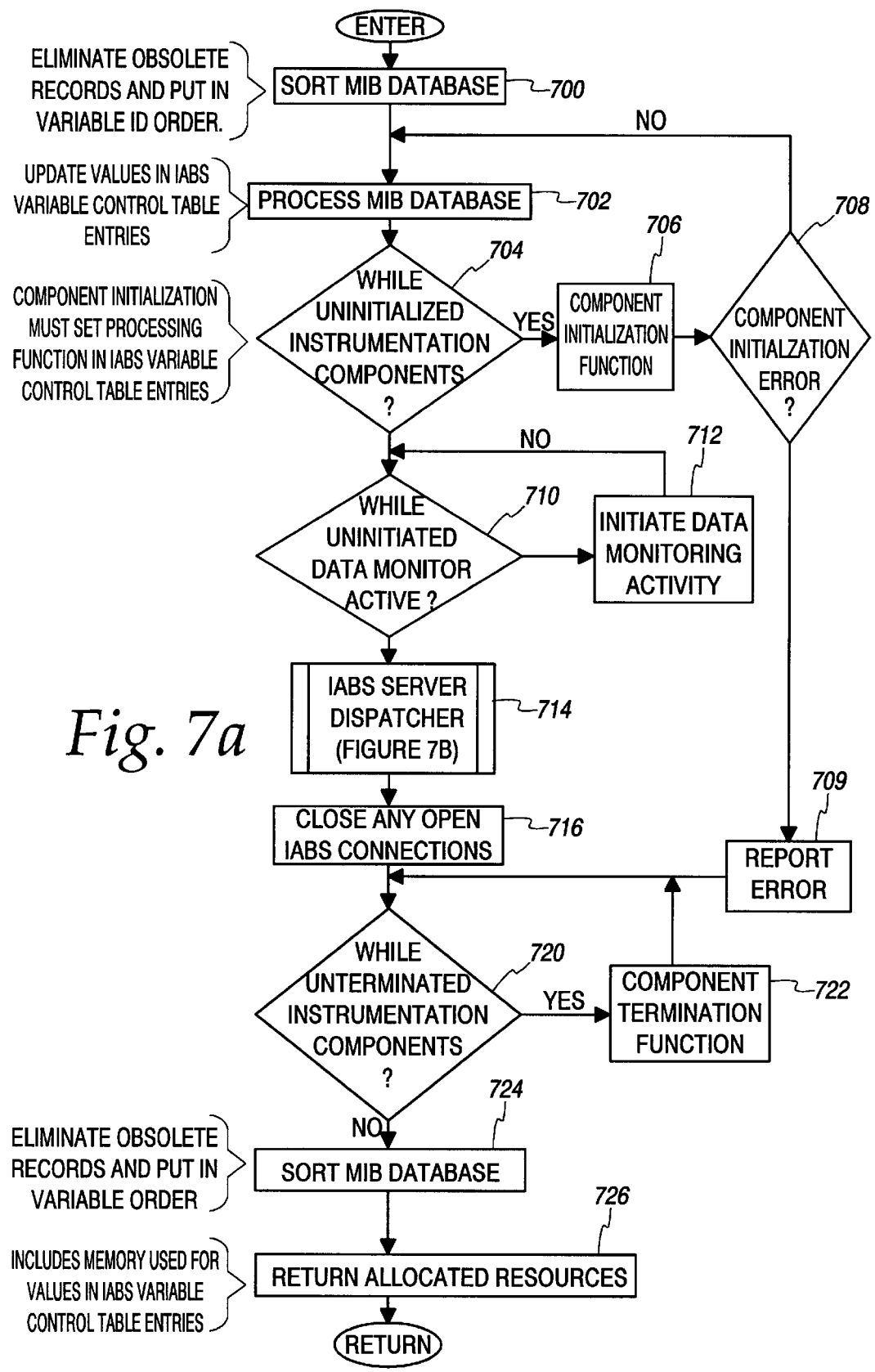
FIGS. 7a through 7g illustrate the operational flow of the different modules of the instrumentation abstraction component of FIG. 1.

The basic sequence of operations performed by IABS component 34 will now be described with reference to the flow charts of FIGS. 7a through 7g. FIG. 7a illustrates the sequence of operations performed by the inst_main module 34-10 of FIG. 3a during initialization and termination operations.

As indicated in FIG. 7a, module 34-10 of FIG. 3a sorts the MIB database built by component 34 as part of the startup process using the information stored in enterprise MIB 39b of FIG. 1 (i.e. block 700). This operation eliminates obsolete records and organizes records in variable Id order. Next, module 34-10 processes the MIB data base by updating values in the IABS variable control entries of table structure 34-16 of FIG. 3a (i.e. block 702).

As indicated in block 704, module 34-10 initializes the different instrumentation components 34a and 34b of server system 30. As indicated in block 706, by invoking the component initialization function of each of the components 34a and 34b designated by the init entries previously stored in the INIT_PROC_TABLE 34-20 of FIG. 3a. When so invoked, this provides each instrumentation component with an opportunity to set its processing function pointer value into the processing function field of each entry contained in the IABS variable table structure 34-16 which is formatted as shown in FIG. 4b.

Figure 7B:
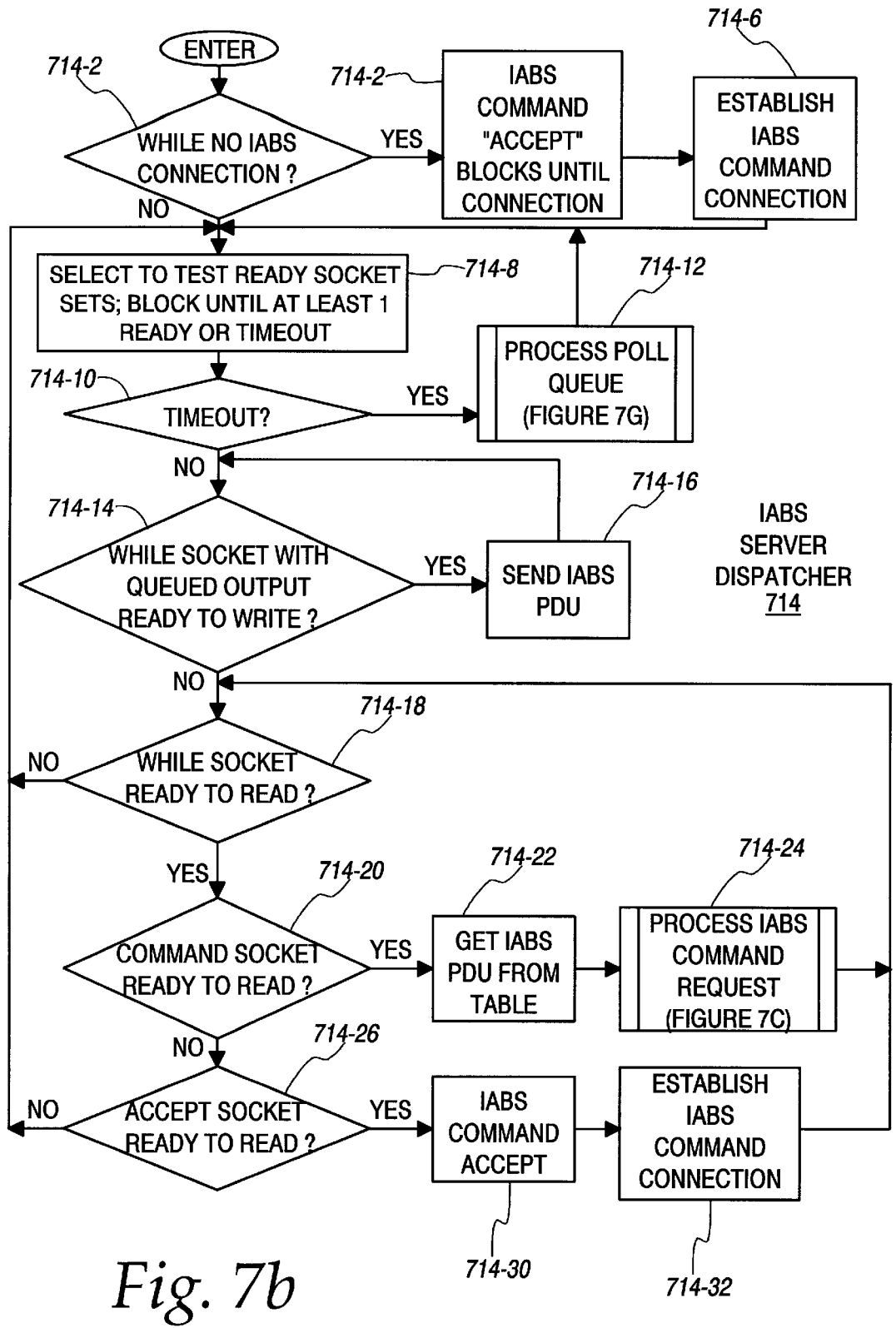

When initialization is performed by each inst component without error (i.e. block 708, inst-main module 34-10 next determines if data monitoring is active (i.e. block 710). If it is, inst-main module 34-10 initiates the data monitoring activity (i.e. block 712). When no further data monitoring activity needs to be initiated, module 34-10 invokes the dispatch module 34-22. The sequence of operations performed by dispatch module 34-22 are illustrated in FIG. 7b.

As shown, module 34-22 determines if there is an IABS connection (i.e. block 714-2). If there is not, then module 34-22 invokes a socket accept command function (iabs lib) and blocks until the socket connection is established with peer agent 32 (i.e. block 714-6). Next module 34-22 makes a select socket system call (invokes the select function-iabs lib) to determine whether a command request has been sent by peer agent 32 as indicated by the command socket being ready to read, whether the command socket is ready to write a queued command response, whether the trap socket is ready to write a queued trap indication or whether the interval for the next poll queue item has elapsed. The module 34-22 remains blocked until at least one socket ready is received or until a timeout occurs (i.e. block 714-8).

Figure 7C:
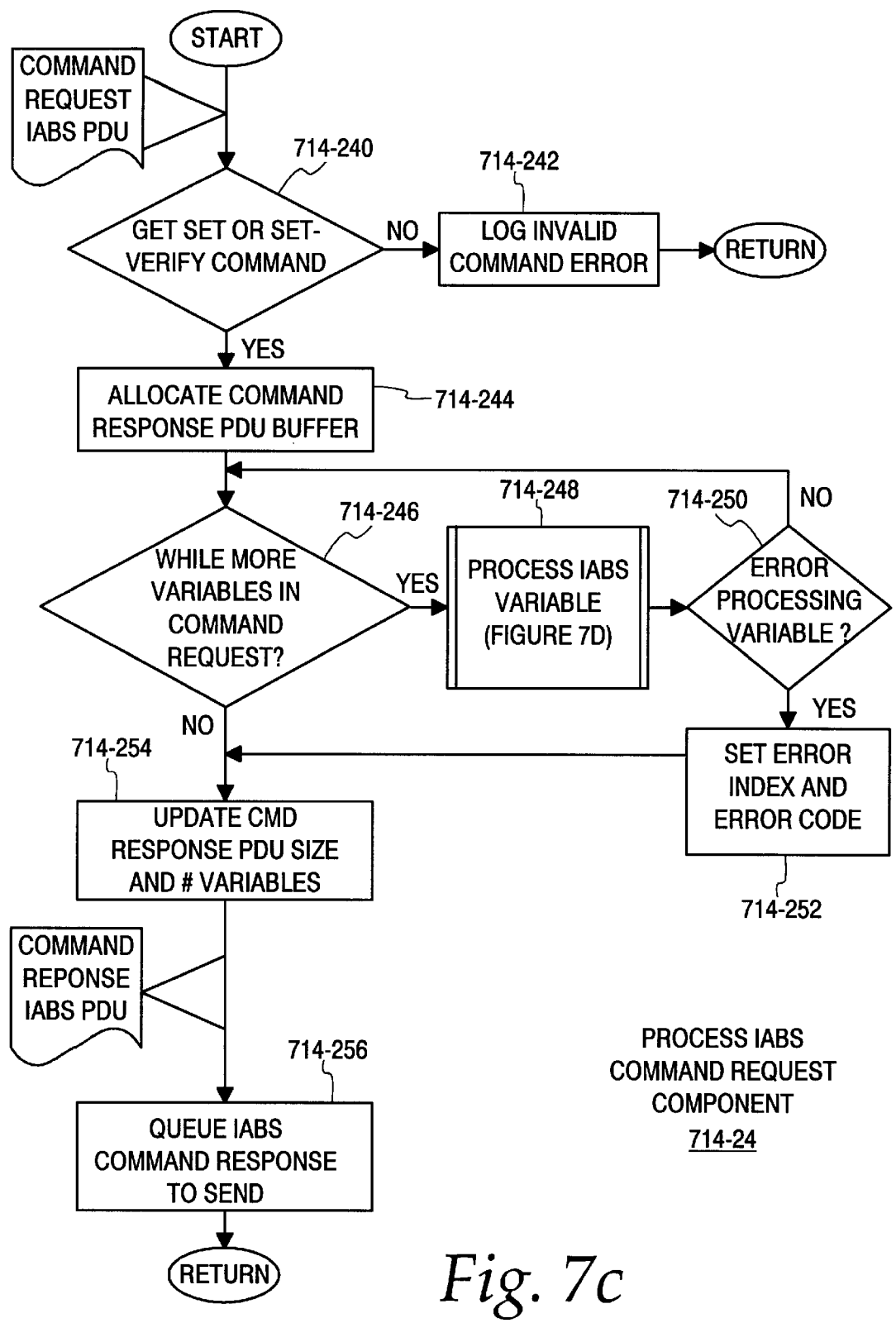
Figure 7D:
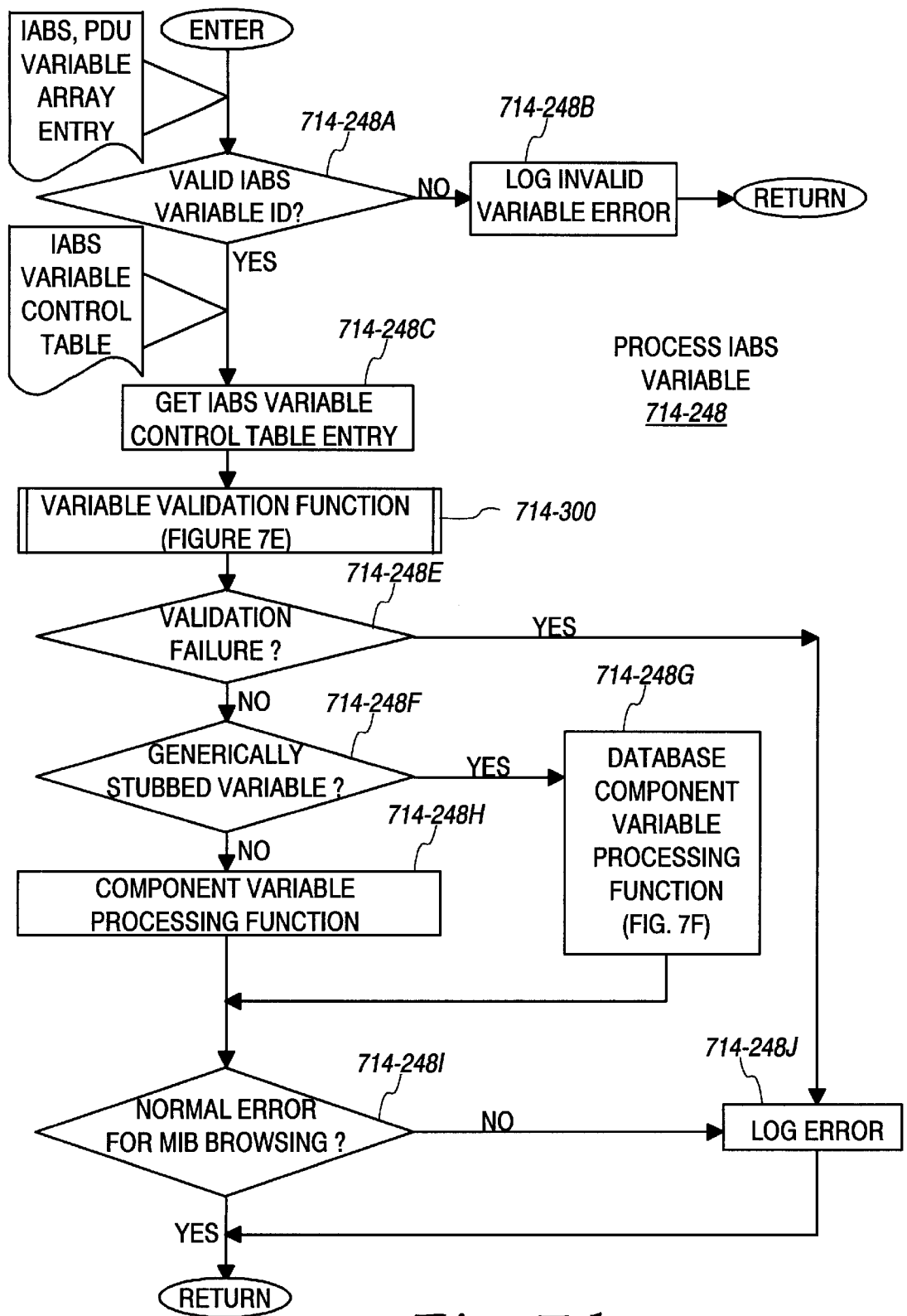
Figure 7E:
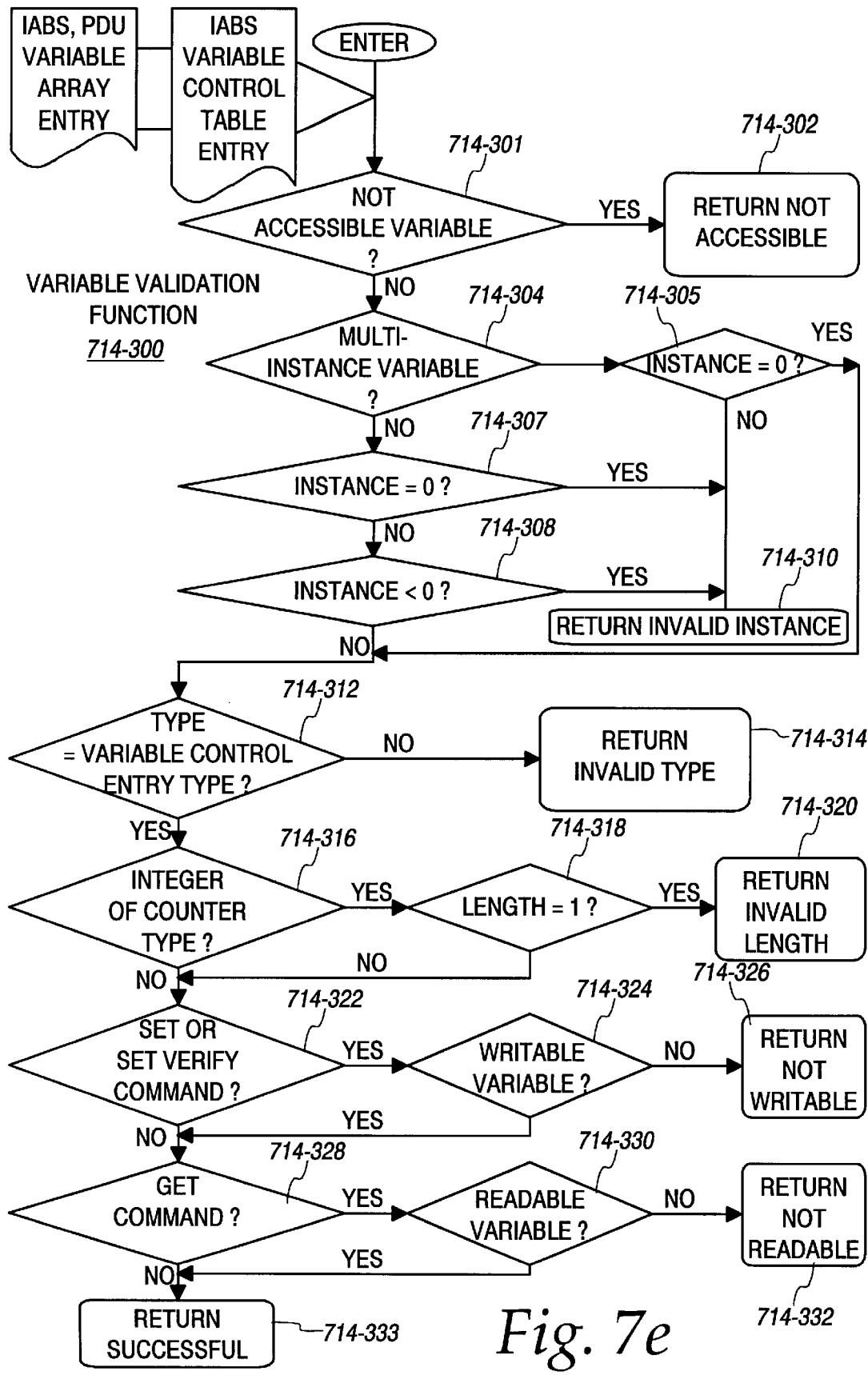
Figure 7F:
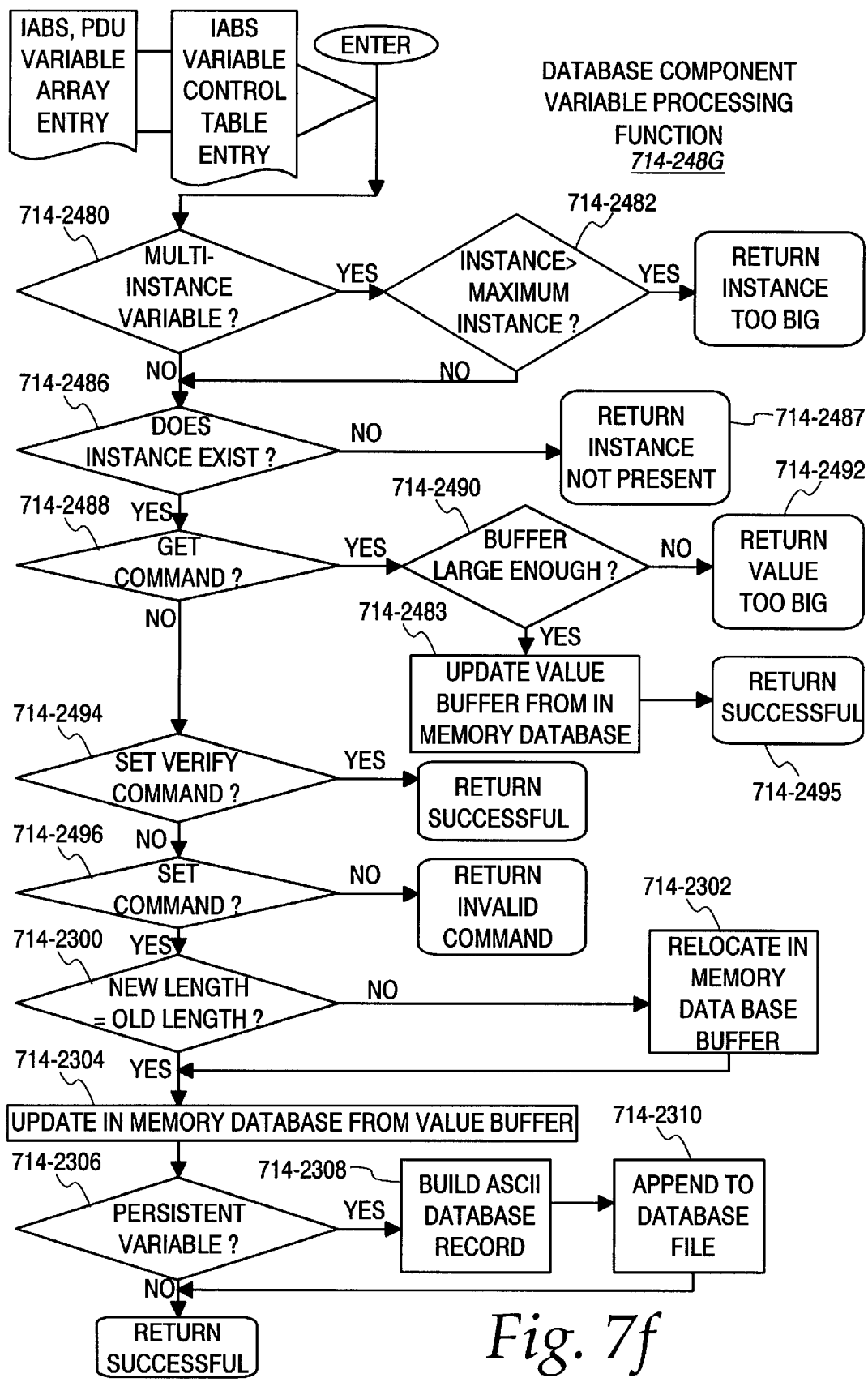
Figure 7G:
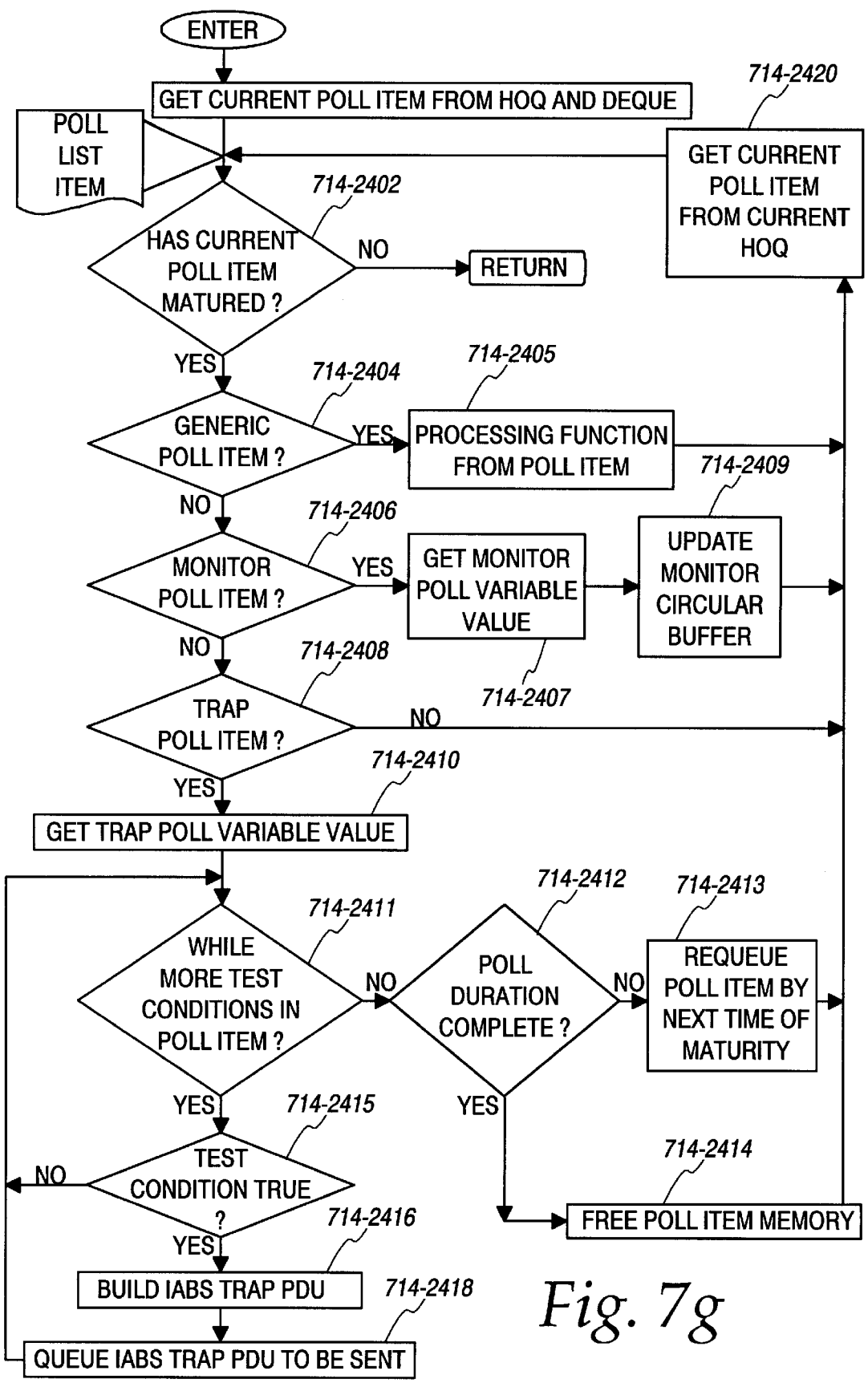

If module 34-22 detects a timeout (i.e. block 714-10), it invokes the process poll queue function module 34-44 which performs the sequence of operations shown in FIG. 7g. At the completion of polling entries contained in timeout poll list queue 34-42, the function module 34-44 returns control back to dispatch module 34-22 as indicated for further socket testing.

If a timeout has not occurred, then module 34-22 determines if the socket is ready to write which means it has queued an PDU output (i.e. block 714-14). If it is ready to write, then module 34-22 sends out an IABS PDU structure formatted as shown in FIG. 4a (i.e. block 714-16) and continues in that loop. If there is no socket to be written, then module 34-22 determines if there has been any queued input received. It determines this by testing for sockets to be read (i.e. block 714-18). If there is a socket to be read, modules 34-22 determines if it is a command socket that is to be read (i.e. block 714-20).

If it is a command socket, module 34-22 invokes the Get IABS PDU function (iabs lib) as indicated in block 714-22 which in turn invokes the process IABS command request function as indicated in block 714-24. This function processes the command received from peer agent 32 via the previously established command socket connection by executing the sequence of operations of FIG. 7c. After completing the processing of the command contained in the IABS PDU as indicated in block 714-22, module 34-22 then continues in that loop.

If there is no command socket ready to be read, then module 34-22 determines if there is an accept socket ready to read as indicated in block 714-30. If there is, module 34-22 invokes the IABS command accept function as indicated in block 714-30. After completing that operation, module 34-22 continues in that loop.

FIG. 7c illustrates the flow of the IABS command request function invoked by module 34-22. As indicated in the Figure, this function performs the operation of testing the command filed of the IABS PDU to determine if it is a Get, Set or Set-Verify command (i.e. block 714-240). If it is not any of these types of commands, the function logs an invalid command error (i.e. block 714-242 and returns to dispatch module 34-22.

If the command is valid, the function allocates a memory buffer for storing a command response PDU as indicated in block 714-244. Next, the function begins processing each of the variables contained in the IABS PDU by invoking the process IABS variable function (i.e. block 714-248) of FIG. 7d. This function determines if an error was returned by the variable processing function as indicated in block 714-250. If the variable is not valid, then the function sets an error index and error code as indicated in block 714-252 and continues the sequence of operations.

After successfully completing the processing of a variable, the function continues in that loop, processing other variables. After completing the processing of all of the variables contained in the IABS PDU, the function sets size and # variables fields with the appropriate values into the command response PDU buffer as indicated in block 714-254. It then outputs the command response IABS PDU. As indicated, it queues the IABS command response PDU to be sent and returns to the dispatch module 34-22 as indicated in block 714-256.

FIG. 7d illustrates the specific sequence of operations performed by the process IABS variable function module of component 34. As indicated in block 714-248a, the function module first determines if the variable being processed is valid by checking its Id value and seeing if it is within a particular range. If it is not, the function logs an invalid variable error as indicated in block 714-248b. If it is valid, the function gets the IABS variable control table entry from IABS variable control table 34-12 as indicated in block 714-248c. It then invokes the variable validation function as indicated in block 714-248d which performs a generic validation operation. The validation operation sequence is shown in greater detail in FIG. 7e.

If there is a validation failure, then the function logs an error as indicated in block 714-248k and returns to the process IABS command request function of FIG. 7c. If the variable is valid, then the function determines if the variable is stubbed which is a mechanism that is used for prototyping and testing. The sequence of operations performed by this mechanism (i.e. block 714-248g) is illustrated in FIG. 7f. If the variable is not stubbed, the function calls a component variable processing function of the instci component as indicated in block 714-248i. This function completes the validation and processing of the snmp variable as discussed herein with reference to FIGS. 8a through 8c.

As indicated in block 714-248j, the function next checks for errors that are normally encountered during the course of "MIB browsing". SNMP MIBs are hierarchically organized so that a MIB may be traversed by GET-NEXT commands without a-priori knowledge of the specific MIB organization. The process of issuing SNMP GET-NEXT commands down one tree of a MIB until reaching it's final object and then down the next branch is called "MIB browsing". Errors are normally encountered when a GET-NEXT is issued at the end of a MIB branch to indicate to the browsing software End of Branch. These errors should not be placed in a log file and this function tests for them to so handle them. If it is another type of error (not associated with MIB browsing), then the function logs an error as indicated in block 714-248k and returns.

FIG. 7e illustrates the specific sequence of operations performed by the generic IABS variable validation function invoked as indicated in FIG. 7d in processing a variable from the MIB 39b. As indicated in blocks 714-301 through 714-308, the component 34 examines the corresponding IABS control table entry and PDU array entry for the particular variable. It determines from the contents of the IABS variable control table entry if it is an accessible variable (can be read, written), if it is a multi instance variable and if a multi instance, if it is "0" or less than "0" in which case an invalid instance error is returned. Additionally, as indicated in blocks 714-312 through 714-318, the component 34 determines its type, if it is an integer or counter type. Also, as indicated in blocks 714-322 through 714-340, the component 34 checks if the command is a set or set-verify command and if the variable is writable as well as determining if it is a get command and whether or not the variable is readable as indicated. The component 34 returns the indicated status based on the examination of these fields within the IABS variable control table entry and IABS PDU variable array entry.

FIG. 7f illustrates the sequence of operations performed by the database component variable processing function in processing get, set verify and set commands utilizing the IABS variable array entry and IABS variable control table entry. As indicated, the component 34b examines the IABS variable control entry for the variable being processed. First, the component 34b determines if the variable is a multi instance variable and if it is, the component 34b determines if the instance is less than the maximum instance value for that variable (i.e. blocks 714-2480 and 714-2482). If it exceeds the maximum value, then the function then returns with an indication that the instance is invalid (i.e. block 714-2484).

Next, as indicated in block 714-2486, the component 34b determines if the instance exists by checking an indicator specifying if the instance is present (used for handling sparsely populated tables of MIB variables defined in internal MIB database 39c of FIGS. 5a and 5b). The internal database 39c is accessed by database instrumentation component 34b as indicated in FIGS. 5a and 5b. The database contents are derived from MIB 39b and organized as discussed herein. If it is not present, then the component 34b returns an instance not present. If the instance exists/is present, the component function 34b determines what type of command is being processed by performing the operations of blocks 714-2488, 714-2494, and 714-2496 in the manner indicated in FIG. 7f.

If a set-verify command, then a successful return is made. If a get command, component 34b checks whether the buffer supplied is large enough to contain the current value as indicated in block 714-2490. If it is large enough, the buffer is updated from the database and a successful return is made. If not, then a value too big error indication is returned.

If a set command, the component 34b checks the length field contained in the instance value structure to determine if the instance value being written into the MIB database 39c has a length which is equal to the previous instance value. If it is not, then the component 34b reallocates in memory, the structure of the data base buffer as indicated in block 714-2302. Then the component 34b updates the memory database 39c with the value contained in the database buffer as indicated in block 714-2304.

Next, the component 34b checks the contents of the IABS variable control table entry, to determine if the variable is a persistent variable as indicated in block 714-2306. In the case of a persistent variable, the function builds an ASCII database record which is appended to the database file 39*c* as indicated in blocks 714-2308 and 714-2310. The database file 39*c* is organized to contain ASCII records, each record consisting of ASCII strings separated by a conventional separator character and terminated in a conventional manner with a new line character wherein initial database strings are encoded to identify MIB variable and instance. The simplified ASCII structure makes the database very portable.

The instrumentation component 34 provides direct support for the persistence of a subset of MIB variables. Such variables retain the value which was last specified in a SET_CMD command even if the instrumentation component 34 has been terminated gracefully or not gracefully and restarted in interim. In the present embodiment, the "persistent" variables are zSvMIBpfMBCerrs, zSvMIBhsMenReds, zSMIBhsMemYellows and all of the user monitoring and trap variables (zSvMIBmn*). As described above, when a successful SET_CMD command is performed for a "persistent" variable, then a new server MIB ASCII data base record is appended to the data base file 39*c* by component 34*b* at initialization. When the server MIB data base file 39*c* is processed on a subsequent initialization of the component 34 and 34*a,* then the later appended record overrides any previous record for that snmpvar/instance. In order to ameliorate the continuing growth of the server MIB data base file 39*c* with increasing number of duplicate records as more SET_CMD commands are performed on "persistent" variables, the component 34*b* re-sorts the server MIB data base 39*c* at each initialization and at each graceful termination as described above. Sorting the server MIB data base file 39*c* recreates the file with records in ascending snmpvarfinstance order and all duplicate records are supplanted by the latest version of the record in the file 39*c* prior to such sorting. Then the function returns to the IABS variable function of FIG. 7*d*

FIG. 7*g* illustrates the sequence of operations performed for carrying out poll list processing which drives the trap polling and data monitoring function. As indicated in block 714-2400, the component 34 sets the current poll item obtained from head of queue (HOQ) pointer designating the beginning of the list and dequeues it from the list. The function first checks to see if the current poll item in the list has matured. If it does not, the function returns since list items are ordered from shortest timeout value to longest timeout value, no further items need to be tested. If the current poll item has not matured, the function next checks to determine the type of poll item being processed by performing the operations of blocks 714-2402 through 714-2408. Based on the result of such tests, the function performs the indicated operations.

More specifically, if the component 34 determines from the type field of the poll list item data structure that the current poll item is a generic poll item, then it calls the instrumentation component processing function specified by the processing structure's processing function. This allows the instrumentation component 34*a* to perform timeout management functions such as the determination of the time interval between polls. If the component 34 determines that the current poll item is a monitor poll item, it performs the operation of getting the monitor poll variable value by calling the processing function of the component 34*a* to obtain the variable value and updates the monitor circular buffer with the variable value received from the component 43*a*.

If the component 34 determines that the current list item is a trap poll item, it then gets the trap poll variable value specified by the poll variable field of the poll list item structure. Component 34 then tests for the one or more test conditions for that variable contained in the current poll item (i.e. block 714-2411). If the condition being tested is true, then the component 34 builds an IABS TRAP PDU and queues the PDU to be sent (i.e. blocks 714-2416 and 714-2418) and continues that loop until all of the conditions have been tested. As indicated in block 714-2412, component 34 then determines whether the poll duration for this poll item has been completed. If not, it requeues the poll item at its next time of maturity (i.e. block 714-2413). If so, it does not requeue the poll item, but frees the memory allocated for that poll item (block 714-2414). As indicated in block 714-2420, the component 34 obtains the next poll item from the current HOQ and repeats the sequence of operations of FIG. 7*g*. This is done until a poll item is encountered which has not matured indicating the completion of the poll list processing. At this time, component 34 returns to the iabs server dispatcher module 714 of FIG. 7*b* which continues as described above.

Figure 8A:
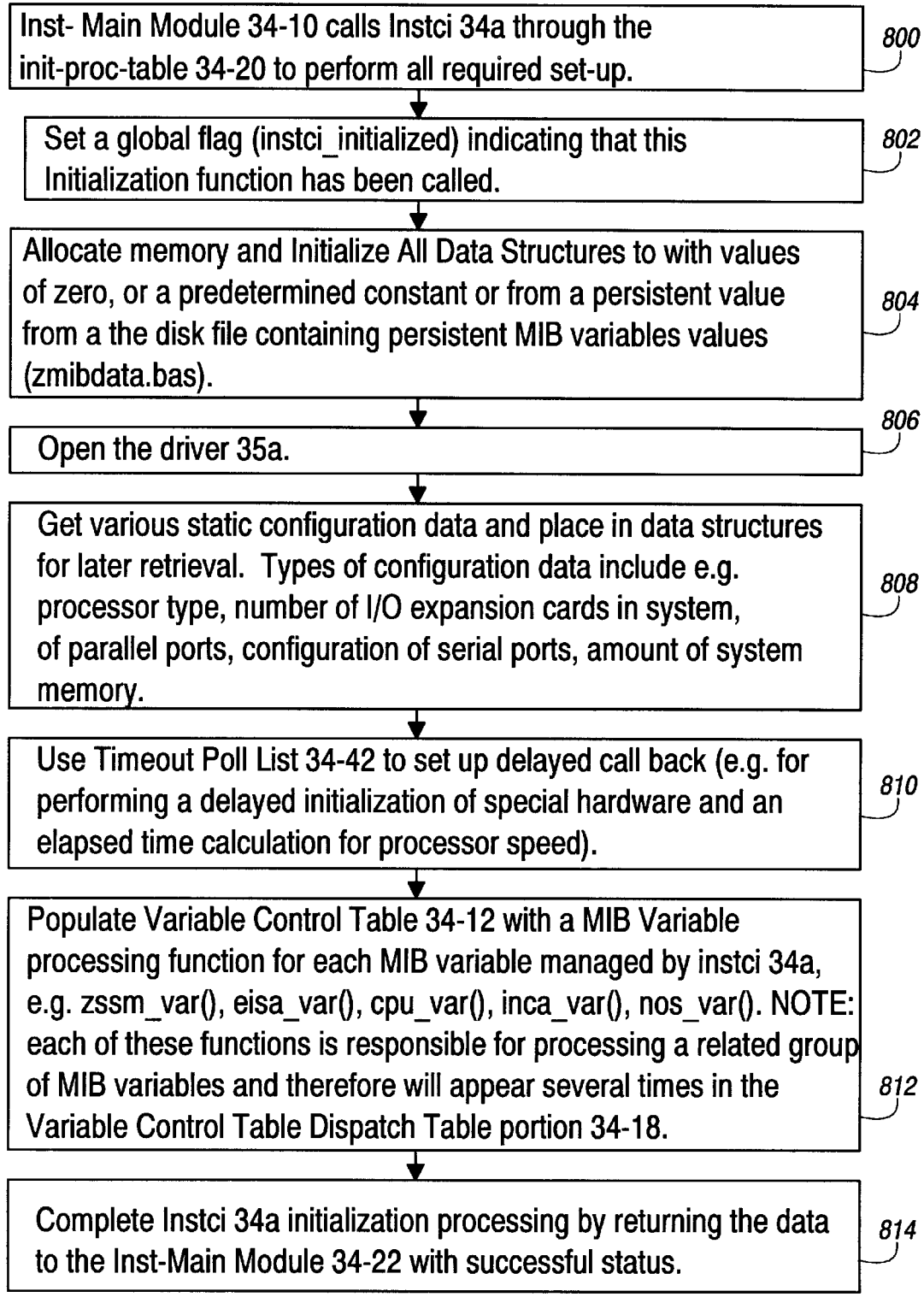
FIGS. 8a through 8c illustrate the operational flow of the different modules of the instrumentation component of FIG. 1.
Figure 8B:
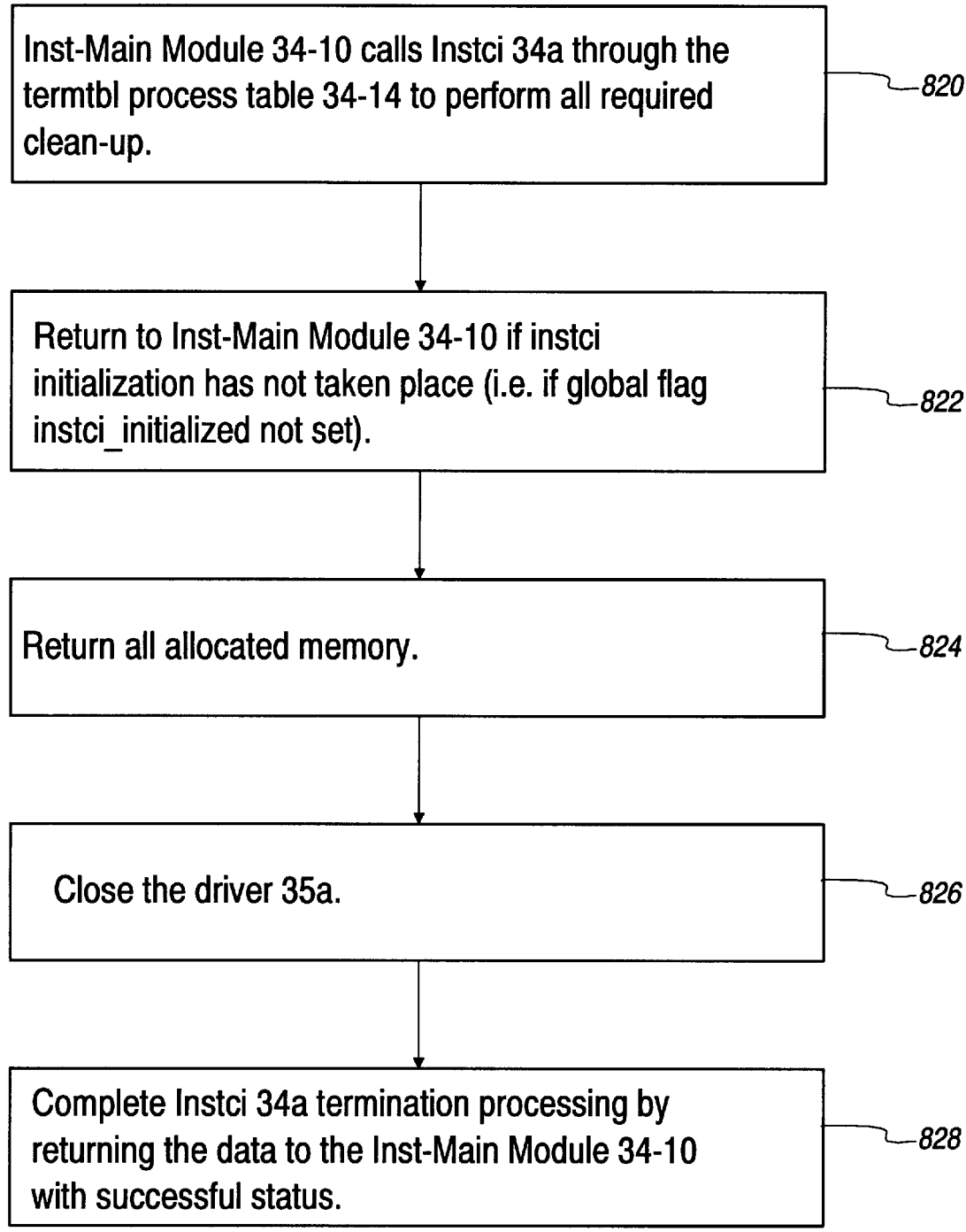
Figure 8C:
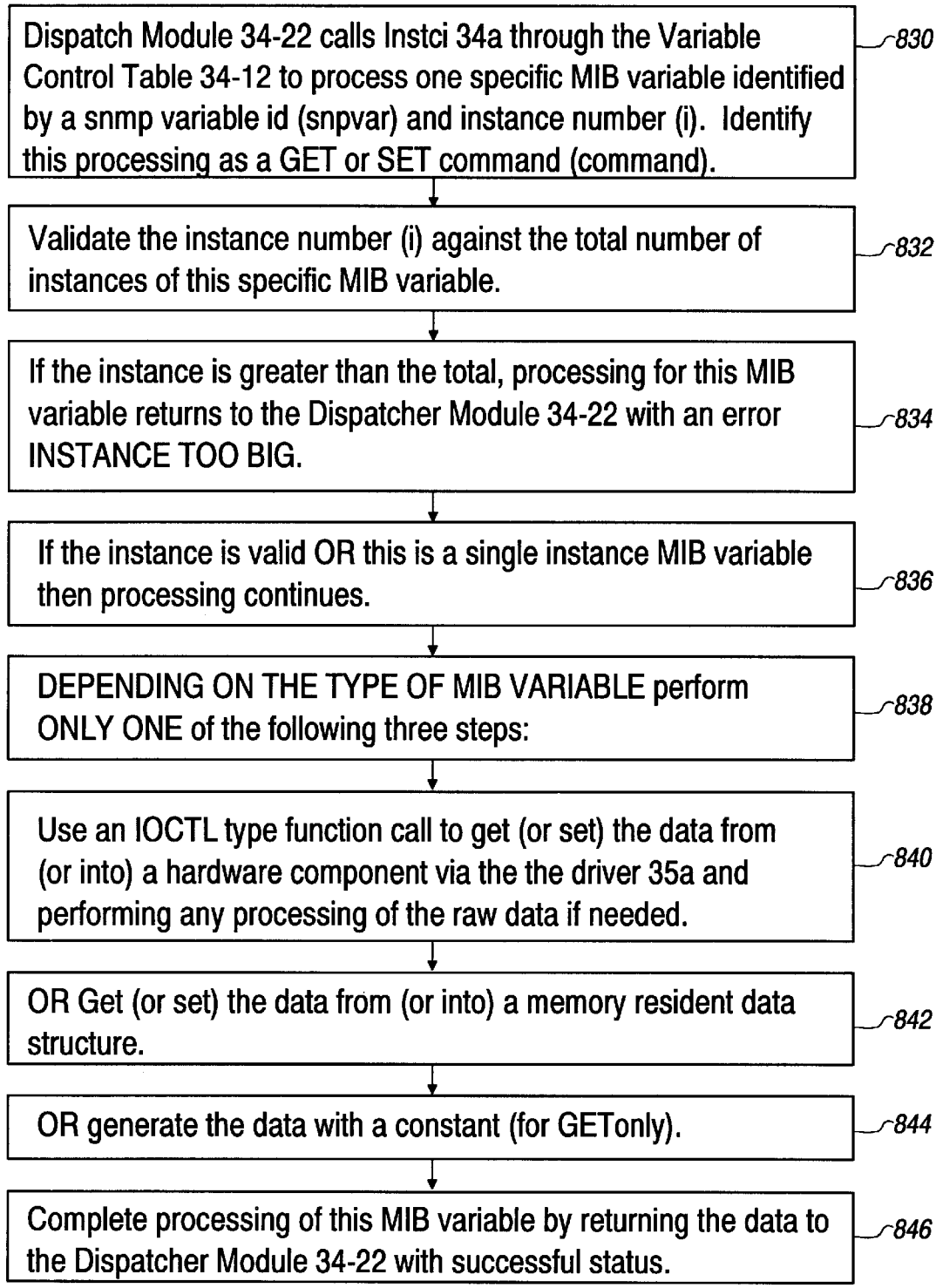

FIGS. 8*a* through 8*c*

The basic sequence of operations performed by Instci component 34*a* will now be described with reference to FIGS. 8*a* through 8*c*. FIG. 8*a* illustrates the sequence of operations performed by the instci component module 34*a*-10 of FIG. 3*b* during initialization. As indicated in block 800 of FIG. 8*a,* inst_main module 34-10 of calls Instci component 34*a* through its init_proc_table 34-20 to perform all required set-up operations. That is, it generates an init call to module 34*a*-10 of FIG. 3*b* which then sets a global flag indicating that the initialization function module 34-10 has been called (i.e. block 802). Then module 34-10 performs the setup operations of blocks 804 through 812.

More specifically, module 34-10 allocates memory and initializes the fields of all data structures with either zero values, predetermined constants or with persistent values obtained from a disk file containing persistent MIB variables (i.e. zmibdata.bas). Next, Instci component 34*a* opens driver 35*a* as indicated in block 806 using the open call function driver function module of block 34-16. As indicated in block 808, the module 34-10 gets the various static configuration data and places it in the appropriate data structures for later retrieval. Such types of configuration data includes processor type, number of I/O expansion cards in the server system, configurations of server parallel and serial ports and the amount of system memory.

Next, as indicated in block 810, the Instci component 34*a* uses the timeout poll list 34-42 of FIG. 3*a* to set up items for making delayed call backs as required for performing functions such as a delayed initialization of special hardware and an elapsed time calculation for processor speed. As indicated in block 812, Instci component 34-10 populates the dispatch table portion 34-18 of FIG. 3*a* with pointer entries designating those MIB processing functions 34-12 through 34*n* of FIG. 3*b* which manage the particular MIB variables. Such functions include zssm_var(), eisa_var(), cpu_var(), inca_var() and nos_var(). Since each of these function modules is responsible for processing a related group of MIB variables, the same function appears several times in variable control table dispatch table portion 34-18. After successfully completing the above setup operations, Instci component 34*a* returns back to the inst_main module 34-10 with a successful status.

FIG. 8*b* illustrates the sequence of operations performed by the function module 34*a*-14 of FIG. 3*b* during termination. As indicated in block 820, dispatch module 34-22 calls the Instci function module 34-14 through the termtbl process table 34-14 by invoking a TERM call to perform all of the required clean-up operations. These include the operations of blocks 822 through 826. As indicated, module 34-14 checks the state of the global flag to determine if initialization had taken place. If it did not (i.e. the global flag initialized was not set), it returns directly to inst_main module 34-10. Otherwise, as indicated in block 822, when global flag is set, module 34-14 returns all allocated memory and then closes driver 35*a* by invoking the close driver function of block 34-16 (i.e. block 826) before returning to inst_main module 34-10 (i.e. block 714-248*h*).

FIG. 8*c* illustrates the sequence of operations performed by function module(s) 34-12 of FIG. 3*b* during the processing of GET and SET commands for which it is responsible. As indicated in block 830, dispatch module 34-18 invokes the processing function specified in the variable control table location for that variable to process one specific MIB variable identified by a snmp variable Id (i.e. snmpvar) and an instance number (i). It also identifies such processing as a GET or SET command. Next, as indicated by block 832, the particular processing module 34*a*-12 responsible for processing the variable validates the instance number (i) against the total number of instances of this specific MIB variable. If the instance is greater than the total, the module 34*a*-12 returns to the dispatch module 34-22 with an error indicating INSTANCE TOO BIG.

If the instance is valid or this is a single instance MIB variable, then module continues processing (i.e. block 836). As indicated in block 838, depending on the type of MIB variable being processed, module 34*a*-12 performs the operations of one of the blocks 840, 842 or 844. That is, if the MIB variable corresponds to data contained in a hardware component (e.g. register), it issues an IOCTL function call to driver function module 34*a*-16 to get the data or set the data into such hardware component and perform any processing of the raw data as required.

If the MIB variable corresponds to the data contained in a memory resident data structure, then module 34*a*-12 gets the data from the memory structure by performing a memory read operation or sets the data into the memory by performing a memory write operation (i.e. block 842). If the MIB variable is a constant value, then function module 34*a*-12 generates the required data using a prestored constant in the case of a GET command. After performing one of these operations, module 34*a*-12 returns the data (i.e. GET command only) to dispatch module 34-22 along with successful status as indicated in block 846.

From the above, it is seen how the architectural organization of the present invention is able carry out the processing of snmp variables through the use of a plurality of interfaces operating in conjunction with a plurality of different types of network operating system environments.

It will be appreciated that many changes may be made to the preferred embodiment of the present invention without departing from its teachings. For example, the architectural organization of the present invention may be used with other types of networking operating systems and with a variety of server hardware platforms. Also, the abstraction interface functions contained in the iabs library may be packaged within the specific modules.

Additionally, it will be appreciated that the present invention enables new instrumentation components to be added to module 33 without having to make changes to that module. Similarly, it will be appreciated that new driver and file system modules may be added to the system. In such cases, it will be understood that new calling procedures may be required for communicating between instrumentation components and newly added modules.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

-35-

APPENDICES

1. APPENDIX I-    Pages 1a-11a
2. APPENDIX II    Page 1b-37b
3. APPENDIX III   Page 1c
4. APPENDIX IV    Pages 1d-4d

APPENDIX I

CLIENT LIBRARY FUNCTIONS

I. Call for Component Function

Format:

```
status = instCallForComponent(&commandsd, &trpindsd);

unsigned int        commandsd;
unsigned int        trpindsd;
unsigned int        status;
#define INSTFAIL     -1
#define SUCCESSFUL    0
```

The Call for Component function is used to establish an association between the Caller (i.e. Peer agent extension component 32a or Local Console Facility client component 32b) and the Instrumentation component 34 and fills pointers one or two socket descriptors (commandsd and trpindsd).

In the UNIX implementation, this function initiates a TCP socket connection with the Instrumentation component 34 daemon (zdsiabd) at its configured port. This serves to initiate the inter-process communication (IPC) links between the Peer agent extension component 32a or Local Console Facility client component 32b (i.e. Caller) and the Instrumentation component 34. This function creates one (or optionally two) sockets which are used as the IPC links between Peer agent extension component 32a or the Local Console Facility client component 32b and the Instrumentation component 34. A Command socket connection is created as a TCP socket connection which will be used throughout the life of this association to pass Command Requests from the Caller to the Instrumentation abstraction component 34 and Command Responses from the Instrumentation abstraction component 34 (i.e. for receiving data for MIB variables) to the Caller. Optionally, if a non-null pointer is supplied for a second socket descriptor, this function will create another socket on which the Caller will any receive Trap Indications from the Instrumentation abstraction component 34. The port that this Trap Indication socket is bound to is also communicated to the Instrumentation abstraction component 34 across the Command socket during the establishment of this association. Like the Command socket connection, this Trap Indication socket connection is a TCP connection that will be used for the life of the association. The Command and Trap Indication socket connections are established by a single call to this function.

This function returns INSTFAIL if the call is unsuccessful or SUCCESS with the side effect of the one or two (if optional TrapIndication socket is specified) filled in socket descriptors (commandsd and trpindsd) if the call is successful. If unable to establish all requested socket connections, then INSTFAIL will be returned and no socket connections will be left open.

II. Issue Command Request Function

Format:

```
status = instIssueCommandRequest(command, requestid, number_snmpvars,
snmpvar, instance, vartype, length, data_ptr);

int             command;
unsigned int    requestid;
unsigned int    number_snmpvars;
unsigned int    snmpvar[];
unsigned int    instance[];
unsigned int    vartype[];
unsigned int    * length[];
unsigned char   * data_ptr[];

#define GET_CMD           1    /* command type: get MIB variable value */
#define SET_CMD           2    /* command type: set MIB variable value */
#define SET_VERIFY_CMD    3    /* command type: verify ability to set MIB
                                  variable value */
#define INTEGERTYPE       1    /* vartype: (single)integer */
#define OCTETSTRINGTYPE   2    /* vartype: octet(byte) string */
#define OBJECTIDTYPE      3    /* vartype: OID (sequence of integers) */
#define COUNTERTYPE       4    /* vartype: (single)counter */

Status Values:
#define INSTFAIL          -1   /* unable to issue Command Request */
#define SUCCESSFUL         0   /* sucessfully issued Command Request */
#define INVALID_COMMAND   13   /* invalid command type specified */
#define NO_PDU_MEM        30   /* no memory available for command
                                  request PDU */
```

This function is called from Peer agent extension component 32a and the Local Console Facility client component 32b to obtain or update the current value of one or more MIB variables. It initiates the indicated command (GET_CMD, SET_CMD or SET_VERIFY_CMD) to the Instrumentation abstraction component 34. Each command request successfully initiated by the Caller of the Instrumentation abstraction component 34 will generate a single command response which is returned asynchronously. This command response will specify the same requestid which was supplied in the command request. The following information must be supplied for each command request:

the type of command being issued : GET_CMD, SET_CMD or SET_VERIFY_CMD the requestid for this command request the number_snmpvars specifies how many variables (snmpvars) are being requested, and thus identifies the size of the arrays that follow the snmpvar array identifying the MIB variables being requested the instance array identifying the instance(i.e. table row 1 - n or 0 if not from a table) of each snmpvar being requested the vartype array specifying the variable type for each snmpvar requested (INTEGERTYPE, COUNTERTYPE, OCTETSTRINGTYPE or OBJECTIDTYPE)

the length array must contain pointers to integers specifying the expected maximum length of the data for each snmpvar requested on a GET_CMD, or the actual length of data supplied on a SET_CMD or SET_VERIFY_CMD the data for each snmpvar specified in a SET_CMD or SET_VERIFY_CMD must be provided in a buffer pointed to by the corresponding data_ptr array element for that snmpvar (i.e. the data for the 1st snmpvar being provided on this command request should be placed in the buffer pointed to by the 1st element of the data_ptr array, the data for the 2nd snmpvar being provided should be placed in the buffer pointed to the 2nd element of the data_ptr array, etc.) All elements of the data_ptr array should be NULL on a GET_CMD request.

The *snmpvar* argument points to an array of defined constants (snmpvar) which are unique identifiers of each variable defined in the MIB 39b. The snmpvar constant is defined in an include file that is common to the Peer agent extension component 32a, Local Console Facility client component 32b, Instrumentation abstraction component 34 and specific Instrumentation Driver code. In some cases, the Instrumentation abstraction component 34 will map the snmpvar constant to another form in order to communicate with non Z Instrumentation abstraction component 34 that cannot use this include file. MIB variables that have an OID syntax are handled by the Instrumentation abstraction component 34 as a fixed length array of integers. This data is passed back opaquely to the Peer agent extension component 32a when requested with a GET command specifying an snmpvar with an vartype of OBJECTIDTYPE.

The instance argument indicates whether the SNMP variable pointed to by *snmpvar* is a single instance (when instance=0) MIB variable or a multiple instance (when instance > 0) MIB variable (i.e. a table element). For multiple instance MIB variables (i.e. MIB variables in tables) the instance corresponds to the row of the table. The instance can only be 0 for single instance MIB variables (or an error will be returned) and the instance cannot be 0 for a multiple instance MIB variable (or an error will be returned).

The UNIX type implementation of this function writes all the necessary command information to the TCP Command socket that is the inter-process link between the Peer agent extension component 32a or Local Console Facility client component 32b (i.e. Caller) and the Instrumentation abstraction component 34. For all successfully initiated commands, the Caller receives an asynchronous data indication via the Callback socket to notify the Caller that the command request has been processed and to provide any data requested by the command.

The values pointed to by length arguments must be in units specific to the vartype: number of integers for INTEGERTYPEs(i.e. 1), COUNTERSs (i.e. 1) and OBJECTIDTYPEs, and number of bytes for OCTETSTRINGTYPEs. They are used to specify the size of data provided for SET_CMDs and SET_VERIFY_CMDs, and the maximum size of data expected (and to be subsequently received by instReceiveCommandResponse) when issuing GET_CMDs. A length of zero must be specified when setting a variable to a value of NULL.

The data_ptr arguments are for commands that provide data only (i.e. SET_CMDs and SET_VERIFY_CMDs) and are NOT used for commands that request data (i.e. GET_CMDs). In addition to a length of zero, a NULL pointer may be provided in a data_ptr array element for a variable which is being set to a value of NULL. All elements of the data_ptr array should be set to NULL for GET_CMDs. Buffers for requested data are actually provided in the instReceiveCommandResponse function that services the resulting command response.

3a

The issue command request function can be used to request several MIB variables with one command request. number_snmpvars specifies the number of MIB variables being requested. The snmpvar, instance, vartype, length and data arguments must be supplied as arrays of the size specified by number_snmpvars.

The status value returned by this function indicate whether a Command request was successfully placed. It will return INSTFAIL, INVALID_COMMAND or NO_PDU_MEM if the call is unsuccessful, or SUCCESS if the call is successful. Each successfully placed Command Request generates a single Command Response which can be received through the instReceiveCommandResponse function.

III  Select Function

Format:

```
int select(nfds, rd_fds, wrt_fds, NULL, timeout);

int     nfds;

fd_set *rd_fds, *wrt_fds;

struct timeval *timeout;
```

In a UNIX type network operating system, a select socket system call is used to poll for SMUX events and also data from the Instrumentation abstraction component 34 (by including the Command, and optionally the Trap Indication, socket descriptor(s) in the rd_fds). It can also test whether a command request can be issued to the Instrumentation Abstraction component 34 by including the Command socket descriptor in the wrt_fds.

IV.  Receive Command Response Function

Format:

```
status       =    instReceiveCommandResponse(&command,      &requestid,
&number_snmpvars,  &snmpvar[0],  &instance[0],  &vartype[0],  length,
data_ptr);

int             command;
unsigned int    requestid;
unsigned int    number_snmpvars;
unsigned int    snmpvar[];
unsigned int    instance[];
unsigned int    vartype[];
unsigned int   * length[];
unsigned char  * data_ptr[];

#define GET_CMD         1    /* command type: get MIB variable value */
#define SET_CMD         2    /* command type: set MIB variable value */
#define SET_VERIFY_CMD  3    /* command type: verify ability to set MIB
                                variable value */
```

4a

```
#define INTEGERTYPE        1      /* vartype: (single)integer */
#define OCTETSTRINGTYPE    2      /* vartype: octet(byte) string */
#define OBJECTIDTYPE       3      /* vartype: OID (sequence of integers) */
#define COUNTERTYPE        4      /* vartype: (single)counter */

Status Values:

#define INSTFAIL              -1     /* unable to receive Command
                                        Response */
#define SUCCESSFUL             0     /* Command Response received without
                                        error*/
#define UNKNOWN_VARIABLE       1     /* invalid variable identifier
                                        (unknown snmpvar) */
#define VARIABLE_NPRESENT      2     /* variable not present on this
                                        system */
#define SI_VARIABLE_NZERO      3     /* instance != 0 for single instance
                                                variable */
#define MI_VARIABLE_ZERO       4     /* instance = 0 for multi-instance
                                                variable */
#define INSTANCE_TOO_BIG       5     /* instance > maximum instance value
                                        for multi-instance variable */
#define INV_VARIABLE_TYPE      6     /* invalid variable type */
#define NOT_WRITABLE           7     /* variable specified by set command
is                                              not writable */
#define NOT_READABLE           8     /* variable specified by set command
is                                              not readable */
#define VALUE_TOO_BIG          9     /* variable value specified by set
                                        command is too big */
#define VALUE_TOO_SMALL       10     /* variable value specified by set
                                        command is too small */
#define UNABLE_TO_ACCESS      11     /* unable to access variable
                                        specified by get command */
#define UNABLE_TO_MODIFY      12     /* unable to modify variable
                                        specified by set command */
```

This function is called by the Peer agent extension component 32a and the Local Console Facility client component 32b to receive responses from each instCommandRequest previously issued. If there is no error in supplied parameters, it blocks until a Command Response is available. The following information is returned at the locations specified in the parameters supplied by the caller of the instReceiveCommandResponse in order to identify the variable data delivered:

the command specified in the originating command request;

the requestid of the originating command request ;

the number_snmpvars specifies the size of the arrays of the following parameters which have been supplied by the caller. It is updated by the InstReceiveCommandResponse function to contain the number of snmpvars being provided in this command response, and thus identifies the number of array elements which have been updated in the following arrays:

> the snmpvar array identifying the MIB variables being provided with this command response;

> the instance array identifying the instance(i.e. table row 1 - n or 0 if not from a table) of each snmpvar being provided with this command response;

the vartype array specifying the variable type for each snmpvar (INTEGERTYPE, COUNTERTYPE, OCTETSTRINGTYPE or OBJECTIDTYPE)

the length array specifying the size of the buffer provided by the caller in the corresponding data_ptr array element. It is updated by the instReceiveCommandResponse function to contain the actual length of the data provided for each snmpvar.

The data for each snmpvar will be returned in the buffer specified in the corresponding data_ptr array element for that snmpvar (i.e. the data for the 1st snmpvar being returned on this command response will be placed in the buffer specified by the 1st element of the data_ptr array, the data for the 2nd snmpvar being returned will be placed in the 2nd element of the data_ptr array, etc.)

The instCommandResponse function is used to provide a count of the number of MIB variables being returned in number_snmpvars. This equals the number of MIB variables requested in the corresponding Command Request, unless errors were encountered which prevented a requested MIB variable value from being set or gotten. If such an error occurred, the number_snmpvars will identify the first variable on which such an error occurred, and only those snmpvars preceding that variable will have valid data returned for them. If an error occurs on a SET_CMD Request, then only those variables preceding the variable encountering the error will have been set. The snmpvar, instance, vartype, length and data_ptr arguments will be returned as arrays of the size specified by number_snmpvars. When a variable error reported in the Command Response, then the instance and vartype elements corresponding to the snmpvar encountering the error are correct, but the length and data_ptr elements will not be valid.

The length value returned may be different from that which was supplied in the originating instCommandRequest and describes the actual length of the variable data returned (in units of integers for vartypes = INTEGERTYPE, COUNTERTYPE or OBJECTIDTYPE, and bytes for vartype = OCTETSTRINGTYPE). Length is supplied as zero for variables which have a value of NULL.

The status value returned indicates whether a Command Response was successfully received. This function returns SUCCESSFUL if a Command Response was successfully received without error, INSTFAIL if parameter errors prevented any Command Response from being received, or a specific variable error status (enumerated above) if the Command Response was received but specified an error in getting or setting a variable. In the latter case, the number_snmpvars will identify the variable encountering the error.

V. Receive Trap Indication Function

Format:

```
status   =   instReceiveTrapIndication(&enterprise_snmpvar,   &trapno,
&number_snmpvars,  &snmpvar[0],  &instance[0],  &vartype[0],  length,
data_ptr);

int                enterprise_snmpvar;
int                trapno;
unsigned int       number_snmpvars;
unsigned int       snmpvar[];
unsigned int       instance[];
unsigned int       vartype[];
unsigned int       * length[];
```

6a

```
char                  * data_ptr[];
#define INTEGERTYPE      1      /* vartype: (single)integer */
#define OCTETSTRINGTYPE  2      /* vartype: octet(byte) string */
#define OBJECTIDTYPE     3      /* vartype: OID (sequence of integers) */
#define COUNTERTYPE      4      /* vartype: (single)counter */
Status Values:
#define INSTFAIL              -1     /* unable to receive trap */
#define SUCCESSFUL             0     /* trap received without error*/
#define UNABLE_TO_ACCESS      11     /* unable to access variable to be
                                        provided with trap */
```

This function is called by the Peer agent extension component 32a to receive trap data (identifying the specific trap and an associated set of MIB variables) from the Instrumentation Abstraction component 34. If there is no error in supplied parameters, it blocks until a Trap Indication is available. This data is returned at the locations specified in the instReceiveTrapIndication function call. Included is the following information:

the enterprise_snmpvar is used to uniquely identify the originating enterprise.

the trapno argument identifies the enterprise assigned number for the trap.

the number_snmpvars specifies the sizes of the arrays of the following parameters which have been supplied by the caller. It is updated by the instReceiveTrapIndication function to contain the number of snmpvars being provided in this trap indication, and thus identifies the number of array elements which have been updated in the following arrays:

the snmpvar array identifying the MIB variables being provided with this trap.

the instance array identifying the instance(i.e. table row 1 - n or 0 if not from a table) of each snmpvar being provided with this trap.

the vartype array specifying the variable type for each snmpvar (INTEGERTYPE, COUNTERTYPE, OCTETSTRINGTYPE or OBJECTIDTYPE).

the length array specifying the size (in bytes) of the buffer provided by the caller in the corresponding data_ptr array element. It is updated by the instReceiveTrapIndication function to contain the actual length of the data provided for each snmpvar (in units of the the vartype for that snmpvar).

the data for each snmpvar is returned in the buffer specified in the corresponding data_ptr array element for that snmpvar (i.e. the data for the 1st snmpvar being returned on this trap indication will be placed in the buffer specified by the 1st element of the data_ptr array, the data for the 2nd snmpvar being returned will be placed in the 2nd element of the data_ptr array, etc.).

The instReceiveTrapIndication provides a count of the number of MIB variables being returned in number_snmpvars. This will equal the number of MIB variables specified to be returned for the specific trap, unless errors were encountered which prevented a requested MIB variable value from being gotten. If such an error occurred, the number_snmp_vars will identify the first variable on which such an error occurred, and only those snmpvars preceding that variable will have valid data returned for them. The snmpvar, instance, vartype, length and data arguments are returned as arrays of the size specified by number_snmpvars. When a variable error is reported in the Trap Indication, then the 7a instance and vartype elements corresponding to the snmpvar encountering the error will be correct, but the length and data_ptr elements will not be valid.

The status value will indicate whether a trap was successfully received. This function returns SUCCESSFUL if a trap is successfully received without error, INSTFAIL if parameter errors prevented any trap from being received, or a specific variable error status (enumerated above) if the Trap Indication was received but indicated an error in getting a variable specified to be provided with this trap. In the latter case, the number_snmpvars will identify the variable encountering the error.

VI. Disconnect Component Function

Format:

```
status = instDisconnectComponent();

unsigned int          status;

define INSTFAIL      -1 define SUCCESSFUL    0
```

The Disconnect Component function is used to terminate the association between the Caller (i.e. Peer agent extension component 32a or Local Console Facility client component 32b) and the Instrumentation Abstraction component 34, closing any open Command or Trap Indication sockets which have been established as Instrumentation Abstraction connections.

This function will close the TCP socket connection with the Instrumentation abstraction component 34 mechanism -daemon (zdsiabd) in UNIX type network operating system used to send Command Requests and Receive Command Responses. Additionally, it will close the optional TCP socket connection used to receive Trap Indications from the Instrumentation component if one is open.

This function returns SUCCESSFUL after closing any open Command or Trap Indication socket connections to the Instrumentation Abstraction component 34.

VII. Command Connect Function

Format status = iabs_cmd_connect();

Arguments:

pathstr-the path to the port file. If non-NULL, then this pathe is used to open the file. If NULL, then it is opened by either checking the local registry (Win32 Networking operating system) or assuming it is in the local directory (all other networking operating systems).

This function is used to initiate a socket connection to the Instrumentation Abstraction component 34 for passing commands.

VIII. Accept Trap Connect Function

Format:

iabs_accept_trap_connect()

Arguments:

Return:

a non-zero integer socket descriptor 0 or -1 if broken connection or other error.

This function waits for an instrumentation abstraction trap socket connection. It accepts a socket connection from the instrumentation abstraction component 34 for passing traps.

COMMON LIBRARY FUNCTIONS

I. Send PDU Function

Format:

send_pdu

Arguments:

sockfd - integer socket descriptor pdu - Instrumentation Abstraction Component PDU Return:

0 if successful

-1 if any socket error (errno is set)

This function is used to write an entire IABS PDU across the specified tcp socket. All errors evoke calls to a common error function and return with -1 and errno set.

II. Get PDU Function

Format:

get_pdu()

Arguments:

sockfd - integer socket descriptor pdu_ptr - a pointer to store a pointer to the PDU received.

This function is used to receive the PDU containing the command for the Instrucmentation Abstraction Component 34.

SERVER LIBRARY FUNCTIONS

I. Trap Connect Function

Format:

iabs_trap_connect()

Arguments:

address - string containing address to conect to (in

"xxx.xxx.xxx.xxx" format)

port - integer port number to connect to

Return:

sockfd - a non-zero integer socket descriptor

-1 error

This function is used to initiate a socket connection to the Instrumentation Abstraction component 34 for passing traps.

II. Accept Command Connection Function

Format:

iabs_accept_cmd_connect()

Arguments:

sockfd_p - pointer to integer socket file descriptor (or NULL)

iabs_port_file - string pointer to file into which port number is saved.

Integer boolean indicating that a listen socket should be created when boolean is TRUE.

This function is used to wait for an instrumentation abstraction command socket connection to occur. The function accepts a socket connection from the Instrumentation Abstraction component for passing commands.

III. Create Port File Function

Format:

create_port_file()

Arguments:

port - integer port number pfilename - string containing the pathname for the file Return:

0 is successful

-1 if error

This function creates a file with the specified pathname for communicating the server's tcp port number to clients.

APPENDIX II
MIB VARIABLES

The assigned enterprise ID used herein is 1743. Therefore, all maintained MIB variables begin with the ASN.1 syntax 1.3.6.1.4.1.1743. In the following tables, variables are described by identifying accessible MIB object names and identifiers, along with a description of each MIB object. MIB object identifiers that end with a zero digit are single instance variables, while identifiers that end with the letter N identify multiple instances where N equals the number of instances having values 1 through n.

System Information

| MIB OBJECT NAME/IDENTIFIER | TYPE | ACCESS | DESCRIPTION |
|---|---|---|---|
| zSvMIBSyProductName<br>1.3.6.1.4.1.1743.1.1.1.1.0 | Display String | Read Only | Displayable ASCII string containing the model name of the computer (e.g., Z-SERVER MX). |
| ZSvMIBSyProductID<br>1.3.6.1.4.1.1743.1.1.1.2.0 | Object ID | Read Only | SNMP Object identifier for this model:<br>1.3.6.1.4.1.1743.1.2.1 = Z Server ES<br>1.3.6.1.4.1.1743.1.2.2 = Z Server MX<br>1.3.6.1.4.1.1743.1.2.3 = Z Server WG<br>1.3.6.1.4.1.1743.1.2.4 = Z Server WL. |
| ZSvMIBSyModelNum<br>1.3.6.1.4.1.1743.1.1.1.3.0 | Display String | Read Only | Displayable ASCII string containing an alpha numerical model identification number (e.g. 49160). |
| ZSvMIBSySerialNum<br>1.3.6.1.4.1.1743.1.1.1.4.0 | Display String | Read Only | Displayable ASCII string containing an alpha numerical unit serial number. Current value displayed is zero. |
| ZSvMIBSyHWMajRev<br>1.3.6.1.4.1.1743.1.1.1.5.0 | Display String | Read Only | Displayable ASCII string containing an alpha numerical major hardware revision number (e.g. 160). |
| ZSvMIBSyHWMinRev<br>1.3.6.1.4.1.1743.1.1.1.6.0 | Display String | Read Only | Displayable ASCII string containing an alpha numerical minor hardware revision number (e.g., 1). |
| ZSvMIBSyMIBRev<br>1.3.6.1.4.1.1743.1.1.1.7.0 | Display String | Read Only | Displayable ASCII string containing an alpha numerical MIB revision number. |
| ZSvMIBSyProductNum<br>1.3.6.1.4.1.1743.1.1.1.8.0 | Integer | Read Only | The numerical model number for this specific server type. |
| ZSvMIBSyOperatingSystem<br>1.3.6.1.4.1.1743.1.1.1.9.0 | Display String | Read Only | The name of the operating system running on the server. |
| ZSvMIBSyOperatingSystemRev<br>1.3.6.1.4.1.1743.1.1.1.10.0 | Display String | Read Only | The revision of the operating system running on the server. |

Processor Configuration

| MIB OBJECT NAME/IDENTIFIER | TYPE | ACCESS | DESCRIPTION |
|---|---|---|---|
| zSvMIBcfProcTotal<br>1.3.6.1.4.1.1743.1.1.2.1.0 | Integer | Read Only | Numerical count of the number of Configured CPUs in the system:<br>1 = mono processor<br>2-n = multiprocessor. |
| ZSvMIBcfProcType<br>1.3.6.1.4.1.1743.1.1.2.2.1.2.N | Integer | Read Only | Numerical identification of the processor (e.g. CPUID model):<br>1 = unknown    2 = I486<br>3 = P24T    4 = P5<br>5 = P54C    6 = P6 |
| zSvMIBcfProcStatus<br>1.3.6.1.4.1.1743.1.1.2.2.1.3.N | Integer | Read Only | Numerical indication of results of a processor go/no go test:<br>2 = operational<br>3 = warning. |
| ZSvMIBcfProcString<br>1.3.6.1.4.1.1743.1.1.2.2.1.4.N | Display String | Read Only | Displayable ASCII string containing CPUID processor instruction vendor identification (e.g., Genuine Intel) |
| zSvMIBcfProcStep<br>1.3.6.1.4.1.1743.1.1.2.2.1.5.N | Integer | Read Only | Numerical indication of the processor stepping (revision) from the CPUID instruction (e.g., 11). |
| ZSvMIBcfProcLocation<br>1.3.6.1.4.1.1743.1.1.2.2.1.6.N | Integer | Read Only | Numerical indication of the physical location of the processor chip:<br>1 = unknown<br>2 = on motherboard<br>3 = on CPU expansion card. |
| ZSvMIBcfProcBoardNum<br>1.3.6.1.4.1.1743.1.1.2.2.1.7.N | Integer | Read Only | Numerical identification of the CPU expansion card that this processor resides on - follows CPU number (e.g. 1-n) and depends on number of processors residing on each CPU expansion card. |
| ZSvMIBcfProcBoardRev<br>1.3.6.1.4.1.1743.1.1.2.2.1.8.N | Integer | Read Only | Numerical hardware revision of the CPU expansion board. Current value displayed is zero. |
| ZSvMIBcfProcIHertz<br>1.3.6.1.4.1.1743.1.1.2.2.1.9.N | Integer | Read Only | Frequency of the processor's internal clock in Mhz (e.g., 120). See "Processor Information User Considerations". |
| ZSvMIBcfProcEHertz<br>1.3.6.1.4.1.1743.1.1.2.2.1.10.N | Integer | Read Only | Frequency of the processor's external clock in Mhz e.g., 60). See "Processor Information User Considerations". |

2b

| MIB OBJECT NAME/IDENTIFIER | TYPE | ACCESS | DESCRIPTION |
|---|---|---|---|
| zSvMIBcfProcL1DataCacheStatus<br>1.3.6.1.4.1.1743.1.1.2.2.1.11.N | Integer | Read Only | Numerical indication of the operational status of this on-chip processor data cache:<br>1 = Unknown<br>2 = Not Installed<br>3 = Enabled<br>4 = Disabled. |
| zSvMIBcfProcL1DataCacheSize<br>1.3.6.1.4.1.1743.1.1.2.2.1.12.N | Integer | Read Only | Size of this cache in bytes (e.g., 8192). |
| zSvMIBcfProcL1DataCacheAssoc<br>1.3.6.1.4.1.1743.1.1.2.2.1.13.N | Integer | Read Only | Numerical indication of cache's organization:<br>1 = direct mapped<br>2 = 2 way association<br>4 = 4 way association<br>8 = 8 way association. |
| zSvMIBcfProcL1DataCacheType<br>1.3.6.1.4.1.1743.1.1.2.2.1.14.N | Integer | Read Only | Numerical indication of this cache's type:<br>1 = Unknown<br>2 = Read Only<br>3 = Write-thru<br>4 = Write-back<br>5 = Not-installed. |
| zSvMIBcfProcL1CodeCacheStatus<br>1.3.6.1.4.1.1743.1.1.2.2.1.15.N | Integer | Read Only | Numerical indication of the operational status of this on-chip processor code cache:<br>1 = Unknown<br>2 = Not Installed<br>3 = Enabled<br>4 = Disabled. |
| zSvMIBcfProcL1CodeCacheSize<br>1.3.6.1.4.1.1743.1.1.2.2.1.16.N | Integer | Read Only | Size of this cache in bytes (e.g., 8192). |
| zSvMIBcfProcL1CodeCacheAssoc<br>1.3.6.1.4.1.1743.1.1.2.2.1.17.N | Integer | Read Only | Numerical indication of this cache's organization:<br>1 = direct mapped<br>2 = 2 way association.<br>4 = 4 way association.<br>8 = 8 way association. |
| zSvMIBcfProcL1CodeCacheType<br>1.3.6.1.4.1.1743.1.1.2.2.1.18.N | Integer | Read Only | Numerical indication of this cache's type:<br>1 = Unknown<br>2 = Read Only<br>3 = Write-thru<br>4 = Write-back<br>5 = Not-installed. |
| zSvMIBcfProcL2DataCacheStatus<br>1.3.6.1.4.1.1743.1.1.2.2.1.19.N | Integer | Read Only | Numerical indication of the operational status of this level 2 processor data cache:<br>1 = Unknown<br>2 = Not Installed<br>3 = Enabled<br>4 = Disabled. |
| zSvMIBcfProcL2DataCacheSize<br>1.3.6.1.4.1.1743.1.1.2.2.1.20.N | Integer | Read Only | Size of this cache in Kbytes (e.g., 256). |

| MIB OBJECT NAME/IDENTIFIER | TYPE | ACCESS | DESCRIPTION |
|---|---|---|---|
| zSvMIBcfProcL2DataCacheAssoc<br>1.3.6.1.4.1.1743.1.1.2.2.1.21.N | Integer | Read Only | Numerical indication of this cache's organization:<br>1 = direct mapped<br>2 = 2 way association.<br>4 = 4 way association.<br>8 = 8 way association. |
| zSvMIBcfProcL2DataCacheType<br>1.3.6.1.4.1.1743.1.1.2.2.1.22.N | Integer | Read Only | Numerical indication of this cache's type:<br>1 = Unknown<br>2 = Read Only<br>3 = Write-thru<br>4 = Write-back<br>5 = Not-installed. |
| zSvMIBcfProcL2CodeCacheStatus<br>1.3.6.1.4.1.1743.1.1.2.2.1.23.N | Integer | Read Only | Numerical indication of the operational status of this level 2 processor code cache:<br>1 = Unknown<br>2 = Not Installed<br>3 = Enabled<br>4 = Disabled. |
| zSvMIBcfProcL2CodeCacheSize<br>1.3.6.1.4.1.1743.1.1.2.2.1.24.N | Integer | Read Only | Size of this cache in Kbytes (e.g., 256). |
| zSvMIBcfProcL2CodeCacheAssoc<br>1.3.6.1.4.1.1743.1.1.2.2.1.25.N | Integer | Read Only | Numerical indication of this cache's organization:<br>1 = direct mapped<br>2 = 2 way association.<br>4 = 4 way association.<br>8 = 8 way association. |
| zSvMIBcfProcL2CodeCacheType<br>1.3.6.1.4.1.1743.1.1.2.2.1.26.N | Integer | Read Only | Numerical indication of this cache's type:<br>1 = Unknown<br>2 = Read Only<br>3 = Write-thru<br>4 = Write-back<br>5 = Not-installed. |

Processor Information User Considerations

1. The zSvMIBcfProcIHertz and zSvMIBcfProcEHertz MIB variables contain the measured values for the Pentium processor's internal and external clock frequency in megahertz. Upon starting the agent and instrumentation, these values return zero until the calculation is complete. This takes about 40 seconds.

I/O Devices

| MIB OBJECT NAME/IDENTIFIER | TYPE | ACCESS | DESCRIPTION |
|---|---|---|---|
| zSvMIBcfIOPhysicalSlotTotal 1.3.6.1.4.1.1743.1.1.2.3.0 | Integer | Read Only | Numerical count of the total number of physical I/O expansion slots in the system. Note that this is the total number of usable expansion slots. Combination expansion slots have the potential to accept cards of different bus types (EISA or PCI) but physical space only allows the insertion of one card at a time. Therefore, combination I/O slots count only as one slot. |
| ZSvMIBcfIOSlotTotal 1.3.6.1.4.1.1743.1.1.2.4.N | Integer | Read Only | Numerical count of the total number of physical and embedded virtual I/O slots in the system (i.e. number of entries in the I/O table). |
| ZSvMIBcfIOCardType 1.3.6.1.4.1.1743.1.1.2.5.1.2.N | Integer | Read Only | Numerical identification of the EISA function type or PCI base class. Refer to the MIB for definitions. |
| ZSvMIBcfIOCardString 1.3.6.1.4.1.1743.1.1.2.5.1.3.N | Display String | Read Only | Displayable ASCII string containing EISA Function String. COM1, ASY;COM, "PCI I/O Device". |
| ZSvMIBcfIOCardStatus 1.3.6.1.4.1.1743.1.1.2.5.1.4.N | Integer | Read Only | Numerical indication of "Go/No Go" test to determine the operational status of the device: 1 = Unknown    4 = Testing 2 = Operational    5 = Disabled. 3 = Warning |
| zSvMIBcfIOMfgID 1.3.6.1.4.1.1743.1.1.2.5.1.5.N | Integer | Read Only | Numerical identification of the manufacturer of this device. |
| ZSvMIBcfIOProductID 1.3.6.1.4.1.1743.1.1.2.5.1.6.N | Integer | Read Only | Numerical identification of this device from EISA ID product byte or PCI Device ID. |
| ZSvMIBcfIORev 1.3.6.1.4.1.1743.1.1.2.5.1.7.N | Integer | Read Only | Numerical identification of the revision of this device from EISA ID revision byte or PCI revision. |
| ZSvMIBcfIOAddrLo 1.3.6.1.4.1.1743.1.1.2.5.1.8.N | Integer | Read Only | Base EISA I/O Port from EISA card Function information or PCI I/O mapped Base Address Register. |
| ZSvMIBcfIOAddrHi 1.3.6.1.4.1.1743.1.1.2.5.1.9.N | Integer | Read Only | Upper limit EISA I/O Port from EISA card Function information; always zero for PCI device. |
| ZSvMIBcfIOIRQ 1.3.6.1.4.1.1743.1.1.2.5.1.10.N | Integer | Read Only | Numerical identification of the Interrupt Request Line used by this I/O card. |
| ZSvMIBcfIORAMLo 1.3.6.1.4.1.1743.1.1.2.5.1.11.N | Integer | Read Only | Base EISA I/O Card RAM address from EISA card Function information or PCI device memory Base Address Register. |
| ZSvMIBcfIORAMHi 1.3.6.1.4.1.1743.1.1.2.5.1.12.N | Integer | Read Only | Upper limit EISA I/O Card RAM address from EISA card Function information; always zero for PCI device. |
| ZSvMIBcfIOROMLo 1.3.6.1.4.1.1743.1.1.2.5.1.13.N | Integer | Read Only | Base EISA I/O Card ROM address from EISA card Function information or PCI device Read Only Memory Base Address Register. |

5b

| MIB OBJECT NAME/IDENTIFIER | TYPE | ACCESS | DESCRIPTION |
|---|---|---|---|
| zSvMIBcfIOROMHi<br>1.3.6.1.4.1.1743.1.1.2.5.1.14.N | Integer | Read Only | Upper limit EISA I/O Card ROM address from EISA card Function information; always zero for PCI device. |
| ZSvMIBcfIOSubtype<br>1.3.6.1.4.1.1743.1.1.2.5.1.15.N | Integer | Read Only | Numerical Identification of the EISA function subtype or PCI sub-class for this EISA card or PCI device. Refer to the MIB for definitions. |
| ZSvMIBcfIOName<br>1.3.6.1.4.1.1743.1.1.2.5.1.16.N | Display String | Read Only | Displayable ASCII string describing the I/O card in the slot represented by this entry in this table. This value can originate from the Plug and Play ISA card ANSI Identifier String Resource. |
| ZSvMIBcfIOMfg<br>1.3.6.1.4.1.1743.1.1.2.5.1.17.N | Display String | Read Only | Displayable ASCII string containing EISA ID manufacturer string or PCI Vendor ID configuration register. |
| ZSvMIBcfIOProductName<br>1.3.6.1.4.1.1743.1.1.2.5.1.18.N | Display String | Read Only | The manufacturer's product name, e.g. 8013EWC, AHA-1542B. This value can originate from the Plug and Play ISA card ANSI Identifier String Resource. |
| ZSvMIBcfIOBusType<br>1.3.6.1.4.1.1743.1.1.2.5.1.19.N | Integer | Read Only | Numerical indication of the type of I/O bus architecture this card is plugged into:<br>1 = unknown     5 = PCMCIA<br>2 = ISA         6 = EISA/PCI combo<br>3 = EISA        7 = ISA/PCI combo.<br>4 = PCI |
| zSvMIBcfIODMAType<br>1.3.6.1.4.1.1743.1.1.2.5.1.20.N | Integer | Read Only | Numerical indication of the type of DMA this EISA card supports:<br>1 = none              5 = Type C<br>2 = ISA compatible   6 = Type F<br>3 = Type A           7 = Bus Master.<br>4 = Type B |
| zSvMIBcfIODMAChannel<br>1.3.6.1.4.1.1743.1.1.2.5.1.21.N | Integer | Read Only | Numerical identification of the DMA channel this card is configured to use if using DMA. |
| ZSvMIBcfIODMATransfer<br>1.3.6.1.4.1.1743.1.1.2.5.1.22.N | Integer | Read Only | Numerical indication of the DMA transfer width:<br>1 = 8-bit<br>2 = 16-bit<br>3 = 32-bit. |
| ZSvMIBcfIOErrorStatus<br>1.3.6.1.4.1.1743.1.1.2.5.1.23.N | Integer | Read Only | Numerical value of the PCI Status configuration register; always zero for EISA. Refer to PCI Local Bus Specification Rev.2.1, Section 6.2.3, Device Status. |
| ZSvMIBcfPCICommand<br>1.3.6.1.4.1.1743.1.1.2.5.1.24.N | Integer | Read Only | Numerical value of the PCI Command configuration register; always zero for EISA. Refer to PCI Local Bus Specification Rev.2.1, Section 6.2.2, Device Control. |
| ZSvMIBcfPCIHeaderType<br>1.3.6.1.4.1.1743.1.1.2.5.1.25.N | Integer | Read Only | Numerical value of the PCI Header Type configuration register; always zero for EISA. Refer to PCI Local Bus Specification Rev.2.1, Section 6.1, Configuration Space Organization. |

| MIB OBJECT NAME/IDENTIFIER | TYPE | ACCESS | DESCRIPTION |
|---|---|---|---|
| zSvMIBcfPCIIntPin<br>1.3.6.1.4.1.1743.1.1.2.5.1.26.N | Integer | Read Only | Numerical value of the PCI Interrupt Pin configuration register; always zero for EISA. Refer to PCI Local Bus Specification Rev.2.1, Section 6.2.4, Miscellaneous Functions. |
| ZSvMIBcfPCIBus<br>1.3.6.1.4.1.1743.1.1.2.5.1.27.N | Integer | Read Only | Numerical value (1 - 256) of the PCI bus to which the PCI device is attached; always zero for EISA. |
| ZSvMIBcfIODevice<br>1.3.6.1.4.1.1743.1.1.2.5.1.28.N | Integer | Read Only | Numerical value (1 - 256) of the PCI device number or EISA slot number. |
| ZSvMIBcfInternalDevice<br>1.3.6.1.4.1.1743.1.1.2.5.1.29.N | Integer | Read Only | Numerical indication of the device type:<br>1 = embedded (integrated)<br>2 = external. |

I/O Devices User Considerations

1. I/O Configuration Information. Configuration Information for I/O devices is derived from PCI and EISA configuration information. EISA configuration information is set up by the System Configuration Utility (SCU). If the SCU is not used or if the EISA configuration is otherwise incomplete, data for EISA I/O devices could be incorrect.

Drive Bay Configuration

| MIB OBJECT NAME/IDENTIFIER | TYPE | ACCESS | DESCRIPTION |
|---|---|---|---|
| zSvMIBcfDriveBayTotal<br>1.3.6.1.4.1.1743.1.1.2.6.0 | Integer | Read Only | Numerical count of the number of drive bays provided by this model's cabinet. |
| ZSvMIBcfDriveType<br>1.3.6.1.4.1.1743.1.1.2.7.1.2.N | Integer | Read Only | Numerical indication of the type of device located in this bay:<br>1 = unknown    4 = floppy<br>2 = empty      5 = CD-ROM<br>3 = disk        6 = Tape. |
| ZSvMIBcfDriveString<br>1.3.6.1.4.1.1743.1.1.2.7.1.3.N | Display String | Read Only | Displayable ASCII string that identifies the SCSI Device from the SCSI Inquiry Data. |
| ZSvMIBcfDriveStatus<br>1.3.6.1.4.1.1743.1.1.2.7.1.4.N | Integer | Read Only | Numerical indication of the operational status of the SCSI drive SCSI Inquiry Data as Go/No Go test:<br>1 = unknown    4 = testing<br>2 = operational  5 = disabled.<br>3 = warning |
| ZSvMIBcfDriveMfg<br>1.3.6.1.4.1.1743.1.1.2.7.1.5.N | Display String | Read Only | Displayable ASCII string that identifies the SCSI Device manufacturer from the SCSI Inquiry Data. |
| ZSvMIBcfDriveProductName<br>1.3.6.1.4.1.1743.1.1.2.7.1.6.N | Display String | Read Only | Displayable ASCII string that identifies the SCSI Device model from the SCSI Inquiry Data. |
| ZSvMIBcfDriveRev<br>1.3.6.1.4.1.1743.1.1.2.7.1.7.N | Integer | Read Only | Numerical indication of the Device's revision. |
| ZSvMIBcfDriveCapacity<br>1.3.6.1.4.1.1743.1.1.2.7.1.8.N | Integer | Read Only | Numerical indication of the unformatted capacity of the device in kilobyte. |
| ZSvMIBcfDriveBayType<br>1.3.6.1.4.1.1743.1.1.2.7.1.9.N | Integer | Read Only | Numerical indication of the type of bay this device resides in. Derived from model:<br>1 = unknown<br>2 = internal<br>3 = external<br>4 = hot-pluggable |

Firmware

| MIB OBJECT NAME/IDENTIFIER | TYPE | ACCESS | DESCRIPTION |
|---|---|---|---|
| zSvMIBcfFWTotal<br>1.3.6.1.4.1.1743.1.1.2.8.0 | Integer | Read Only | Numerical count of the number of BIOS Firmware loads for the embedded devices in this system |
| zSvMIBcfFWType<br>1.3.6.1.4.1.1743.1.1.2.9.1.2.N | Integer | Read Only | The type of firmware load represented by this entry:<br>1= unknown<br>2= system BIOS<br>3= video BIOS<br>4= SCSI BIOS. |
| ZSvMIBcfFWString<br>1.3.6.1.4.1.1743.1.1.2.9.1.3.N | Display String | Read Only | Displayable ASCII string containing the name of the manufacturer of this entry's BIOS. |
| ZSvMIBcfFWDate<br>1.3.6.1.4.1.1743.1.1.2.9.1.4.N | Display String | Read Only | Displayable ASCII string containing the BIOS revision date. |
| ZSvMIBcfFWRev<br>1.3.6.1.4.1.1743.1.1.2.9.1.5.N | Display String | Read Only | Displayable ASCII string containing the BIOS alpha-numeric revision identifier. |
| ZSvMIBcfFWAddr<br>1.3.6.1.4.1.1743.1.1.2.9.1.6.N | Integer | Read Only | Numerical starting address of the BIOS code in memory. |
| ZSvMIBcfFWSize<br>1.3.6.1.4.1.1743.1.1.2.9.1.7.N | Integer | Read Only | Numerical size of the BIOS code in memory in units of bytes. |

Memory Subsystems

| MIB OBJECT NAME/IDENTIFIER | TYPE | ACCESS | DESCRIPTION |
|---|---|---|---|
| zSvMIBcfMemTotal<br>1.3.6.1.4.1.1743.1.1.2.10.0 | Integer | Read Only | Numerical count of the number of Memory subsystems in the system. |
| ZSvMIBcfMemSize<br>1.3.6.1.4.1.1743.1.1.2.11.1.2.N | Integer | Read Only | Numerical value of the actual configured size of the total memory installed in the server in units of mega bytes. |
| ZSvMIBcfMemCapacity<br>1.3.6.1.4.1.1743.1.1.2.11.1.3.N | Integer | Read Only | Numerical value of the maximum configurable size for the memory in this subsystem in units of mega bytes. Derived from model. |
| ZSvMIBcfMemBanks<br>1.3.6.1.4.1.1743.1.1.2.11.1.4.N | Integer | Read Only | Numerical count of the number of SIMM banks or groups in this memory subsystem. |
| ZSvMIBcfMemSIMMs<br>1.3.6.1.4.1.1743.1.1.2.11.1.5.N | Integer | Read Only | Numerical count of the number of physical SIMM slots in this memory subsystem. |
| ZSvMIBcfMemECC<br>1.3.6.1.4.1.1743.1.1.2.11.1.6.N | Integer | Read Only | Numerical indication of the type of ECC used by this memory subsystem:<br>1 = unknown<br>2 = none<br>3 = single bit ECC<br>4 = multi bit ECC. |

CPU Expansion

| MIB OBJECT NAME/IDENTIFIER | TYPE | ACCESS | DESCRIPTION |
|---|---|---|---|
| zSvMIBcfCPUBoardTotal<br>1.3.6.1.4.1.1743.1.1.2.12.0 | Integer | Read Only | Numerical count of the number of CPU expansion boards in the system. |
| ZSvMIBcfCPUBoardType<br>1.3.6.1.4.1.1743.1.1.2.13.1.2.N | Integer | Read Only | Numerical indication of the type of CPU subsystem:<br>1 = unknown<br>2 = motherboard<br>3 = RFU<br>4 = RFU<br>5 = Z-SERVER MX. |
| ZSvMIBcfCPUBoardStatus<br>1.3.6.1.4.1.1743.1.1.2.13.1.3.N | Integer | Read Only | Numerical indication of the operational status of the CPU subsystem:<br>1 = unknown<br>2 = operational<br>3 = warning<br>4 = testing<br>5 = disabled. |
| ZSvMIBcfCPUBoardRev<br>1.3.6.1.4.1.1743.1.1.2.13.1.4.N | Integer | Read Only | Numerical revision of the CPU subsystem. Current value displayed is zero. |
| ZSvMIBcfCPUBoardPCount<br>1.3.6.1.4.1.1743.1.1.2.13.1.5.N | Integer | Read Only | Numerical count of the number of processors resident in this CPU subsystem |

I/O (Input/Output)

| MIB OBJECT NAME/IDENTIFIER | TYPE | ACCESS | DESCRIPTION |
|---|---|---|---|
| zSvMIBioParallelTotal<br>1.3.6.1.4.1.1743.1.1.3.1.0 | Integer | Read Only | Numerical count of the number of parallel ports configured on the system base board. |
| ZSvMIBioParallelType<br>1.3.6.1.4.1.1743.1.1.3.2.1.2.N | Integer | Read Only | Numerical indication of the type of parallel port:<br>1 = unknown<br>2 = other<br>3 = uni-directional<br>4 = bi-directional. |
| ZSvMIBioParallelStatus<br>1.3.6.1.4.1.1743.1.1.3.2.1.3.N | Integer | Read Only | Numerical indication of the operational status of this parallel port:<br>1 = unknown    4 = testing<br>2 = operational    5 = disabled<br>3 = warning. |
| ZSvMIBioParallelIOAddrLo<br>1.3.6.1.4.1.1743.1.1.3.2.1.4.N | Integer | Read Only | Numerical value of the configured base I/O port for this parallel port. |
| ZSvMIBioParallelIOAddrHi<br>1.3.6.1.4.1.1743.1.1.3.2.1.5.N | Integer | Read Only | Numerical value of the last (upper limit) configured I/O port for this parallel port. |
| ZSvMIBioParallelIRQ<br>1.3.6.1.4.1.1743.1.1.3.2.1.6.N | Integer | Read Only | Numerical indication of the Interrupt Request Line used by this parallel port. |
| ZSvMIBioSerialTotal<br>1.3.6.1.4.1.1743.1.1.3.3.0 | Integer | Read Only | Numerical count of the number of serial comm ports in the system. |
| ZSvMIBioSerialType<br>1.3.6.1.4.1.1743.1.1.3.4.1.2.N | Integer | Read Only | Numerical indication of the type of serial comm port:<br>1 = unknown<br>2 = other<br>3 = XT/AT compatible<br>4 = 16450 UART<br>5 = 16550 UART<br>6 = 16550A UART. |
| ZSvMIBioSerialStatus<br>1.3.6.1.4.1.1743.1.1.3.4.1.3.N | Integer | Read Only | Numerical indication of the operational status of this serial port:<br>1 = unknown<br>2 = operational<br>3 = warning<br>4 = testing<br>5 = disabled. |
| ZSvMIBioSerialIOAddrLo<br>1.3.6.1.4.1.1743.1.1.3.4.1.4.N | Integer | Read Only | Numerical value of the configured base I/O port for this serial port. |
| ZSvMIBioSerialIOAddrHi<br>1.3.6.1.4.1.1743.1.1.3.4.1.5.N | Integer | Read Only | Numerical value of the last (upper limit) configured I/O port for this serial port. |
| ZSvMIBioSerialIRQ<br>1.3.6.1.4.1.1743.1.1.3.4.1.6.N | Integer | Read Only | Numerical indication of the Interrupt Request Line used by this serial port. |

Power

| MIB OBJECT NAME/IDENTIFIER | TYPE | ACCESS | DESCRIPTION |
|---|---|---|---|
| zSvMIBpwPowerTotal<br>1.3.6.1.4.1.1743.1.1.4.1.0 | Integer | Read Only | Numerical count of the number of power supplies in the system. |
| ZSvMIBpwPowerType<br>1.3.6.1.4.1.1743.1.1.4.2.1.2.N | Integer | Read Only | Numerical indication of the type of power supplies:<br>1 = unknown<br>2 = LT230 (230 watts)<br>3 = EX500 (500 watts). |

Performance

| MIB OBJECT NAME/IDENTIFIER | TYPE | ACCESS | DESCRIPTION |
|---|---|---|---|
| zSvMIBpfMBCStatTotal<br>1.3.6.1.4.1.1743.1.1.5.1.0 | Integer | Read Only | Numerical count of the number of CPU subsystem statistical sets available for performance monitoring. |
| ZSvMIBpfMBCStatEnable<br>1.3.6.1.4.1.1743.1.1.5.2.1.2.N | Integer | Read Write | Numerical value used to enable one of the two possible statistical groups for collection:<br>1 = disable statistic collection<br>2 = enable group A collection<br>3 = enable group B collection. |
| ZSvMIBpfTimeStamp<br>1.3.6.1.4.1.1743.1.1.5.2.1.3.N | Octet string | Read Only | Numerical value from the Pentium TimeStamp counter associated with this CPU subsystem. Register contents from RDMSR/WRMSR instructions TimeStamp ctr (ECX = 0x10). |
| ZSvMIBpfInsts<br>1.3.6.1.4.1.1743.1.1.5.2.1.4.N | Octet string | Read Write | Numerical value from 1 of two Pentium counters dedicated to counting instructions when group A statistics are enabled. RDMSR/WRMSR P5 ctr0 (ECX = 0x12). |
| ZSvMIBpfIOs<br>1.3.6.1.4.1.1743.1.1.5.2.1.5.N | Octet string | Read Write | Numerical value from 1 of two Pentium counters dedicated to counting I/O cycles when group B statistics are enabled. RDMSR/WRMSR P5 ctr0 (ECX = 0x12). |
| ZSvMIBpfHWINTs<br>1.3.6.1.4.1.1743.1.1.5.2.1.6.N | Octet string | Read Write | Numerical value associated with 1 of two Pentium counters dedicated to counting Interrupts when either Group A or B statistics are enabled. RDMSR/WRMSR P5 ctr1 (ECX = 0x13). |

Monitor

| MIB OBJECT NAME/IDENTIFIER | TYPE | ACCESS | DESCRIPTION |
|---|---|---|---|
| zSvMIBmnTotal<br>1.3.6.1.4.1.1743.1.1.6.1.0 | Integer | Read Only | Numerical count of the number of local monitoring (i.e. local polling and data collecting) sets in the system (always 4). |
| zSvMIBmnObject<br>1.3.6.1.4.1.1743.1.1.6.2.1.2.N | Object Ident | Read Write | User definable OID for identifying which MIB object to monitor locally (e.g. 1.3.6.1.4.1.1734. 126.1.1.10.1 for zSvMIBEvTemp1). |
| ZSvMIBmnDuration<br>1.3.6.1.4.1.1743.1.1.6.2.1.3.N | Integer | Read Write | User definable number of polls for monitor operation (0= infinite). |
| ZSvMIBmnPoll<br>1.3.6.1.4.1.1743.1.1.6.2.1.4.N | Integer | Read Write | User definable monitor Poll interval in seconds (0=disable monitoring). |
| ZSvMIBmnData<br>1.3.6.1.4.1.1743.1.1.6.2.1.5.N | Octet string | Read Only | Agent resident storage for collected monitor data for remote retrieval by the Network Manager. |
| ZSvMIBmnMaxDataSize<br>1.3.6.1.4.1.1743.1.1.6.2.1.6.N | Integer | Read Write | User specified Maximum amount of data to collect in the data collection buffer in bytes (max=252). |
| ZSvMIBmnUserTrapTotal<br>1.3.6.1.4.1.1743.1.1.6.3.0 | Integer | Read Only | Numerical count of the number of User definable Traps (always 4). |
| ZSvMIBmnUserTrapObject<br>1.3.6.1.4.1.1743.1.1.6.4.1.2.N | Object Ident | Read Write | User definable OID for identifying which MIB integer or counter object to poll locally to test when over/under threshold condition is true. |
| ZSvMIBmnUserTrapDuration<br>1.3.6.1.4.1.1743.1.1.6.4.1.3.N | Integer | Read Write | User definable number of polls for trap polling operation (0= infinite). |
| ZSvMIBmnUserTrapPoll<br>1.3.6.1.4.1.1743.1.1.6.4.1.4.N | Integer | Read Write | User definable trap poll interval in seconds (0=disable trap polling). |
| ZSvMIBmnUserTrapHiWater<br>1.3.6.1.4.1.1743.1.1.6.4.1.5.N | Integer | Read Write | User definable upper threshold limits; action is taken (e.g. trap generated) when polled value is greater than this threshold. |
| ZSvMIBmnUserTrapHiAction<br>1.3.6.1.4.1.1743.1.1.6.4.1.6.N | Integer | Read Write | User definable high water threshold action to be taken (e.g. generate trap):<br>1 = generate zSvMIBTpUserTrapHi trap<br>2 = set high object<br>3 = increment high object<br>4 = decrement high object. |
| ZSvMIBmnUserTrapHiObjectValue<br>1.3.6.1.4.1.1743.1.1.6.4.1.7.N | Integer | Read Write | User definable value to use when high action is to set object to value. |
| ZSvMIBmnUserTrapHiObject<br>1.3.6.1.4.1.1743.1.1.6.4.1.8.N | Object Indent. | Read Write | User definable Object of the high action (e.g. set this object). |
| ZSvMIBmnUserTrapLoWater<br>1.3.6.1.4.1.1743.1.1.6.4.1.9.N | Integer | Read Write | User definable lower threshold limits; action is taken (e.g. trap generated) when polled value is lower than this threshold. |
| zSvMIBmnUserTrapLoAction<br>1.3.6.1.4.1.1743.1.1.6.4.1.10.N | Integer | Read Write | User definable low water threshold action to be taken (e.g. generate trap).<br>1 = generate zSvMIBTpUserTrapLo trap<br>2 = set low object<br>3 = increment low object<br>4 = decrement low object |
| zSvMIBmnUserTrapLoObjectValue<br>1.3.6.1.4.1.1743.1.1.6.4.1.11.N | Integer | Read Write | User definable value to use when low action is to set object to value. |
| ZSvMIBmnUserTrapLoObject<br>1.3.6.1.4.1.1743.1.1.6.4.1.12.N | Object | Read Write | User definable Object of the low action (e.g. set this object). |

History

| MIB OBJECT NAME/IDENTIFIER | TYPE | ACCESS | DESCRIPTION |
|---|---|---|---|
| zSvMIBhsMemReds<br>1.3.6.1.4.1.1743.1.1.7.1.0 | Counter | Read Write | The number of uncorrectable memory errors that have occurred prior to the last zSvMIBTpMemRed trap. This variable can be reset to zero by the user. |
| ZSvMIBhsMemYellows<br>1.3.6.1.4.1.1743.1.1.7.2.0 | Counter | Read Write | The number of correctable memory errors that have occurred prior to the last zSvMIBTpMemYellow trap. This variable can be reset to zero by the user. |
| zSvMIBhsADC1WarningLowerLimit<br>1.3.6.1.4.1.1743.1.1.7.3.0<br>zSvMIBhsADC1WarningUpperLimit<br>1.3.6.1.4.1.1743.1.1.7.4.0<br>zSvMIBhsADC1FatalLowerLimit<br>1.3.6.1.4.1.1743.1.1.7.5.0<br>zSvMIBhsADC1FatalUpperLimit<br>1.3.6.1.4.1.1743.1.1.7.6.0<br>zSvMIBhsADC2WarningLowerLimit<br>1.3.6.1.4.1.1743.1.1.7.7.0<br>zSvMIBhsADC2WarningUpperLimit<br>1.3.6.1.4.1.1743.1.1.7.8.0<br>zSvMIBhsADC2FatalLowerLimit<br>1.3.6.1.4.1.1743.1.1.7.9.0<br>zSvMIBhsADC2FatalUpperLimit<br>1.3.6.1.4.1.1743.1.1.7.10.0<br>zSvMIBhsADC3WarningLowerLimit<br>1.3.6.1.4.1.1743.1.1.7.11.0<br>zSvMIBhsADC3WarningUpperLimit<br>1.3.6.1.4.1.1743.1.1.7.12.0<br>zSvMIBhsADC3FatalLowerLimit<br>1.3.6.1.4.1.1743.1.1.7.13.0<br>zSvMIBhsADC3FatalUpperLimit<br>1.3.6.1.4.1.1743.1.1.7.14.0<br>zSvMIBhsADC4WarningLowerLimit<br>1.3.6.1.4.1.1743.1.1.7.15.0<br>zSvMIBhsADC4WarningUpperLimit<br>1.3.6.1.4.1.1743.1.1.7.16.0<br>zSvMIBhsADC4FatalLowerLimit<br>1.3.6.1.4.1.1743.1.1.7.17.0<br>zSvMIBhsADC4FatalUpperLimit<br>1.3.6.1.4.1.1743.1.1.7.18.0<br>zSvMIBhsADC5WarningLowerLimit<br>1.3.6.1.4.1.1743.1.1.7.19.0<br>zSvMIBhsADC5WarningUpperLimit<br>1.3.6.1.4.1.1743.1.1.7.20.0<br>zSvMIBhsADC5FatalLowerLimit<br>1.3.6.1.4.1.1743.1.1.7.21.0<br>zSvMIBhsADC5FatalUpperLimit<br>1.3.6.1.4.1.1743.1.1.7.22.0<br>zSvMIBhsADC6WarningLowerLimit<br>1.3.6.1.4.1.1743.1.1.7.23.0<br>zSvMIBhsADC6WarningUpperLimit<br>1.3.6.1.4.1.1743.1.1.7.24.0<br>zSvMIBhsADC6FatalLowerLimit<br>1.3.6.1.4.1.1743.1.1.7.25.0 | Integer | Read Write | The accumulated number of times that the specific analog to digital converter channel has exceeded it's limit. |

| MIB OBJECT NAME/IDENTIFIER | TYPE | ACCESS | DESCRIPTION |
|---|---|---|---|
| zSvMIBhsADC6FatalUpperLimit 1.3.6.1.4.1.1743.1.1.7.26.0 | | | |
| zSvMIBhsADC7WarningLowerLimit 1.3.6.1.4.1.1743.1.1.7.27.0 | | | |
| zSvMIBhsADC7WarningUpperLimit 1.3.6.1.4.1.1743.1.1.7.28.0 | | | |
| zSvMIBhsADC7FatalLowerLimit 1.3.6.1.4.1.1743.1.1.7.29.0 | | | |
| zSvMIBhsADC7FatalUpperLimit 1.3.6.1.4.1.1743.1.1.7.30.0 | | | |
| zSvMIBhsADC8WarningLowerLimit 1.3.6.1.4.1.1743.1.1.7.31.0 | | | |
| zSvMIBhsADC8WarningUpperLimit 1.3.6.1.4.1.1743.1.1.7.32.0 | | | |
| zSvMIBhsADC8FatalLowerLimit 1.3.6.1.4.1.1743.1.1.7.33.0 | | | |
| zSvMIBhsADC8FatalUpperLimit 1.3.6.1.4.1.1743.1.1.7.34.0 | | | |

Control

| MIB OBJECT NAME/IDENTIFIER | TYPE | ACCESS | DESCRIPTION |
|---|---|---|---|
| zSvMIBctReset 1.3.6.1.4.1.1743.1.1.9.1.0 | Integer | Read Write | Numerical value used for initiating a system warm reset when set to a non-zero value. |
| ZSvMIBctReboot 1.3.6.1.4.1.1743.1.1.9.2.0 | Integer | Read Write | Numerical value used for initiating a system soft reboot when set to a non-zero value. |
| ZSvMIBctPowerDown 1.3.6.1.4.1.1743.1.1.9.3.0 | Integer | Read Write | Numerical value used for initiating a system power off when set to a non-zero value. |

Environment

| MIB OBJECT NAME/IDENTIFIER | TYPE | ACCESS | DESCRIPTION |
|---|---|---|---|
| zSvMIBEvTemp1<br>1.3.6.1.4.1.1743.1.1.10.1.0 | Integer | Read Only | Encoded representation of the first cabinet temperature as read from the Analog to Digital Converter (ADC). |
| zSvMIBEvTemp2<br>1.3.6.1.4.1.1743.1.1.10.2.0 | Integer | Read Only | Encoded representation of the second cabinet temperature as read from the Analog to Digital Converter (ADC). |
| zSvMIBEvUserHiTemp1<br>1.3.6.1.4.1.1743.1.1.10.3.0 | Integer | Read Write | Numerical value to be used as a high water mark for comparison against the Temp1. If the value returned by the Temp 1 sensor exceeds this value, a zSvMIBTpUserHiTemp1 trap will be generated.. |
| zSvMIBEvUserHiTemp2<br>1.3.6.1.4.1.1743.1.1.10.4.0 | Integer | Read Write | Numerical value to be used as a high water mark for comparison against the Temp2. If the value returned by the Temp 2 sensor exceeds this value, a zSvMIBTpUserHiTemp2 trap will be generated. |
| zSvMIBEvUserLoTemp1<br>1.3.6.1.4.1.1743.1.1.10.5.0 | Integer | Read Write | Numerical value to be used as a low water mark for comparison against the Temp1. If the value returned by the Temp 1 sensor is lower than this value, a zSvMIBTpUserLoTemp1 trap will be generated. |
| zSvMIBEvUserLoTemp2<br>1.3.6.1.4.1.1743.1.1.10.6.0 | Integer | Read Write | Numerical value to be used as a low water mark for comparison against the Temp2. If the value returned by the Temp 2 sensor is lower than this value, a zSvMIBTpUserLoTemp2 trap will be generated. |
| ZSvMIBEvDoorOpen<br>1.3.6.1.4.1.1743.1.1.10.8.0 | Integer | Read Only | A boolean value that when non-zero indicates that the system cabinet door is open. A non-zero value for this variable will generate a zSvMIBTpDoorOpen trap. |
| ZSvMIBEvFanFailure<br>1.3.6.1.4.1.1743.1.1.10.9.0 | Integer | Read Only | A boolean value that when non-zero indicates that there has been a failure of the cabinet cooling fan. A non-zero value for this variable will generate a zSvMIBTpFanFailure trap. |
| zSvMIBEvMemReds<br>1.3.6.1.4.1.1743.1.1.10.10.0 | Counter | Read Only | The number of uncorrectable memory errors that have occurred since the last zSvMIBTpMemRed trap. A non-zero value for this MIB variable will generate a zSvMIBTpMemRed trap. The number of memory errors that have occurred prior to the last zSvMIBTpMemRed trap can be found in the History section. |

16b

| MIB OBJECT NAME/IDENTIFIER | TYPE | ACCESS | DESCRIPTION |
|---|---|---|---|
| zSvMIBEvMemYellows<br>1.3.6.1.4.1.1743.1.1.10.11.0 | Counter | Read Only | The number of correctable memory errors that have occurred since the last zSvMIBTpMemYellow trap. A non-zero value for this MIB variable will generate a zSvMIBTpMemYellow trap. The number of memory errors that have occurred prior to the last zSvMIBTpMemYellow trap can be found in the History section. |
| zSvMIBEvSIMMYerr0<br>1.3.6.1.4.1.1743.1.1.10.12.0 | Integer | Read Only | Numerical identification of the last SIMM to have a correctable memory error. |
| zSvMIBEvSIMMRerr0<br>1.3.6.1.4.1.1743.1.1.10.13.0 | Integer | Read Only | Numerical identification of the last SIMM to have an uncorrectable memory error. |
| zSvMIBEvADC1WarningLowerLimit<br>1.3.6.1.4.1.1743.1.1.10.14.0<br>zSvMIBEvADC1WarningUpperLimit<br>1.3.6.1.4.1.1743.1.1.10.15.0<br>zSvMIBEvADC1FatalLowerLimit<br>1.3.6.1.4.1.1743.1.1.10.16.0<br>zSvMIBEvADC1FatalUpperLimit<br>1.3.6.1.4.1.1743.1.1.10.17.0<br>zSvMIBEvADC2WarningLowerLimit<br>1.3.6.1.4.1.1743.1.1.10.18.0<br>zSvMIBEvADC2WarningUpperLimit<br>1.3.6.1.4.1.1743.1.1.10.19.0<br>zSvMIBEvADC2FatalLowerLimit<br>1.3.6.1.4.1.1743.1.1.10.20.0<br>zSvMIBEvADC2FatalUpperLimit<br>1.3.6.1.4.1.1743.1.1.10.21.0<br>zSvMIBEvADC3WarningLowerLimit<br>1.3.6.1.4.1.1743.1.1.10.22.0<br>zSvMIBEvADC3WarningUpperLimit<br>1.3.6.1.4.1.1743.1.1.10.23.0<br>zSvMIBEvADC3FatalLowerLimit<br>1.3.6.1.4.1.1743.1.1.10.24.0<br>SvMIBEvADC3FatalUpperLimit<br>1.3.6.1.4.1.1743.1.1.10.25.0<br>zSvMIBEvADC4WarningLowerLimit<br>1.3.6.1.4.1.1743.1.1.10.26.0<br>zSvMIBEvADC4WarningUpperLimit<br>1.3.6.1.4.1.1743.1.1.10.27.0<br>zSvMIBEvADC4FatalLowerLimit<br>1.3.6.1.4.1.1743.1.1.10.28.0<br>zSvMIBEvADC4FatalUpperLimit<br>1.3.6.1.4.1.1743.1.1.10.29.0<br>zSvMIBEvADC5WarningLowerLimit<br>1.3.6.1.4.1.1743.1.1.10.30.0<br>zSvMIBEvADC5WarningUpperLimit<br>1.3.6.1.4.1.1743.1.1.10.31.0<br>zSvMIBEvADC5FatalLowerLimit<br>1.3.6.1.4.1.1743.1.1.10.32.0<br>zSvMIBEvADC5FatalUpperLimit<br>1.3.6.1.4.1.1743.1.1.10.33.0 | Integer | Read Write | The number of times that this specific analog to digital converter channel has exceeded this limit. These variables are reset to zero whenever they are written to (any value) and their previous contents are accumulated in the related MIB variable in the history section. |

| MIB OBJECT NAME/IDENTIFIER | TYPE | ACCESS | DESCRIPTION |
|---|---|---|---|
| zSvMIBEvADC6WarningLowerLimit<br>1.3.6.1.4.1.1743.1.1.10.34.0 | | | |
| zSvMIBEvADC6WarningUpperLimit<br>1.3.6.1.4.1.1743.1.1.10.35.0 | | | |
| zSvMIBEvADC6FatalLowerLimit<br>1.3.6.1.4.1.1743.1.1.10.36.0 | | | |
| zSvMIBEvADC6FatalUpperLimit<br>1.3.6.1.4.1.1743.1.1.10.37.0 | | | |
| zSvMIBEvADC7WarningLowerLimit<br>1.3.6.1.4.1.1743.1.1.10.38.0 | | | |
| zSvMIBEvADC7WarningUpperLimit<br>1.3.6.1.4.1.1743.1.1.10.39.0 | | | |
| zSvMIBEvADC7FatalLowerLimit<br>1.3.6.1.4.1.1743.1.1.10.40.0 | | | |
| zSvMIBEvADC7FatalUpperLimit<br>1.3.6.1.4.1.1743.1.1.10.41.0 | | | |
| zSvMIBEvADC8WarningLowerLimit<br>1.3.6.1.4.1.1743.1.1.10.42.0 | | | |
| zSvMIBEvADC8WarningUpperLimit<br>1.3.6.1.4.1.1743.1.1.10.43.0 | | | |
| zSvMIBEvADC8FatalLowerLimit<br>1.3.6.1.4.1.1743.1.1.10.44.0 | | | |
| zSvMIBEvADC8FatalUpperLimit<br>1.3.6.1.4.1.1743.1.1.10.45.0 | | | |
| zSvMIBEvPlus12Millivolts<br>1.3.6.1.4.1.1743.1.1.10.46.0 | Integer | Read Only | The present measure of the +12 volt power in millivolts. |
| zSvMIBEvPlus5Millivolts<br>1.3.6.1.4.1.1743.1.1.10.47.0 | Integer | Read Only | The present measure of the +5 volt power in millivolts. |
| ZSvMIBEvCPUAMillivolts<br>1.3.6.1.4.1.1743.1.1.10.48.0 | Integer | Read Only | The present measure of the first CPU power (typically +3.3v) in millivolts. |
| zSvMIBEvNeg12Millivolts<br>1.3.6.1.4.1.1743.1.1.10.49.0 | Integer | Read Only | The present measure of the -12 volt power in millivolts. |
| zSvMIBEvTemp1Centigrade<br>1.3.6.1.4.1.1743.1.1.10.50.0 | Integer | Read Only | The present measure of the first cabinet temperature in degrees centigrade. |
| zSvMIBEvTemp2Centigrade<br>1.3.6.1.4.1.1743.1.1.10.51.0 | Integer | Read Only | The present measure of the second cabinet temperature in degrees centigrade. |
| ZSvMIBEvCPUBMillivolts<br>1.3.6.1.4.1.1743.1.1.10.52.0 | Integer | Read Only | The present measure of the second CPU power (typically +3.3v) in millivolts. |
| zSvMIBEvPlus12FatalUpLim<br>1.3.6.1.4.1.1743.1.1.10.53.0 | Integer | Read Only | The upper threshold setting for determining fatal +12 volt power levels (in millivolts). |
| zSvMIBEvPlus5FatalUpLim<br>1.3.6.1.4.1.1743.1.1.10.54.0 | Integer | Read Only | The upper threshold setting for determining fatal +5 volt power levels (in millivolts). |
| ZSvMIBEvCPUAFatalUpLim<br>1.3.6.1.4.1.1743.1.1.10.55.0 | Integer | Read Only | The upper threshold setting for determining fatal first CPU power (typically 3.3v) levels (in millivolts). |
| zSvMIBEvNeg12FatalUpLim<br>1.3.6.1.4.1.1743.1.1.10.56.0 | Integer | Read Only | The upper threshold setting for determining fatal -12 volt power levels (in millivolts). |
| zSvMIBEvTemp1FatalUpLim<br>1.3.6.1.4.1.1743.1.1.10.57.0 | Integer | Read Only | The upper threshold setting for determining fatal cabinet temperature levels as measured by thermal sensor 1 (in degrees centigrade). |
| zSvMIBEvTemp2FatalUpLim<br>1.3.6.1.4.1.1743.1.1.10.58.0 | Integer | Read Only | The upper threshold setting for determining fatal cabinet temperature levels as measured by thermal sensor 2 (in degrees centigrade). |

| MIB OBJECT NAME/IDENTIFIER | TYPE | ACCESS | DESCRIPTION |
|---|---|---|---|
| zSvMIBEvCPUBFatalUpLim<br>1.3.6.1.4.1.1743.1.1.10.59.0 | Integer | Read Only | The upper threshold setting for determining fatal second CPU power (typically 3.3v) levels (in millivolts). |
| zSvMIBEvPlus12FatalLowLim<br>1.3.6.1.4.1.1743.1.1.10.60.0 | Integer | Read Only | The lower threshold setting for determining fatal +12 volt power levels (in millivolts). |
| zSvMIBEvPlus5FatalLowLim<br>1.3.6.1.4.1.1743.1.1.10.61.0 | Integer | Read Only | The lower threshold setting for determining fatal +5 volt power levels (in millivolts). |
| ZSvMIBEvCPUAFatalLowLim<br>1.3.6.1.4.1.1743.1.1.10.62.0 | Integer | Read Only | The lower threshold setting for determining fatal first CPU power (typically 3.3v) levels (in millivolts). |
| zSvMIBEvNeg12FatalLowLim<br>1.3.6.1.4.1.1743.1.1.10.63.0 | Integer | Read Only | The lower threshold setting for determining fatal -12 volt power levels (in millivolts). |
| zSvMIBEvTemp1FatalLowLim<br>1.3.6.1.4.1.1743.1.1.10.64.0 | Integer | Read Only | The lower threshold setting for determining fatal cabinet temperature levels as measured by thermal sensor 1 (in degrees centigrade). |
| zSvMIBEvTemp2FatalLowLim<br>1.3.6.1.4.1.1743.1.1.10.65.0 | Integer | Read Only | The lower threshold setting for determining fatal cabinet temperature levels as measured by thermal sensor 2 (in degrees centigrade). |
| ZSvMIBEvCPUBFatalLowLim<br>1.3.6.1.4.1.1743.1.1.10.66.0 | Integer | Read Only | The lower threshold setting for determining fatal second CPU power (typically 3.3v) levels (in millivolts). |
| zSvMIBEvPlus12WarningUpLim<br>1.3.6.1.4.1.1743.1.1.10.67.0 | Integer | Read Only | The upper threshold setting for determining warning +12 volt power levels (in millivolts). |
| zSvMIBEvPlus5WarningUpLim<br>1.3.6.1.4.1.1743.1.1.10.68.0 | Integer | Read Only | The upper threshold setting for determining warning +5 volt power levels (in millivolts). |
| zSvMIBEvCPUAWarningUpLim<br>1.3.6.1.4.1.1743.1.1.10.69.0 | Integer | Read Only | The upper threshold setting for determining warning first CPU power (typically 3.3v) levels (in millivolts). |
| zSvMIBEvNeg12WarningUpLim<br>1.3.6.1.4.1.1743.1.1.10.70.0 | Integer | Read Only | The upper threshold setting for determining warning -12 volt power levels (in millivolts). |
| zSvMIBEvTemp1WarningUpLim<br>1.3.6.1.4.1.1743.1.1.10.71.0 | Integer | Read Only | The upper threshold setting for determining warning cabinet temperature levels as measured by thermal sensor 1 (in degrees centigrade). |
| zSvMIBEvTemp2WarningUpLim<br>1.3.6.1.4.1.1743.1.1.10.72.0 | Integer | Read Only | The upper threshold setting for determining warning cabinet temperature levels as measured by thermal sensor 2 (in degrees centigrade). |
| ZSvMIBEvCPUBWarningUpLim<br>1.3.6.1.4.1.1743.1.1.10.73.0 | Integer | Read Only | The upper threshold setting for determining warning second CPU power (typically 3.3v) levels (in millivolts). |
| zSvMIBEvPlus12WarningLowLim<br>1.3.6.1.4.1.1743.1.1.10.74.0 | Integer | Read Only | The lower threshold setting for determining warning +12 volt power levels (in millivolts). |
| zSvMIBEvPlus5WarningLowLim<br>1.3.6.1.4.1.1743.1.1.10.75.0 | Integer | Read Only | The lower threshold setting for determining warning +5 volt power levels (in millivolts). |
| ZSvMIBEvCPUAWarningLowLim<br>1.3.6.1.4.1.1743.1.1.10.76.0 | Integer | Read Only | The lower threshold setting for determining warning first CPU power (typically 3.3v) levels (in millivolts). |
| zSvMIBEvTemp2WarningLowLim<br>1.3.6.1.4.1.1743.1.1.10.79.0 | Integer | Read Only | The lower threshold setting for determining warning cabinet temperature levels as measured by thermal sensor 2 (in degrees centigrade). |
| ZSvMIBEvCPUBWarningLowLim<br>1.3.6.1.4.1.1743.1.1.10.80.0 | Integer | Read Only | The lower threshold setting for determining warning second CPU power (typically 3.3v) levels (in millivolts). |

| MIB OBJECT NAME/IDENTIFIER | TYPE | ACCESS | DESCRIPTION |
|---|---|---|---|
| zSvMIBEvPlus12Enable<br>1.3.6.1.4.1.1743.1.1.10.81.0 | Integer | Read Only | A non-zero value enables the measurement of the +12 volt power in millivolts. |
| zSvMIBEvPlus5Enable<br>1.3.6.1.4.1.1743.1.1.10.82.0 | Integer | Read Only | A non-zero value enables the measurement of the +5 volt power in millivolts. |
| ZSvMIBEvCPUAEnable<br>1.3.6.1.4.1.1743.1.1.10.83.0 | Integer | Read Only | A non-zero value enables the measurement of the first CPU power (typically +3.3v) in millivolts. |
| zSvMIBEvNeg12Enable<br>1.3.6.1.4.1.1743.1.1.10.84.0 | Integer | Read Only | A non-zero value enables the measurement of the -12 volt power in millivolts. |
| zSvMIBEvTemp1Enable<br>1.3.6.1.4.1.1743.1.1.10.85.0 | Integer | Read Only | A non-zero value enables the measurement of the first cabinet temperature in degrees centigrade. |
| zSvMIBEvTemp2Enable<br>1.3.6.1.4.1.1743.1.1.10.86.0 | Integer | Read Only | A non-zero value enables the measurement of the present second cabinet temperature in degrees centigrade. |
| ZSvMIBEvCPUBEnable<br>1.3.6.1.4.1.1743.1.1.10.87.0 | Integer | Read Only | A non-zero value enables the measurement of the second CPU power (typically +3.3v) in millivolts. |
| ZSvMIBEvDoorFanEnable<br>1.3.6.1.4.1.1743.1.1.10.88.0 | Integer | Read Only | A non-zero value enables the monitoring of the cabinet door and cooling fan. |

Maintenance

| MIB OBJECT NAME/IDENTIFIER | TYPE | ACCESS | DESCRIPTION |
|---|---|---|---|
| zSvMIBmaGPIOData<br>1.3.6.1.4.1.1743.1.1.11.10.0 | Integer | Read Only | General Purpose I/O Port Data Register - used for monitoring system status and jumper placement. |
| ZSvMIBmaGPIOMode<br>1.3.6.1.4.1.1743.1.1.11.11.0 | Integer | Read Only | General Purpose I/O Port Mode Register - Defines mode of each pin in the General Purpose I/O Port Data Register. |
| ZSvMIBmaConfig<br>1.3.6.1.4.1.1743.1.1.11.12.0 | Integer | Read Only | Configuration Register - configures the floppy disk and security modes. |
| ZSvMIBmaClockFreq<br>1.3.6.1.4.1.1743.1.1.11.13.0 | Integer | Read Only | For internal use only. |
| ZSvMIBmaFatalUpperLimits1<br>1.3.6.1.4.1.1743.1.1.11.14.0 | Integer | Read Write | For internal use only. |
| ZSvMIBmaFatalUpperLimits2<br>1.3.6.1.4.1.1743.1.1.11.15.0 | Integer | Read Write | For internal use only. |
| ZSvMIBmaWarningUpperLimits1<br>1.3.6.1.4.1.1743.1.1.11.16.0 | Integer | Read Write | For internal use only. |
| ZSvMIBmaWarningUpperLimits2<br>1.3.6.1.4.1.1743.1.1.11.17.0 | Integer | Read Write | For internal use only. |
| ZSvMIBmaFatalLowerLimits1<br>1.3.6.1.4.1.1743.1.1.11.18.0 | Integer | Read Write | For internal use only. |
| ZSvMIBmaFatalLowerLimits2<br>1.3.6.1.4.1.1743.1.1.11.19.0 | Integer | Read Write | For internal use only. |
| ZSvMIBmaWarningLowerLimits1<br>1.3.6.1.4.1.1743.1.1.11.20.0 | Integer | Read Write | For internal use only. |
| ZSvMIBmaWarningLowerLimits2<br>1.3.6.1.4.1.1743.1.1.11.21.0 | Integer | Read Write | For internal use only. |
| ZSvMIBmaSystemMonitor<br>1.3.6.1.4.1.1743.1.1.11.22.0 | Integer | Read Write | For internal use only. |
| ZSvMIBmaSystemMonitorControl<br>1.3.6.1.4.1.1743.1.1.11.23.0 | Integer | Read Write | For internal use only. |
| ZSvMIBmaSystemMonitorData1<br>1.3.6.1.4.1.1743.1.1.11.24.0 | Integer | Read Write | For internal use only. |
| ZSvMIBmaSystemMonitorData2<br>1.3.6.1.4.1.1743.1.1.11.25.0 | Integer | Read Write | For internal use only. |
| zSvMIBmaWDTimer<br>1.3.6.1.4.1.1743.1.1.11.26.0 | Integer | Read Only | Watchdog Timer Register - Controls the internal watchdog timer. The timeout value is specified in 2 minute increments to a max of 510 minutes. If a timeout occurs - system reset is issued.<br>Bits   Name   Description<br>15::09  Reserved  Always 0 on read<br>08  Reset/Disable  0 = Timer Disabled<br>                         1 = Reset to time out value start running<br>07::00  Timeout  Timeout value in increments of 2 minutes, 00H = No Delay, if timer enabed a reset will occur. |

Storage Devices

| MIB OBJECT NAME/IDENTIFIER | TYPE | ACCESS | DESCRIPTION |
|---|---|---|---|
| zSvMIBstSCSIDevTotal<br>1.3.6.1.4.1.1743.1.1.12.1.0 | Integer | Read Only | Numerical count of the number of SCSI devices (e.g. disk, tape, CD-ROM, and host adapters) that are operational in this unit. |
| ZSvMIBstSCSIDevType<br>1.3.6.1.4.1.1743.1.1.12.2.N | Integer | Read Only | Numerical indication of the type of SCSI device:<br>1 = direct     7 = scanner<br>2 = sequential   8 = optical<br>3 = printer    9 = changer<br>4 = processor   10 = COMM<br>5 = writeonce   32 = unknown<br>6 = CD-ROM   33 = host adapter. |
| ZSvMIBstSCSIDevStatus<br>1.3.6.1.4.1.1743.1.1.12.2.1.3.N | Integer | Read Only | Numerical indication of the operational status of this SCSI device:<br>1 = unknown    5 = not initialized<br>2 = operational   6 = busy<br>3 = not ready    7 = medium not present.<br>4 = no response |
| zSvMIBstSCSIVendorID<br>1.3.6.1.4.1.1743.1.1.12.2.1.4.N | Display String | Read Only | Displayable ASCII string containing the vendor ID for the SCSI device. |
| ZSvMIBstSCSIProductID<br>1.3.6.1.4.1.1743.1.1.12.2.1.5.N | Display String | Read Only | Displayable ASCII string containing the product ID for the SCSI device. |
| ZSvMIBstSCSIDevSerialNum<br>1.3.6.1.4.1.1743.1.1.12.2.1.6.N | Display String | Read Only | Displayable ASCII string containing the serial number of the SCSI device. |
| ZSvMIBstSCSIDevRevision<br>1.3.6.1.4.1.1743.1.1.12.2.1.7.N | Display String | Read Only | Displayable ASCII string containing the revision of the SCSI device. |
| ZSvMIBstSCSIFWDate<br>1.3.6.1.4.1.1743.1.1.12.2.1.8.N | Display String | Read Only | Displayable ASCII string containing the control firmware release date of the SCSI device. |
| ZSvMIBstSCSICapacity<br>1.3.6.1.4.1.1743.1.1.12.2.1.9.N | Integer | Read Only | The capacity in Megabytes of the SCSI device. |
| ZSvMIBstSCSIHost<br>1.3.6.1.4.1.1743.1.1.12.2.1.10.N | Integer | Read Only | The SCSI adapter (controller) on which the SCSI device is connected. Note that if this entry represents the actual host adapter, the number is the SCSI adapter's number. |
| ZSvMIBstSCSITargetID<br>1.3.6.1.4.1.1743.1.1.12.2.1.11.N | Display String | Read Only | Displayable ASCII string containing the SCSI ID of the SCSI device. |
| ZSvMIBstSCSIPCIBus<br>1.3.6.1.4.1.1743.1.1.12.2.1.12.N | Integer | Read Only | The PCI bus number of the SCSI adapter controlling the SCSI device. This infomation can be used to associate the SCSI device table entry with it's SCSI adapter I/O slot table entry. |
| zSvMIBstSCSIIODevice<br>1.3.6.1.4.1.1743.1.1.12.2.1.13.N | Integer | Read Only | The PCI device number or EISA slot number for the SCSI adapter controlling the SCSI device. This information can be used to associate the SCSI device table entry with it's adapter I/O slot table entry. |

Filesystem

| MIB OBJECT NAME/IDENTIFIER | TYPE | ACCESS | DESCRIPTION |
|---|---|---|---|
| zSvMIBstVolumeTotal<br>1.3.6.1.4.1.1743.1.1.12.3.0 | Integer | Read Only | Numerical count of the number of operating system defined volumes (e.g., drive letters or NetWare volumes) that are configured and active in this unit. |
| ZSvMIBstVolumeName<br>1.3.6.1.4.1.1743.1.1.12.4.1.2.N | Display String | Read Only | Displayable ASCII string containing the specific Windows NT drive letter or NetWare volume. |
| ZSvMIBstVolumeSize<br>1.3.6.1.4.1.1743.1.1.12.4.1.3.N | Integer | Read Only | The current volume size (in units specified by zSvMIBstVolumeUnits). |
| ZSvMIBstVolumeFreeSpace<br>1.3.6.1.4.1.1743.1.1.12.4.1.4.N | Integer | Read Only | The current amount of free space on the volume (in units specified by zSvMIBstVolumeUnits). |
| ZSvMIBstVolumeUsed<br>1.3.6.1.4.1.1743.1.1.12.4.1.5.N | Integer | Read Only | The current percentage of used space to total available space on the volume. |
| ZSvMIBstVolumeUsedHiWater<br>1.3.6.1.4.1.1743.1.1.12.4.1.6.N | Integer | Read Only | User definable upper threshold limit for percentage of volume used; action is taken (e.g. a volume almost full trap generated) when zSvMIBstVolumeUsed is greater than this threshold. |
| ZSvMIBstVolumeUnits<br>1.3.6.1.4.1.1743.1.1.12.4.1.7.N | Integer | Read Only | User definable unit (in bytes) in which the values for zSvMIBstVolumeFreeSpace and zSvMIBstVolumeSize are expressed. This provides a scaling control so the resulting values will be in bytes. |

Error Log

The error log variables manage the flash memory resident system error log.

| MIB OBJECT NAME/IDENTIFIER | TYPE | ACCESS | DESCRIPTION |
|---|---|---|---|
| zSvMIBsmEraseDate0<br>1.3.6.1.4.1.1743.1.1.13.1.0 | Integer | Read Only | First part of time stamp when system management error log was last erased. |
| zSvMIBsmEraseDate1<br>1.3.6.1.4.1.1743.1.1.13.2.0 | Integer | Read Only | Second part of time stamp when system management error log was last erased. |
| ZSvMIBsmYellowRec<br>1.3.6.1.4.1.1743.1.1.13.3.0 | Integer | Read Only | Numerical count of the last system management error log record that was read when polling for single bit ECC error (yellow) records. |
| ZSvMIBsmRedRec<br>1.3.6.1.4.1.1743.1.1.13.4.0 | Integer | Read Only | Numerical count of the last system management error log record that was read when polling for multi bit ECC error (red) records. |
| ZSvMIBsmParityRec<br>1.3.6.1.4.1.1743.1.1.13.5.0 | Integer | Read Only | Numerical count of the last system management error log record that was read when polling for memory parity error records. |
| ZSvMIBsmSysErrRec<br>1.3.6.1.4.1.1743.1.1.13.6.0 | Integer | Read Only | Numerical count of the last system management error log record that was read when polling for analog-to-digital over/under limit error records. |

Traps

The SNMP Agent polls for the following trap conditions at 15 second intervals. When a trap condition is true, the agent generates an SNMP Trap Protocol Data Unit (PDU) associated with enterprise 1.3.6.1.4.1.1743.1. The PDU will be sent to any remote managers. If the trap condition remains true on subsequent polls, another SNMP Trap PDU will be sent only when it has remained true for 20 successive polls (5 minutes). If the trap condition is false on any subsequent poll, another SNMP trap PDU will be sent on the next poll that the condition is again true.

| TRAP NAME | ENTERPRISE SPECIFIC TRAP NUMBER | DESCRIPTION |
|---|---|---|
| zSvMIBTpUserHiTemp1 | 1 | The value of the temperature sensor zSvMIBEvTemp1 exceeds the value of the user settable upper temperature threshold zSvMIBEvUserHiTemp1. |
| zSvMIBTpUserLoTemp1 | 2 | The value of the temperature sensor zSvMIBEvTemp1 is below the value of the user settable lower temperature threshold zSvMIBEvUserLoTemp1. |
| zSvMIBTpUserHiTemp2 | 3 | The value of the temperature sensor zSvMIBEvTemp2 exceeds the value of the user settable upper temperature threshold zSvMIBEvUserHiTemp2. |
| zSvMIBTpUserLoTemp2 | 4 | The value of the temperature sensor zSvMIBEvTemp2 is below the value of the user settable lower temperature threshold zSvMIBEvUserLoTemp2. |
| zSvMIBTpDoorOpen | 5 | The cabinet door is open on a system which provides a door state sensor (zSvMIBEvDoorOpen). |
| zSvMIBTpFanFailure | 6 | An internal cooling fan has failed on a system which provides a fan state sensor (zSvMIBEvFanFailure). |
| zSvMIBTpMemRed | 7 | One or more uncorrectable memory errors ocurred (reported on subsequent SNMP agent restart). After sending this trap zSvMIBhsMemReds is incremented by the value of zSvMIBEvMemReds and zSvMIBEvMemReds is set to zero. |
| zSvMIBTpMemYellow | 8 | One or more correctable memory errors ocurred. After sending this trap zSvMIBhsMemYellows is incremented by the value of zSvMIBEvMemYellows and zSvMIBEvMemYellows is set to zero. |
| zSvMIBTpUserTrapHi | 9 | The value of the Z-Server MIB object which zSvMIBmnUserTrapObject references exceeds the value of zSvMIBmnUserTrapHiWater and zSvMIBmnUserTrapHiAction is set to send trap (1). See discussion of user defined traps. |
| zSvMIBTpUserTrapLo | 10 | The value of the Z-Server MIB object which zSvMIBmnUserTrapObject references is below the value of zSvMIBmnUserTrapLoWater and zSvMIBmnUserTrapLoAction is set to send trap (1). |
| zSvMIBTpVolumeAlmostFull | 11 | The value of the percentage of volume used exceeds the value of the user settable upper threshold zSvMIBstVolumeUsedHiWater. |
| zSvMIBTpTemp1FatalHi | 12 | An indication that the temperature sensor #1 (ADC 5) fatal upper threshold zSvMIBEvADC5FatalUpperLimit has been reached. |

25b

| TRAP NAME | ENTERPRISE SPECIFIC TRAP NUMBER | DESCRIPTION |
|---|---|---|
| zSvMIBTpTemp1FatalLo | 13 | An indication that the temperature sensor #1 (ADC 5) fatal lower threshold zSvMIBEvADC5FatalLowerLimit has been reached. |
| zSvMIBTpTemp2FatalHi | 14 | An indication that the temperature sensor #2 (ADC 6) fatal upper threshold zSvMIBEvADC6FatalUpperLimit has been reached. |
| zSvMIBTpTemp2FatalLo | 15 | An indication that the temperature sensor #2 (ADC 6) fatal lower threshold zSvMIBEvADC6FatalLowerLimit has been reached. |
| zSvMIBTpPlus12VFatalHi | 16 | An indication that the plus 12 volt (ADC 1) fatal upper threshold zSvMIBEvADC1FatalUpperLimit has been reached. |
| zSvMIBTpPlus12VFatalLo | 17 | An indication that the plus 12 volt (ADC 1) fatal lower threshold zSvMIBEvADC1FatalLowerLimit has been reached. |
| zSvMIBTpNeg12VFatalHi | 18 | An indication that the negative 12 volt (ADC 4) fatal upper threshold zSvMIBEvADC4FatalUpperLimit has been reached. |
| zSvMIBTpNeg12VFatalLo | 19 | An indication that the negative 12 volt (ADC 4) fatal lower threshold zSvMIBEvADC4FatalLowerLimit has been reached. |
| zSvMIBTpPlus5VFatalHi | 20 | An indication that the plus 5 volt (ADC 2) fatal upper threshold zSvMIBEvADC2FatalUpperLimit has been reached. |
| zSvMIBTpPlus5VFatalLo | 21 | An indication that the plus 5 volt (ADC 2) fatal lower threshold zSvMIBEvADC2FatalLowerLimit has been reached. |
| zSvMIBTpCPUAVFatalHi | 22 | An indication that the CPU A 3.3 volt (ADC 3) fatal upper threshold zSvMIBEvADC3FatalUpperLimit has been reached. |
| zSvMIBTpCPUAVFatalLo | 23 | An indication that the CPU A 3.3 volt (ADC 3) fatal lower threshold zSvMIBEvADC3FatalLowerLimit has been reached. |
| zSvMIBTpCPUBVFatalHi | 24 | An indication that the CPU B 3.3 volt (ADC 7) fatal upper threshold zSvMIBEvADC7FatalUpperLimit has been reached. |
| zSvMIBTpCPUBVFatalLo | 25 | An indication that the CPU B 3.3 volt (ADC 7) fatal lower threshold zSvMIBEvADC7FatalLowerLimit has been reached. |
| zSvMIBTpTemp1WarnHi | 26 | An indication that the temperature sensor #1 (ADC 5) warning upper threshold zSvMIBEvADC5WarningUpperLimit has been reached. |
| zSvMIBTpTemp1WarnLo | 27 | An indication that the temperature sensor #1 (ADC 5) warning lower threshold zSvMIBEvADC5WarningLowerLimit has been reached. |

| TRAP NAME | ENTERPRISE SPECIFIC TRAP NUMBER | DESCRIPTION |
|---|---|---|
| zSvMIBTpTemp2WarnHi | 28 | An indication that the temperature sensor #2 (ADC 6) warning upper threshold zSvMIBEvADC6WarningUpperLimit has been reached. |
| zSvMIBTpTemp2WarnLo | 29 | An indication that the temperature sensor #2 (ADC 6) warning lower threshold zSvMIBEvADC6WarningLowerLimit has been reached. |
| zSvMIBTpPlus12VWarnHi | 30 | An indication that the plus 12 volt (ADC 1) warning upper threshold zSvMIBEvADC1WarningUpperLimit has been reached. |
| zSvMIBTpPlus12VWarnLo | 31 | An indication that the plus 12 volt (ADC 1) warning lower threshold zSvMIBEvADC1WarningLowerLimit has been reached. |
| zSvMIBTpNeg12VWarnHi | 32 | An indication that the negative 12 volt (ADC 4) warning upper threshold zSvMIBEvADC4WarningUpperLimit has been reached. |
| zSvMIBTpNeg12VWarnLo | 33 | An indication that the negative 12 volt (ADC 4) warning lower threshold zSvMIBEvADC4WarningLowerLimit has been reached. |
| zSvMIBTpPlus5VWarnHi | 34 | An indication that the plus 5 volt (ADC 2) warning upper threshold zSvMIBEvADC2WarningUpperLimit has been reached. |
| zSvMIBTpPlus5VWarnLo | 35 | An indication that the plus 5 volt (ADC 2) warning lower threshold zSvMIBEvADC2WarningLowerLimit has been reached. |
| zSvMIBTpCPUAVWarnHi | 36 | An indication that the CPU A 3.3 volt (ADC 3) warning upper threshold zSvMIBEvADC3WarningUpperLimit has been reached. |
| zSvMIBTpCPUAVWarnLo | 37 | An indication that the CPU A 3.3 volt (ADC 3) warning lower threshold zSvMIBEvADC3WarningLowerLimit has been reached. |
| zSvMIBTpCPUBVWarnHi | 38 | An indication that the CPU B 3.3 volt (ADC 7) warning upper threshold zSvMIBEvADC7WarningUpperLimit has been reached. |
| zSvMIBTpCPUBVWarnLo | 39 | An indication that the CPU B 3.3 volt (ADC 7) warning lower threshold zSvMIBEvADC7WarningLowerLimit has been reached. |

Initialization

| MIB OBJECT NAME/IDENTIFIER | TYPE | ACCESS | DESCRIPTION |
|---|---|---|---|
| zSvMIBinIntializatize<br>1.3.6.1.4.1.1743.1.1.14.1 | Integer | Read Write | Saved boolean that when non-zero, enables server management software's initialization and management of the environment and maintenance start-up values. When zero, server management software will not initialize the environment and maintenance registers. Server firmware would then be responsible for setting start-up values in these registers. |
| zSvMIBinSetDefaults<br>1.3.6.1.4.1.1743.1.1.14.2 | Integer | Read Write | Self-resetting boolean that when set to a non-zero value, directs server management software to initialize the environment and maintenance variable to their default values. After initialization, this variable is self-reset to zero. |
| zSvMIBinGPIOData<br>1.3.6.1.4.1.1743.1.1.14.3<br>zSvMIBinGPIOMode<br>1.3.6.1.4.1.1743.1.1.14.4<br>zSvMIBinConFlg<br>1.3.6.1.4.1.1743.1.1.14.5<br>zSvMIBinClockFreq<br>1.3.6.1.4.1.1743.1.1.14.6<br>zSvMIBinSysFataUpLim1<br>1.3.6.1.4.1.1743.1.1.14.7<br>zSvMIBinSysFatalUpLim2<br>1.3.6.1.4.1.1743.1.1.14.8<br>zSvMIBinSysWarnUpLim1<br>1.3.6.1.4.1.1743.1.1.14.9<br>zSvMIBinSysWarnUpLim2<br>1.3.6.1.4.1.1743.1.1.14.10<br>zSvMIBinSysFatalLoLim1<br>1.3.6.1.4.1.1743.1.1.14.11<br>zSvMIBinSysFatalLoLim2<br>1.3.6.1.4.1.1743.1.1.14.12<br>zSvMIBinSysWarnLoLim1<br>1.3.6.1.4.1.1743.1.1.14.13<br>zSvMIBinSysWarnLoLim2<br>1.3.6.1.4.1.1743.1.1.14.14<br>zSvMIBinSysMonStatus<br>1.3.6.1.4.1.1743.1.1.14.15<br>zSvMIBinSysMonCt1<br>1.3.6.1.4.1.1743.1.1.14.16<br>zSvMIBinSysMonData1<br>1.3.6.1.4.1.1743.1.1.14.17<br>zSvMIBinSysMonData2<br>1.3.6.1.4.1.1743.1.1.14.18<br>zSvMIBinWdogTimer<br>1.3.6.1.4.1.1743.1.1.14.19 | Integer | Read Only | Reserved for internal use. |

User Defined Traps

The Instrumentation Daemon provides support for user definable traps. These facilities allow specific MIB variables to be polled at frequent intervals without incurring the network overhead which would be required to perform such polling activity from a remote Network Manager. A maximum of four separate user definable traps can be concurrently active. Specific variables have been defined in the MIB to provide this functionality.

User definable traps can be implemented by setting values for the following variables:

- zSvMIBmnUserTrapObject
- zSvMIBmnUserTrapDuration
- zSvMIBmnUserTrapPoll
- zSvMIBmnUserTrapHiWater
- zSvMIBmnUserTrapHiAction
- zSvMIBmnUserTrapHiObject
- zSvMIBmnUserTrapHiObjectValue
- zSvMIBmnUserTrapLoWater
- zSvMIBmnUserTrapLoAction
- zSvMIBmnUserTrapLoObject
- zSvMIBmnUserTrapLoObjectValue.

There are four instances of each of these control variables. Polling for a specific user definable trap can be effected by setting the desired values for the same instance of each of the following control variables:

- zSvMIBmnUserTrapObject
- zSvMIBmnUserTrapDuration
- zSvMIBmnUserTrapPoll
- zSvMIBmnUserTrapHiWater
- zSvMIBmnUserTrapLoWater.

A specific instance of zSvMIBmnUserTrapObject should be set to the SNMP Object Identifier of a MIB integer or counter variable which is to be tested for the user defined trap condition. The Instrumentation Daemon will poll the variable identified by each instance of zSvMIBmnUserTrapObject at the interval (in seconds) specified by that instance of zSvMIBmnUserTrapPoll for the number of times specified by that instance of zSvMIBmnUserTrapDuration (except that a zSvMIBmnUserTrapDuration value of zero designates an infinite polling duration).

Polling for a user defined trap will be activated (or reset if already active) whenever that instance of zSvMIBmnUserTrapPoll is set to a non-zero value. Polling for a user defined trap will become inactive when the number of polls specified by zSvMIBmnUserTrapDuration have been completed. It can also be deactivated on-line at any time by setting that instance of zSvMIBmnUserTrapPoll to zero. On each poll, the value of the polled variable is tested against the value of the same instance of the zSvMIBmnUserTrapHiWater and zSvMIBmnUserTrapLoWater integer variables. If the value of zSvMIBmnUserTrapObject is greater than zSvMIBmnUserTrapHiWater, then the action specified in that instance of zSvMIBmnUserTrapHiAction is effected. If the value of zSvMIBmnUserTrapObject is less than zSvMIBmnUserTrapLoWater, then the action specified in that instance of zSvMIBmnUserTrapLoAction is effected. Any of the following actions may specified:

- 1 = send trap.

- 2 = set MIB variable

- 3 = increment MIB variable

- 4 = decrement MIB variable.

If the "send trap" action (1) is specified, an SNMP trap is generated which will be sent to any designated managers identified in the SCO /etc/snmpd.trap file. If the trap resulted from a polled value greater than the value of zSvMIBmnUserTrapHiWater, then a zSvMIBTpUserTrapHi (enterprise = zServers (1.3.6.1.4.1.1743.1), trap number = 9) is generated. If the trap resulted from a polled value less than the value of zSvMIBmnUserTrapLoWater, then a zSvMIBTpUserTrapLo (enterprise = zServers (1.3.6.1.4.1.1743.1), trap number = 10) is generated. Whenever any of the actions which modify a MIB variable are specified (2, 3, or 4), that instance of zSvMIBmnUserTrapHiObject or zSvMIBmnUserTrapLoObject (as appropriate) must be set to the SNMP Object Identifier of the Z-Server MIB integer or counter variable which is to be modified.

If the "set MIB variable" action (2) is specified, that instance of zSvMIBmnUserTrapHiObjectValue or zSvMIBmnUserTrapLoObjectValue must contain the values to which zSvMIBmnUserTrapHiObject or zSvMIBmnUserTrapLoObject (respectively) are to be set.

When a trap action has been effected, then subsequent polls will not re-effect the trap action until the trap condition becomes true after having been false on the previous poll, or twenty successive polls have found the trap condition to be true.

It should be noted that polling for a user defined trap will be restarted for the last specified duration whenever the Instrumentation Daemon *zdsiabd* is restarted if the value of zSvMIBmnUserTrapPoll is non-zero.

User Defined Data Monitoring

The Instrumentation Daemon provides support for user definable data monitoring. These facilities allow specific MIB variables to be polled at frequent intervals without incurring the network overhead which would be required to perform such polling activity from a remote Network Manager. A maximum of four separate user defined data monitors can be concurrently active. Specific variables have been defined in the MIB to provide this functionality.

User defined data monitoring can be implemented by setting values for the following variables:

- zSvMIBmnObject
- zSvMIBmnDuration
- zSvMIBmnPoll
- zSvMIBmnMaxDataSize.

There are four instances of each of these control variables and of the zSvMIBmnData variable which contains the resultant data samples. A specific instance of data monitoring can be effected by setting the desired values for the same instance of each of these control variables, and getting the resulting monitored data from that same instance of zSvMIBmnData.

A specific instance of zSvMIBmnObject should be set to the SNMP Object Identifier of a Z-Server MIB integer or counter variable which is to be monitored. The Instrumentation Daemon will poll the variable identified by each instance of zSvMIBmnObject at the interval (in seconds) specified by that instance of zSvMIBmnPoll for the number of times specified by that instance of zSvMIBmnDuration (except a zSvMIBmnDuration value of zero which designates an infinite polling duration).

A given instance of data monitoring will be activated (or reset if already active) whenever that instance of zSvMIBmnPoll is set to a non-zero value. An instance of data monitoring will become inactive when the number of polls specified by zSvMIBmnDuration have been completed. It can also be deactivated on-line at any time by setting that instance of zSvMIBmnPoll to zero.

On each poll, the value of the polled variable is saved in the circular buffer which comprises that instance of zSvMIBmnData, and its size (in octets) is added to the length of the active monitor data octet string. When a get is performed for a given instance of zSVMIBmnData, the Instrumentation Daemon will return an octet string with a size equal to the number of octets of active monitor data. Active monitor data is any data which has been collected since:

1. this instance of data monitoring was activated (or reset), 2. the last set for zSVMIBmnObject or zSVMIBmnMaxDataSize was performed, 3. the last get for zSvMIBmnData was performed, or 4. the Instrumentation Daemon was restarted.

Successive gets for a given instance of zSvMIBmnData will return only "fresh" data which does not duplicate or overlap data returned on previous gets for that instance of zSvMIBmnData. Since the size of active monitor data is reset on each get for zSVMIBmnData, some loss of data could be experienced by Network Management Applications retrieving monitored data through SNMP over UDP. The size of the zSvMIBmnData circular buffer can be controlled by setting that instance of SvMIBmnMaxDataSize to the desired value. The size value is in units of octets and may range from 1 through 255. As integer and counter variables are the most useful targets of data monitoring, zSvMIBmnMaxDataSize should be set to an even multiple of the number of octets per integer or counter (i.e. four for currently supported platforms) in order to provide intelligible results in cases where the circular buffer may wrap before data is retreived (via a get of zSvMIBmnData).

It should be noted that data monitoring will be restarted for the last specified duration whenever the Instrumentation Daemon is restarted if the value of zSvMIBmnPoll is non-zero.

APPENDIX III
INSTRUMENTATION ABSTRACTION COMPONENT 34 TRAP SUPPORT MECHANISM

The IABS Instrumentation component 34 trap support mechanism is controlled by a table structure zsvmib_trap_table which is built by compiling the values contained in a file zmibtrap.tbl included in the activate trap module actvtrap.c to create the table structure. The table consists of an array of structures zsvmib_trap wherein there is one such structure for each trap that the component 34 supports. The individual fields of the zsvmib_trap structure and the constant values which are used in those fields are defined in an include header file zmibtrap.h.

The following fields and constants are defined:

1. A trapno field which contains the enterprise specific trap number for the trap.
2. An enterprise field which contains the snmpvar of the enterprise for the trap.
3. An interval field which contains the interval in seconds at which the variable to be tested is polled.
4. A duration field which contains the number of polls that should be performed to test for the trap condition before polling is deactivated.
5. A snmpvar constant which is the integer variable identifier of the variable to test for the trap condition.
6. A condition constant which identifies the specific trap condition which should be tested for the trap.
7. *A test_value constant which identifies the specific trap test value that the polled variable should be tested against.
8. A reaction_times field that contains the number of successive times that the test condition should be true before the trap action is performed again following a previous trap action.
9. *A true_action field constant which identifies the action which component 33 will perform when the trap condition has been satisfied.
10. An action_object constant which identifies the variable which is the object of the trap action which will be performed when the trap condition has been satisfied.
11. *An action_obj_value field which contains the value to which the action_object variable will be set when the trap condition has been met and the trap action specifies "set-MIB-object"(2).

The fields which are preceded by an asterisk may contain either an snmpvar integer value identifying the MIB 39b variable which contains the value to be used or an integer value which is to be used directly after subtracting the maximum snmpvar value from the value contained in the field. Constant values defined in the file zmibtrap.h(q.v) have been established to facilitate these conventions (e.g. integer values which are to be used directly can be specified as "FIRST_ZERO + integer_value").

User defined traps are defined in this table with an interval value of zero (i.e. polling disabled) and a duration value of "POLL_FOREVER". These values will be overridden by any values supplied in the server system MIB database for instances of zSvMIBmnUserTrapPoll and zSvMIBmnUserTrapDuration respectively. The instrumentation component 34 will poll the target variable identified by each instance of zSMIBmnUserTrapObject at the interval specified by that instance of zSMIBmnUserTrapPoll for the number of times specified by that instance of zSMIBmnUserTrapDuration. An instance of user trap monitoring will be activated (or reset if already active) whenever the corresponding instance of zSMIBmnUserTrapPoll is set to a non-zero value either at Instrumentation Component 34 initialization if it is set to a non-zero value in the server MIB data base or by a SET_CMD. An instance of user trap monitoring will become inactive when the specified duration has been completed. It can also be deactivated on-line at any time by a SET_CMD which sets that instance of zSMIBmnUserTrapPoll to zero. On each poll, the value of the target variable is tested to determine if it is larger than the corresponding instance of zSvMIBmnUserTrapHiWater or smaller than that instance of zSMIBmnUserTrapLoWater. If it is, then the component 34 performs the action specified in either zSvMIBmnUserTrapHiAction or zSvMIBmnUserTrapLoAction.

APPENDIX IV
INSTRUMENTATION COMPONENT INTERFACE

Each instrumentation component normally adds the name of at least one initialization function to the init_proc_table contained in the file inittbl.c. The controlling structure for the init_proc_table currently defines an additional field which is an environmental constant used to identify specific server system environments (e.g. WGS) when generic tests are provided for distinguishing between appropriate environments. Individual component initialization functions are called in the order in which they are placed in the init_proc_table.

This initialization function is called with no arguments and should return an int status value where "0" is used to denote successful initialization and "!=0" denotes unsuccessful initialization. If unsuccessful, the instrumentation component 34 will log the event with the unsuccessful status value and terminate.

Each component 34a-n initialization function performs any required initialization which it requires, such as opening drivers which will be used to support on-line processing of MIB variables, allocating static resources needed for its on-line processing, etc.

Each component initialization function establishes the processing function for each MIB variable for which it is responsible. This is accomplished by calling either of two functions: set_snmpvar_proc or set_mibnode_proc. The first function, set_snmpvar_proc, is used to set the processing function for the specific snmpvar supplied. The second function, set_mibnode_proc, is used to set the processing function for the snmpvar supplied if access !=NOT_ACCESSIBLE) and for any accessible snmpvars which exist below it in the server system MIB Object Id tree structure. Both the set_snmpvar_proc and ser_mibnode_proc functions require two arguments:

arg1 = snmpvar (MIB variable integer identifier)

arg2 = &variable_processing_function (the address of the processing function for this variable).

Both functions return an int status value where "0" denotes success and a non-zero value denotes an invalid snmpvar is specified as arg1. If multiple calls are made to the function set_snmpvar_proc or set_mibnode_proc or any combination thereof for the same snmpvar, the processing function supplied by the latest call will override that supplied by any prior call.

Each instrumentation component 34a-n can have as many variable processing functions as it desires. A single function can be used for all of its variables, for common subsets of its variables or for a specific individual variable.

This variable processing function is called in order to Get, Set, or Set_verify the variable in all contexts unless "generic" stubbing was last specified for that variable in a MIB data base file 39c which the component 34b has processed. It will be noted that GET_CMD commands may result from trap processing or data monitoring and may result from trap processing and not merely from command requests.

The variable processing function is called with the following arguments:

arg1 = command (integer - GET_CMD, or SET_VERIFY_CMD (defined in inst.h file)

arg2 = snmpvar (integer - MIB variable identifier)

arg3 = instance (integer)

arg4 = variable type (integer - INTEGERTYPE, COUNTERTYPE, OCTETSTRINGTYPE, or OBJECTIDTYPE (defined in file inst.h)

arg5 = length (pointer to integer)

arg6 = variable data buffer (generic pointer (void*) to buffer)

arg7 = stubbing level (integer - (MIB data base specified stubbing level) NO_STUB, COMPONENT_STUB, or DRIVER_STUB (defined in file zmibdata.h)

The variable processing function returns an int as a status value where zero denotes command successful and !=0 denotes command unsuccessful and updates the length and the variable data buffer as a side effect on GET_CMDs. SET_CMDs and SET_VERIFY_CMDS have no side effects but only return command successful if the set operation succeeds or the set-verify operation passes and they return command unsuccessful if they fail. Any unsuccessful processing status returned except MI_VARIABLE_ZERO, INSTANCE_TOO_BIG, and INSTANCE_NPRESENT which are normal errors for MIB browsing activities are reported by the calling instrumentation component function proc_snmpvar.

Prior to calling the variable processing function, component 34 calls a validation function for each GET_CMD, SET_CMD, or SET_VERIFY_CMD which it receives. All variables are initialized to use a default validation function, validate_variable which used the server MIB data base to validate that the variable is accessible, that the instance supplied for single instance variables is zero, that the instance supplied for multi-instance variables is greater than zero, that the variable type is correct, that the length supplied for INTEGER and COUNTER variables is one and that the access of variables referenced in SET_CMDs or SET_VERIFY_CMDs is read-write or write-only and that the access supplied for GET_CMDs is read-write or read-only.

Each component initialization function can override this default validation function in favor of a component specific validation function for one or more MIB variables for which it is responsible. This is accomplished by calling either of two functions: set_snmpvar_validation or set_mibnode_validation. The first function, set_snmpvar_validation is used to set the validation function for the specific snmpvar supplied. The second function, set_mibnode_validation is used to set the validation function for the snmpvar supplied is access !=not-accessible and for any accessible snmpvars which exist below it in the server MIB Object Id tree structure. Both functions set_snmpvar_validation and set_mibnode_validation require two arguments:

arg1 = snmpvar (MIB variable integer identifier)

arg2 = &variable_validation_function (the address of the validation function for this variable)

Both functions return an int status value where 0 denotes success and a non-zero value denotes an invalid snmpvar is specified as arg1. If multiple calls are made to set_snmpvar_validation or set_mibnode_validation or any combination thereof for the same snmpvar, the validation function supplied by the latest call will override that supplied by any prior call.

This variable validation function is called in order to validate get, set, or set-verify requests for the variable in all contexts. If the component does not wish to have any central validation of the request performed prior to calling the processing function for a given variable, the component initialization function may specify &inst_nop which will unconditionally return SUCCESSFUL as the address of the validation function.

The variable validation function is called with the following arguments:

arg1 = command (integer - GET_CMD, or SET_VERIFY_CMD (defined in inst.h file)

arg2 = snmpvar (integer - MIB variable identifier)

arg3 = instance (integer)

arg4 = variable type (integer - INTEGERTYPE, COUNTERTYPE, OCTETSTRINGTYPE, OBJECTIDTYPE (defined in file inst.h)

arg5 = length (pointer to integer)

The variable validation function returns an int as a status value where 0 denotes validation successful and !=0 denotes validation unsuccessful. Any unsuccessful validation status returned except MI_VARIABLE_ZERO, INSTANCE_TOO_BIG, and INSTANCE_NPRESENT which are normal error for MIB browsing activities are reported by the calling instrumentation component function proc_snmpvar.

Any necessary server system instrumentation component termination functions are added to the term_proc_table in the file termtbl.c. They are called at server instrumentation component termination after closing all connection to server system instrumentation clients. This function is called with no arguments or with a termination reason argument. The component termination function returns an int status value where 0 denotes successful termination and !=0 denotes unsuccessful termination. An unsuccessful termination causes the instrumentation component 34 to log the event documenting the returned status but does not have any other affect on the component termination processing. The server instrumentation component termination functions are used to clean up any outstanding resources, close opened driver, etc.

As described above, the instrumentation component logs any unsuccessful (i.e. !=SUCCESSFUL) status returned from the variable validation or processing functions or from the component initialization and termination functions.

2d

If instrumentation components have a need to time events or to poll objects apart from the trap polling and data monitoring provided by the instrumentation component 34, there are a set of instrumentation component functions supporting a timeout resolution of seconds which may be used for this purpose.

POLL_ITEM*alloc_poll_item(void) function returns a pointer to a zeroed block of memory allocate through the calloc function appropriately sized for use as a POLL_ITEM defined in timeout.h, q.v but not otherwise initialized.

Int init_poll_item(POLL_ITEM*poll_item_p, int poll_type, int poll_interval, int poll_duration)

> where poll_item_p is a pointer to a poll item to be initialized, poll_type is set to the value
> GENERIC_POLL, poll_interval to the desired poll interval in seconds, and
> poll_duration to the initial value for the number of polls to be performed or an infinite
> number of polls if set to the value POLL_FOREVER (zero. Init_poll_item is used to
> initialize appropriate field in the poll item and in particular sets poll_item_p->next_time
> to the system time at which this poll item matures based on the current system time plus
> the specified poll_interval.

After calling init_poll-item specifying GENERIC_POLL for poll_type, the instrumentation component must identify the timeout processing function which is to be called when the poll item elapses by placing its address in the poll item field poll_item_p->poll_specific_info.generic_info.proc_function. The function used to initialize this field:

int set_poll_proc_funct(POLL_ITEM*poll_item_p, &proc_function).

After initializing the poll item, the instrumentation component then calls an instrumentation component function to queue this poll item in the poll item queue and hence activate polling of this item:

int queue_poll_item(POLL_ITEM*poll_item_p.

When the poll item matures, the specified timeout processing function is called with the single argument of the address of the mature poll item. When this timeout processing function is called, the mature poll item has been removed from the poll item queue. Additional workspace within the poll item is made so that the originating instrumentation component can save specific information relevant to this polling activity directly within the poll item itself (e.g. instrumentation component specific poll types, higher resolution time stamp values, data from previous poll events, etc.). When complete, the timeout processing function returns an integer status value which control the future handling of this poll item. The function can take wither of two values:

FREE_POLL_ITEM which causes the poll item which matured whose address was supplied to the timeout processing function not to be re-entered into the poll item queue and its memory to be returned regardless of the duration specified in that poll item.

If the poll_duration specified when the poll item was initialized has not yet expired, the function REQUEUE_POLL_ITEM causes the poll item to be requeued in the poll item queue in the order of the system time at which it will next mature (current system time plus the poll_interval which was specified when the poll item was initialized). If the poll_duration specified when the poll item was initialized has expired, then the poll item will not be requeued and its memory will be returned.

In addition to deactivation of poll items after they have matured because the poll duration has been completed or the timeout processing function has returned the FREE_POLL_ITEM status, an active poll item can be deactivated from component instrumentation function code outside the time processing function by calling the following instrumentation component function:

int dequeue_poll_item(POLL_ITEM*poll_item_p where poll_item_p is a pointer to the poll item to be deactivated. This function returns SUCCESSFUL if the poll item was successfully found and dequeued from the poll item queue or INSTFAIL if it did not find the referenced poll item in the active poll item queue. After dequeuing an active poll item, an instrumentation component must either reinitialize and requeue the poll item through the use of the same function summarized above, or must return the memory for that poll time by calling free with the address of the poll item memory block.

3d

The standard termination processing function of the instrumentation component dequeues and returns the memory for all poll items which remain in the active poll item queue after all of the component instrumentation termination functions have been called.

What is claimed is:

1. A method of organizing a peer agent application for managing a number of different server systems which operate under the control of a number of different network operating systems, each server system comprising a plurality of components and at least one management information base (MIB) component for storing information describing a set of server specific variables and the hierarchy used in managing server hardware components, and a local agent component which communicates over a communications network using a standard request/response protocol for processing requests received over the network, the peer agent being organized in a modular fashion for facilitating porting to different network operating systems in addition to extensive component reuse and the method comprising the steps of:

(a) providing a first peer agent extension software module in the server system operative to communicate with the local agent component over a first programmable interface using a first type of standard protocol, the first software module including operating system specific routines for communicating with the network operating system controlling the server system;

(b) providing an independent abstraction application program interface in the server system for communicating through a second protocol which uses a small set of non-network operating system specific instrumentation commands and a defined set of control data structures;

(c) providing a second instrumentation module in the server system which operatively couples to the MIB component, the second instrumentation module including a number of server specific instrumentation components which operatively couple to the different server components and include mechanisms for directly managing hardware specific information variables described in the MIB component obtained from the server components of the server system; and, (d) incorporating into the first peer extension module and the second instrumentation module respectively, first and second mechanisms for communicating between the first and second modules over the abstraction interface, requests and responses from the second instrumentation module obtained from the instrumentation components managing the different server components using the instrumentation commands and control data structures coded for representing the requests and responses.

2. A method of operating a peer agent application for managing any one of a number of different server systems which operate under the control of any one of number of different types of network operating systems, each server system comprising a plurality of components and at least one management information base (MIB) component for storing information describing a set of server specific variables used in managing server hardware components, and a local extensible agent component which communicates over a communications network using a standard request/response protocol for processing requests and responses associated with server system operations, the peer agent being able to operate in conjunction with a plurality of different network operating systems, the method comprising the steps of:

(a) initially communicating the requests for the server system received from the network by the local agent to a first peer agent extension software module over a first programmable interface using a first type of standard protocol, the first software module including operating system specific functions for communicating with the network operating system controlling the server system;

(b) transferring the requests over an independent abstraction application program interface following processing by the first software module, the abstraction interface operating with a second protocol using a small set of non-network operating system specific instrumentation commands and a defined set of control data structures;

(c) receiving the requests through the independent abstraction application program interface by a second module which operatively couples to the MIB component, the second module including a number of server specific instrumentation components which operatively couple to the different server components and operate to directly manage hardware specific information variables described in the MIB component based on information obtain ed from the server components of the server system; and, (d) converting the specific instrumentation commands and applicable control data structures representing the requests by the second module into commands for execution by the instrumentation components managing the server component s to provide responses to the requests received by the second module.

3. The method of claim 2 wherein the method further includes the steps of (e) transferring responses to the first module received from the instrumentation components managing the server components over the independent abstraction program interface by the second module using the commands and data structures of the second protocol representing the requests; and, (f) transferring the responses received from the second module to the local agent over the first programmable interface by the first module using the first type of protocol for subsequent transfer of request responses to the communications network by the local agent.

4. The method of claim 2 wherein each of the different network operating systems includes a similar type of interprocess communications facility for communicating between processes being executed by the network operating system and wherein the transmission of requests and request responses over the independent abstraction program interface by the first and second modules uses the common interprocess communications facility.

5. The method of claim 4 wherein the similar type of interprocess communications facility utilizes sockets.

6. The method of claim 2 wherein the standard response/request protocol is the SNMP protocol, the network operating system controlling the server system is a UNIX type system, the first programmable interface corresponds to a SMUX the first protocol corresponds to a SMUX protocol and the second module corresponds to a daemon process.

7. The method of claim 2 wherein the standard response/request protocol is the SNMP protocol, the network operating system controlling the server system is a Windows NT operating system, the first programmable interface is an SNMP application program interface and the second module corresponds to a service facility.

8. The method of claim 2 wherein the standard response/request protocol is the SNMP protocol, the network operating system controlling the server system is a Netware operating system, the first programmable interface corresponds to an SNMP application program interface and the second module is a Netware® loadable module.

9. The method of claim 2 wherein step (d) further includes the step of transferring each command over a component interface to one of the instrumentation components associated with the variables specified in the request, the component interface being common to each of the instrumentation components for facilitating adding of new instrumentation components without having to make changes to other parts of the second module.

10. The method of claim 2 further including the steps of:

(e) generating unsolicited messages in the form of trap responses by the second module upon receiving information from the instrumentation components indicating occurrences of error events within the server hardware components;

(f) transferring the trap responses over the abstraction interface by the second module to the first module using a subset of the specific instrumentation commands and control data structures; and, (g) converting the trap responses by the first module into a form for transfer to the local agent over the first interface and then to the communications network by the local agent.

11. The method of claim 2 wherein the small set of non-network operating system specific instrumentation commands and the defined set of control data structures incorporate a plurality of client functions, common functions and server functions.

12. The method of claim 11 wherein the client functions include an instCallForComponent function, an instIssueCommandRequest function, an instreceive CommandResponse function, an instReceiveTrapIndication function, an InstDisconnectComponent function, an iabs_cmd_connect function and an iabs_accept_trap_connect function.

13. The method of claim 11 wherein the common functions include a send_pdu function and a get_pdu function.

14. The method of claim 11 wherein the server based functions include an iabs_trap_connect function, an iabs_accept_cmd_connect function and a create_port_file function.

15. The method of claim 11 wherein the client based functions, common functions and server based functions are stored in a library accessible by the first module and second module over the abstraction interface.

16. The method of claim 11 wherein the client based functions and common functions are included in the first module and the server based functions and common functions are included in the second module.

17. The method of claim 9 wherein the component interface includes initialization and termination tables, each table containing a number of entries and wherein the method further includes the steps of:

providing entries in each table to have values designating each of the number of instrumentation components being managed by the second module at startup and termination respectively, and, reading out each of the values stored in the initialization and termination tables respectively for causing the designated instrumentation component to perform start up and termination operations specific to one of the server hardware components being managed by the designated instrumentation component.

18. The method of claim 9 wherein the MIB component is organized in a hierarchical tree structure comprising a plurality of tree nodes and leaf elements defining MIB variables and wherein the second module further includes a variable control table containing a number of processing function entry locations, the method further including the steps of providing a number of interfaces within the component interface usable by each instrumentation component designated to be initialized by the second module during startup to populate the variable control table processing function locations with processing function entries identifying the functions to be used to process get and set requests for one or more MIB variables wherein one of the interfaces specifies a MIB variable and is used to populate the variable control table processing function location for the specified MIB variable and another interface specifies a MIB tree node and is used to populate the variable control table processing function locations for all of the accessible MIB variables defined under the specified MIB tree node; and, invoking the processing function specified in each variable control table processing function entry location by the second module in response to each command received over the component interface requesting access to a specific MIB variable corresponding to the control table processing function entry location for enabling the processing of the specific MIB variable by the designated instrumentation component.

19. The method of claim 9 wherein the second module further includes a driver component operatively coupled to one of the instrumentation components and invokes the instrumentation component through the component interface to process a request for a specific MIB variable, the method further including the steps of:

performing by the instrumentation component, an additional component specific validation of the MIB variable identified by the request; and, the instrumentation component as a function of the type of MIB variable identified by the request, performing one of the following steps:

generating an IOCTL type function call to the driver component to get or set data specified in the request from or into a hardware component of the server system; or, getting or setting the data from or into a memory resident data structure coupled to the instrumentation component; or generating the data from a constant value.

20. The method of claim 9 wherein the component interface further includes a number of specific interfaces for enabling an instrumentation component to allocate, initialize and queue poll list items within a poll list item queue containing a plurality of locations and wherein the method further includes the steps of:

initializing each of a number of entry locations for identifying the poll list item as a generic poll list item and an address pointer value identifying a component specific function to be performed when a poll list item has matured as defined by a poll list item time interval value.

21. The method of claim 19 wherein the component specific function is used for determining the time interval between polls for performing calculations relative to the hardware component being managed by the instrumentation component.

22. The method of claim 21 wherein the calculations performed as used for determining processing unit speed.

23. The method of claim 2 wherein the second software module further includes a timeout poll list queue containing a variable number of poll list item tables, each containing a plurality of entry locations for supporting a number of different types of polling activities using a common mechanism which is independent of network operating system type and the method further including the steps of:

initializing each of a number of poll list entry locations to specify a time interval, a duration interval and type of each polling activity;

ordering the poll list items in the queue according to next time of maturity; and, performing a select operation for performing polling in a timely manner independently of and without interference from requests received from the first module in accordance with the contents of the poll list entry locations.

24. The method of claim 2 wherein the second module further includes a trap table having a plurality of trap entry locations and wherein the method further includes the steps of:

initializing each of the entry locations to store a set of values pertaining to testing for an occurrence of different one of a number of trap conditions being supported by the second module, the set of values being used for identifying criteria to be used in establishing the occurrence of the different trap condition and an action to be taken when the second module has determined that the trap condition has occurred.

25. The method of claim 24 wherein the information values corresponding to the criteria to be used includes an interval field value defining a time polling interval at which the trap condition is to be tested, a duration value specifying the number of polls to be performed before polling is discontinued, a value to be used in testing for the trap condition, a condition value identifying the trap condition to be tested for establishing the occurrence of the trap and a test value that the polled variable is to be tested against.

26. The method of claim 25 wherein the information value identifying the test value can specify either (1) an snmpvar value corresponding to a MIB variable containing the value that the polled variable is to be tested against or (2) an encoded specific trap test value that the polled MIB variable is to be tested against.

27. The method of claim 24 wherein the information identifying the trap condition includes a trap number value corresponding to an assigned enterprise trap number for that trap condition and an enterprise value corresponding to a particular snmp variable of the enterprise for the trap.

28. The method of claim 24 wherein the information values corresponding to the action includes a true action value identifying the action to be performed and an action object value identifying the variable which is the object of the trap action to be performed when the trap condition has been satisfied.

29. The method of claim 24 wherein the trap table includes a number of entries allocated for defining user trap conditions which can be concurrently active and wherein the method further includes the steps of:

in response to receipt of each set command by the second module, setting values for the designated MIB control variables for causing the polling of the MIB variables by the second module at frequent intervals for testing the occurrence of a user defined trap condition without having to incur network overhead in performing polling remotely.

30. The method of claim 29 wherein the designated MIB control variables include a snmp object identifier value for a MIB variable to be tested for the user defined trap condition, a MIB user trap duration value defining a polling duration, a MIB user trap poll value defining a number of times polling is to take place and MIB user threshold limit values defining when specified actions are to be taken relative to the user defined trap condition.

31. The method of claim 30 wherein the designated MIB control variables further include:

MIB user trap action values defining the specific actions to be taken when one of the threshold limit values has been exceeded and MIB user trap objects values corresponding to user definable OIDs for identifying which MIB variables are to be polled locally to determine when the threshold limit is exceeded.

32. The method of claim 31 wherein the specific actions include:

sending a trap, setting a MIB variable to a specified value, incrementing a MIB variable and decrementing a MIB variable and wherein the designated control variables further include MIB user trap object values to be used when the specified action is to set a MIB variable to a value.

33. The method of claim 30 wherein setting the MIB user trap poll value to zero causes the second module to discontinue polling for the corresponding user defined trap condition.

34. The method of claim 2 wherein the second module further includes a variable control table containing a plurality of entries, each entry containing control information pertaining to a specific snmp MIB variable and a validate variable function value designating the function to be used for validating each variable contained in a PDU of a request received by the second module, the method further comprising the steps of:

determining if a snmp variable identifier of the variable contained in the PDU being processed is within a valid range;

if valid, obtaining the entry from the variable control table corresponding to the snmp variable; and, invoking a variable validation function for performing a validation operation on the snmp variable using control information contained in the variable control table entry.

35. The method of claim 34 wherein the variable control table further includes locations for storing dispatch entries, each dispatch entry including a process variable function value and the method further includes the steps of:

upon successfully completing the step of validation by the second module, invoking the processing function specified in the dispatch entry to process that specific MIB variable by the associated instrumentation component; and, performing a specific validation operation on the snmp variable by the processing function of the instrumentation component using information specific to the instrumentation component.

36. The method of claim 2 wherein the second module further includes a multilevel stubbing mechanism for providing stub level values for a snmp MIB variable and the method further including the steps of:

testing the stub level value associated with a snmp variable by the second module to determine if the snmp variable being processed is a stubbed variable; and, if stubbed, completing processing of the snmp variable by the second module in the manner defined by the stub level value.

37. The method of claim 36 wherein the stubbing level value can be coded for specifying no stubbing, generic stubbing, component stubbing or driver stubbing for completing the processing of the snmp variable.

38. The method of claim 37 wherein the server system further includes a database for storing snmp variable values, a first instrumentation component being operatively coupled to the server hardware component being managed through a driver component and, a second instrumentation component being operatively coupled to the database, the method further including the steps of:

in response to a stub level value specifying generic stubbing, the second module operates to complete the processing of a request snmp variable by accessing a variable value in the database through the second instrumentation component;

when the stub level value specifies component stubbing, the second module in lieu of completing the processing of the snmp variable as defined in the previous step, calls the instrumentation component which is operative to complete the processing of the request snmp variable by accessing a variable value in the database through the second instrumentation component; and, when the stub level value specifies driver stubbing, the instrumentation component in lieu of completing processing of the snmp variable as defined in the previous step, calls the driver component which is operative to complete variable processing by providing a variable value.

39. The method of claim 2 wherein the second module further includes a poll list item table containing a number of entry locations reserved for enabling monitoring of specific MIB variables and a circular buffer storage for storing data pertaining to the specific MIB variables being monitored, the method further including the steps of:

determining if data monitoring is active;

when active, initiating a data monitoring activity by setting a number of MIB control variables, the control variables including a value defining an snmp OID of the variable which is to be monitored, a value defining a time interval at which the monitored variable is to be polled, a value defining the number of polling operations to be performed on the monitored variable and a value defining the size of the circular buffer storage to be used for storing instances of the monitored variable during polling;

during operation, polling the monitored variable upon each expiration of the time interval for storing in the circular buffer storage, an instance of the monitored variable obtained as a result of polling; and, upon completing the number of polling operations, returning a string containing all of the instances of the monitored variable collected in the circular buffer storage in response to each get request specifying the monitored variable.

40. The method of claim 39 wherein the method further includes the step of:

inactivating monitoring of a snmp variable by setting to zero, the value defining the number of polling operations.

41. The method of claim 39 wherein the method further includes the step of restarting data monitoring for each last specified time interval, each time the second module is restarted when the value defining the number of polls is not zero.

42. The method of claim 34 wherein the method further includes the step of: during startup, overriding entries in the variable control table by the instrumentation component for designating a specific validation function to be used in carrying out validation.

43. The method of claim 2 wherein one of the plurality of components is a portable database component including a database file containing a number of selected current variable values and the method further including the steps of:

encoding a MIB variable name, instance number, attributes and current value of a MIB variable instance in an individual database record in ASCII form by one of the instrumentation components; and, storing the individual database record in the database file by the instrumentation component.

44. The method of claim 43 further including the steps of:

maintaining the persistence of MIB variables by testing whether a variable which has been set is a persistent variable; and, if a persistent variable, building an ASCII database record by the instrumentation component;

appending the record to the end of the database file wherein the last record for a specific MIB variable identifier and instance determines a persistent value of the record; and, periodically sorting the records of the database file according to MIB variable identifier and instance to eliminate obsolete records while preserving current persistent values.

45. A peer agent system organized for managing a number of different server systems which operate under the control of a number of different network operating systems, each server system comprising a plurality of components and at least one management information base (MIB) component for storing information describing a set of server specific variables and the hierarchy used in managing server hardware components, and a local extendible agent component which communicates over a communications network using a standard request/response protocol for processing requests received over the network, the peer agent system being organized for facilitating porting to different network operating systems in addition to extensive component reuse and the peer agent system further comprising:

(a) a first peer agent extension software module operative to communicate with the local agent component over a first programmable interface using a first type of standard protocol, the first software module including operating system specific routines for communicating with the network operating system controlling the server system;

(b) an independent abstraction application program interface for communicating through a second protocol which uses a small set of non-network operating system specific instrumentation commands and a predetermined set of control data structures;

(c) a second instrumentation module which operatively couples to the MIB component, the second instrumentation module including a number of server specific instrumentation components which operatively couple to the different server components and include mechanisms for directly managing hardware specific information variables of the MIB component obtained from the server components of the server system; and, (d) the first peer extension module and the second instrumentation module respectively further including first and second mechanisms for communicating between the first and second modules over the abstraction interface, requests and responses from the second instrumentation module obtained from the instrumentation components managing the different server components using the instrumentation commands and control data structures coded for representing the requests and responses.

46. A peer agent system for managing any one of a number of different server systems which operate under the control of any one of number of different types of network operating systems, each server system comprising a plurality of hardware components and at least one management information base (MIB) component for storing information describing a set of server specific variables used in managing server hardware components, and a local extensible agent component which communicates over a communications network using a standard request/response protocol for processing requests and responses associated with server system operations, the peer agent system being able to operate in conjunction with a plurality of different network operating systems, the peer agent system further comprising:

(a) means for initially communicating the requests for the server system from the network received by the local agent to a first peer agent extension software module over a first programmable interface using a first type of standard protocol, the first software module including operating system specific functions for communicating with the network operating system controlling the server system;

(b) an abstraction interface operating with a second protocol using a small set of non-network operating system specific instrumentation commands and a predetermined set of control data structures;

(c) a second module which operatively couples to the MIB component, the second module including a number of server specific instrumentation components which operatively couple to the different server components and operate to directly manage hardware specific information variables described in the MIB component based on information obtained from the server components of the server system;

(d) means for transferring the requests over an independent abstraction application program interface following processing by the first module for receipt by the second module; and, (e) means included in the second module for converting the specific instrumentation commands and applicable control data structures representing the requests by the second module into commands for execution by the instrumentation components managing the server components to provide responses to the requests received by the second module.

47. The system of claim 46 wherein the system further includes:

(e) means included in the second module for transferring responses to the first module received from the instrumentation components managing the server components over the independent abstraction program interface using the commands and data structures of the second protocol representing the requests; and, (f) means included in the first module for transferring the responses received from the second module to the local agent over the first programmable interface by the first module using the first type of protocol for subsequent transfer of responses to the communications network by the local agent.

48. The system of claim 46 wherein each of the different network operating systems includes a like interprocess communications facility for communicating between those processes being executed by the network operating system and wherein the transmission of requests and responses over the independent abstraction program interface by the first and second modules uses the interprocess communications facility.

49. The system of claim 48 wherein the similar type of interprocess communications facility utilizes sockets and the responses include both request and unsolicited responses.

50. The system of claim 46 wherein the standard response/request protocol is the SNMP protocol, the network operating system controlling the server system is a UNIX type system, the first programmable interface corresponds to a SMUX, the first protocol corresponds to a SMUX protocol and the second module corresponds to a daemon process.

51. The system of claim 46 wherein the standard response/request protocol is the SNMP protocol, the network operating system controlling the server system is a Windows NT operating system, the first programmable interface is an SNMP application program interface and the second module is implemented by a service facility.

52. The system of claim 46 wherein the standard response/request protocol is the SNMP protocol, the network operating system controlling the server system is a Netware operating system, the first programmable interface corresponds to an SNMP application program interface and the second module is a Netware® loadable module.

53. The system of claim 46 wherein the second module further includes a component interface for transferring each command to one of the instrumentation components associated with the variables specified in the request, the component interface being common to each of the instrumentation components for facilitating adding of new instrumentation components without having to make changes to other parts of the second module.

54. The system of claim 46 wherein the second module further includes:

(e) means for generating unsolicited messages in the form of trap responses by the second module upon receiving information from the instrumentation components indicating occurrences of error events within the server hardware components; and, (f) means for transferring the trap responses over the abstraction interface to the first module using a subset of the specific instrumentation commands and control data structures; and the first module further includes:

(g) means for converting the trap responses by the first module into a form for transfer to the local agent over the first interface and then to the communications network by the local agent.

55. The system of claim 46 wherein the small set of non-network operating system specific instrumentation commands and the defined set of control data structures incorporate a plurality of client functions, common functions and server functions.

56. The system of claim 55 wherein the client functions include an instCallForComponent function, an instIssueCommandRequest function, an instReceive CommandResponse function, an instReceiveTrapIndication function, an instDisconnectComponent function, an iabs_cmd_connect function and an iabs_accept_trap_connect function.

57. The system of claim 55 wherein the common functions include a send_pdu function and a get_pdu function.

58. The system of claim 55 wherein the server based functions include an iabs_trap_connect function, an iabs_accept_cmd_connect function and a create_port_file function.

59. The system of claim 55 wherein the system further includes a library for storing the client based functions, common functions and server based functions which are accessible by the first module and second module over the abstraction interface.

60. The system of claim 55 wherein the first module further includes a set of mechanisms for executing both client based functions and common functions and the second module further includes a set of mechanisms for executing both server based functions and common functions.

61. The system of claim 53 wherein the component interface includes initialization and termination tables, each table containing a number of entries containing values designating each of the number of instrumentation components being managed by the second module at startup and termination respectively, and in response to reading out each of the values stored in the initialization and termination tables respectively, causing the designated instrumentation component to perform start up and termination operations specific to one of the server hardware components being managed by the designated instrumentation component.

62. The system of claim 53 wherein the MIB component is organized in a hierachical tree structure comprising a plurality of tree nodes and leaf elements identifying MIB variables, the second module further including a variable control table containing a number of processing function locations populated with processing function entries, each entry identifying the function to be used to process get and set requests for a specific MIB variable and wherein the component interface further includes:

a number of interfaces usable by each instrumentation component designated to be initialized during startup to populate the variable control table processing function locations with processing function entries identifying the functions to be used to process get and set requests for a number of MIB variables, one of the interfaces specifying a MIB variable and being used by the instrumentation component to populate variable control table processing function locations for the specified MIB variable; and, another interface specifying a MIB tree node and being used by the instrumentation component to populate the variable control table processing function locations for all of the accessible MIB variables defined under the specified MIB tree node, the interfaces enabling the designated instrumentation component to process requested MIB variables.

63. The system of claim 53 wherein the component interface further includes a number of interfaces for enabling an instrumentation component to allocate, initialize and queue poll list items within a poll list item queue containing a plurality of locations, the second module being operative to initialize each of a number of entry locations for identifying the poll list item as a generic poll list item and an address pointer value identifying a component specific function to be performed when a poll list item has matured as defined by a poll list item time interval value.

64. The system of claim 63 wherein the component specific function is used for determining the time interval between polls for performing calculations relative to the hardware component being managed by the instrumentation component.

65. The system of claim 46 wherein the second module further includes a trap table having a plurality of trap entry locations, each of the entry locations initialized to store a set of values pertaining to testing for an occurrence of different one of a number of trap conditions being supported by the second module, the set of values being used for identifying criteria to be used in establishing the occurrence of the different trap condition and an action to be taken when the second module has determined that the trap condition has been satisfied.

66. The system of claim 65 wherein the information values corresponding to the criteria to be used includes an interval field value defining a time polling interval at which the trap condition is to be tested, a duration value specifying the number of polls to be performed before polling is discontinued, an snmpvar value corresponding to a variable identifier of a variable to be used in testing for the trap condition, a condition value identifying the trap condition to be tested for establishing the occurrence of the trap and a test value that the polled variable is to be tested against.

67. The system of claim 66 wherein the information values corresponding to the action includes a true action value identifying the action to be performed and an action object value identifying the variable which is the object of the trap action to be performed when the trap condition has been satisfied.

68. The system of claim 66 wherein the trap table includes a number of entries allocable for defining user trap conditions which can be concurrently active and wherein in response to receipt of each set command, the second module sets values for the designated MIB control variables for causing the polling of the MIB variables by the second module at frequent intervals for testing the occurrence of a user defined trap condition without having to incur network overhead in performing polling remotely.

69. The system of claim 68 wherein the designated MIB control variables include a snmp object identifier value for a MIB variable to be tested for the user defined trap condition, a MIB user trap duration value defining a polling duration, a MIB user trap poll value defining a number of times polling is to take place and MIB user trap threshold limits values for defining when specified actions are to be taken relative to the user defined trap condition.

70. The system of claim 69 wherein the designated MIB control variables further include:

MIB user trap action values defining the specific actions to be taken when one of the threshold limits values has been exceeded and MIB user trap objects values corresponding to user definable OIDs for identifying which MIB variables are to be polled locally to determine when the threshold limits values are exceeded.

71. The system of claim 70 wherein the specific actions defined by the MIB user trap action values include:

sending a trap, setting a MIB variable to a specified value, incrementing a MIB variable and decrementing a MIB variable and wherein the designated control variables further include MIB user trap object values to be used when the specified action is to set a MIB variable to a value.

72. The system of claim 46 wherein the second module further includes a variable control table containing a plurality of entries, each entry containing control information pertaining to a specific snmp MIB variable and a validate variable function value designating the function to be used for validating each variable contained in a PDU of a request received by the second module, the second module being operative to invoke the process variable function for determining if an snmp identifier of the variable contained in the PDU being processed is within a valid range; if within the valid range, the second module being operative to obtain the entry from the variable control table corresponding to the snmp variable; and then invoke a variable validation function for performing a validation operation on the snmp variable using control information contained in the variable control table entry.

73. The system of claim 71 wherein the variable control table further includes locations for storing a process variable function entries, the second module upon successfully completing the validation operation invokes the instrumentation component processing function specified in the process function entry to process that specific MIB variable and the instrumentation component upon being invoked, performs a specific validation operation on the snmp variable using information specific to the instrumentation component.

74. The system of claim 72 wherein the second module further includes a multilevel stubbing mechanism for providing stub level values for a number of snmp variables and wherein in response to a request variable, the second module tests the stub level value associated with the snmp variable to determine if the snmp variable being processed is a stubbed variable and if stubbed, the second module completes processing of the snmp variable in the manner specified by the stub level value.

75. The system of claim 74 wherein the stub level value can be coded for specifying no stubbing, generic stubbing, component stubbing or driver stubbing for completing the processing of the snmp variable.

76. The system of claim 75 wherein the server system further includes a database for storing snmp variable values, a first instrumentation component being operatively coupled to the server hardware component being managed through a driver component and, a second instrumentation component being operatively coupled to the database, the second module in response to a stub level value specifying generic stubbing being operative to complete the processing of a request snmp variable by accessing a variable value in the database through the second instrumentation component, when the stub level value specifies component stubbing, the second module is operative to call the instrumentation component to complete the processing of the requested snmp variable by accessing a variable value in the database through the second instrumentation component and when the stub level value specifies driver stubbing, the second module is operative to call the instrumentation component which calls the driver component to complete variable processing by providing a variable value.

77. The system of claim 46 wherein the second module further includes a poll list table contains a number of entry locations reserved for enabling monitoring of specific MIB variables and a circular buffer storage for storing data pertaining to the specific MIB variables being monitored, the second module being operative to determine if data monitoring is active;

when active, the second module initiating a data monitoring activity by setting a number of MIB control variables, the control variables including a value for defining an snmp OID of the variable which is to be monitored, a value defining a time interval at which the monitored variable is to be polled, a value defining the number of polling operations to be performed on the monitored variable and a value defining the size of the circular buffer storage to be used for storing instances of the monitored variable during polling;

during operation, the second module being operative to poll the monitored variable upon each expiration of the time interval for storing in the circular buffer storage, an instance of the monitored variable obtained as a result of polling; and, upon completing the number of polling operations, the second module being operative in response to each get request specifying the monitored variable, to return a string containing all of the instances of the monitored variable collected in the circular buffer storage.

78. The system of claim 77 wherein the second module each time upon being restarted is operative to restart data monitoring for each last specified time interval when the value defining the number of polls is not zero.

79. The system of claim 72 wherein the instrumentation component during startup, overrides entries in the variable control table for designating a specific validation function to be used in carrying out validation of snmp variables.

80. The system of claim 46 wherein one of the plurality of components is a portable database component which includes a database file containing a number of selected current variable values, one of the instrumentation components being coupled to the portable database component and operative to encode a MIB variable name, instance number, attributes in an individual database record in ASCII form for each persistent variable and store the individual database record in the database file.

81. The system of claim 80 wherein the instrumentation component is operative to maintain the persistence of MIB variables by testing whether a variable which has been set in response to a request is a persistent variable; and, if a persistent variable, the instrumentation component being operative to build an ASCII database record, append the record to the end of the database file wherein the last record for a specific MIB variable identifier and instance determines a persistent value of the record and the instrumentation component periodically sorting the records according to MIB variable identifier and instance to eliminate obsolete records while preserving current persistent variable values.

* * * * *